(12) United States Patent
Kobayashi et al.

(10) Patent No.: US 8,156,781 B2
(45) Date of Patent: Apr. 17, 2012

(54) STEERING RACK AND METHOD OF MANUFACTURING THE SAME

(75) Inventors: Kazuto Kobayashi, Fujisawa (JP); Kotaro Hirota, Fujisawa (JP); Kiyoshi Ootsuka, Fujisawa (JP)

(73) Assignee: NSK Ltd., Tokyo (JP)

( * ) Notice: Subject to any disclaimer, the term of this patent is extended or adjusted under 35 U.S.C. 154(b) by 994 days.

(21) Appl. No.: 12/090,223

(22) PCT Filed: Oct. 12, 2006

(86) PCT No.: PCT/JP2006/320413
§ 371 (c)(1),
(2), (4) Date: Apr. 14, 2008

(87) PCT Pub. No.: WO2007/043625
PCT Pub. Date: Apr. 19, 2007

(65) Prior Publication Data
US 2009/0260467 A1 Oct. 22, 2009

(30) Foreign Application Priority Data

Oct. 12, 2005 (JP) .................. 2005-298069
Nov. 24, 2005 (JP) .................. 2005-338809
Oct. 2, 2006 (JP) .................. 2006-270863

(51) Int. Cl.
*B21D 17/02* (2006.01)
*B21D 22/02* (2006.01)
(52) U.S. Cl. .... 72/370.21; 72/353.2; 72/358; 29/893.34
(58) Field of Classification Search .............. 72/353.2, 72/353.6, 354.2, 354.6, 355.2–355.6, 356, 72/358, 359, 370.01, 370.04, 370.19, 370.21; 29/893.34
See application file for complete search history.

(56) References Cited

U.S. PATENT DOCUMENTS

| 6,289,710 B1 * | 9/2001 | Ozeki ................. 72/370.04 |
| 6,575,009 B2 | 6/2003 | Shiokawa |
| 2003/0196469 A1 * | 10/2003 | Tsubouchi et al. ....... 72/370.21 |

FOREIGN PATENT DOCUMENTS

| JP | 57-73269 A | 5/1982 |
| JP | 58-81535 A | 5/1983 |
| JP | 58-218339 A | 12/1983 |
| JP | 61228161 A * | 10/1986 |
| JP | 3-5892 B2 | 1/1991 |
| JP | 6-31350 A | 2/1994 |
| JP | 10-58081 A | 3/1998 |
| JP | 2928427 B2 | 5/1999 |
| JP | 2000-238650 A | 9/2000 |
| JP | 2001-79639 A | 3/2001 |
| JP | 2002-178095 A | 6/2002 |
| JP | 3442298 B2 | 6/2003 |
| JP | 2004-34829 A | 2/2004 |

* cited by examiner

Primary Examiner — Debra Sullivan
(74) Attorney, Agent, or Firm — Sughrue Mion, PLLC

(57) ABSTRACT

When a punch is downwardly pressed, an inner circumferential surface of a first rack blank bites into a top surface of a second rack blank. A blank material upwardly flows due to a reaction force and is used to form rack teeth. Thus, a filling degree of the teeth with the material is enhanced. At the time when the forming of the rack teeth is finished, a gap is left between the inner circumferential surface of the first rack blank and the outer circumferential surface of the second rack blank. Thus, a die is not put into a sealed condition. Consequently, a forming load is small so that the lifetime of the die is lengthened. Also, the top surface of the second rack blank bites into a bore hole portion of the first rack blank so that the first rack blank and the second rack blank are joined together. Accordingly, the rigidity of the entire rack teeth is increased.

17 Claims, 65 Drawing Sheets

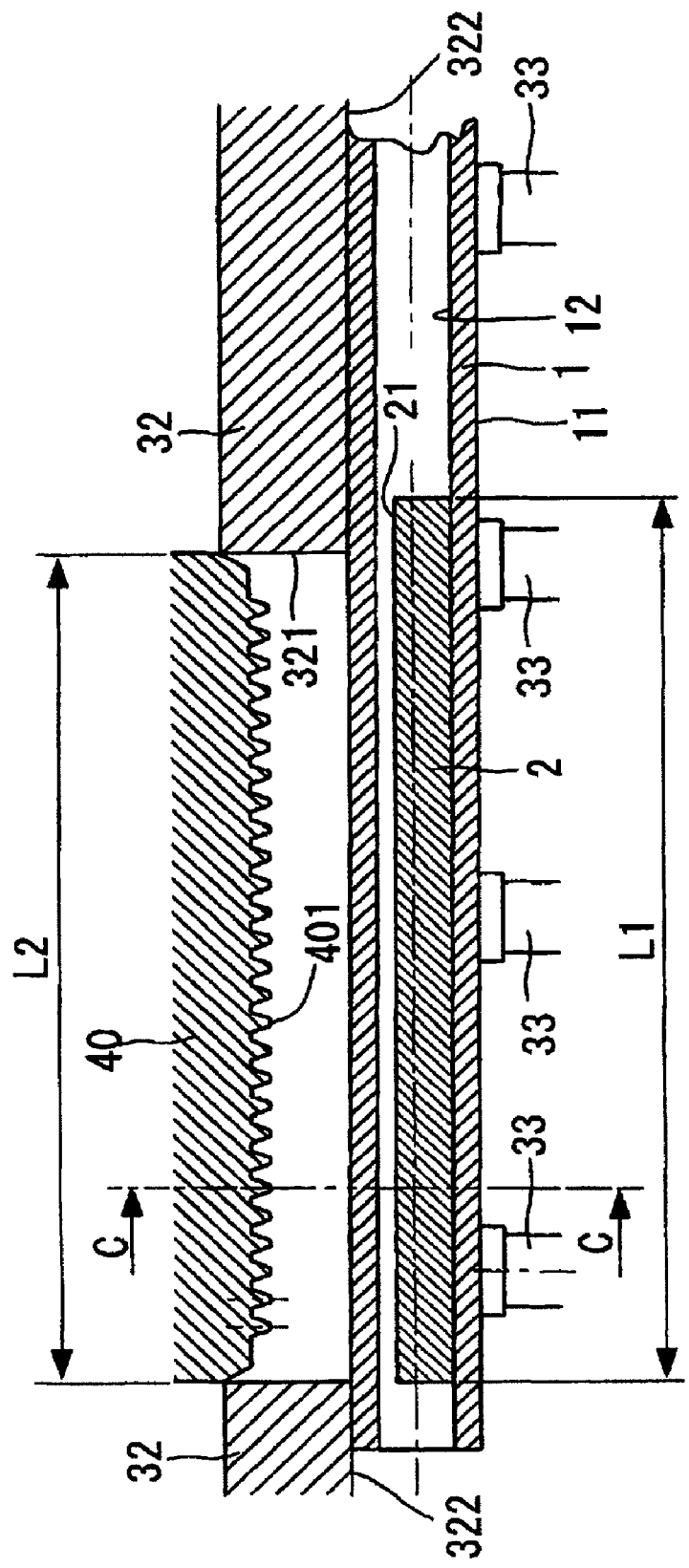

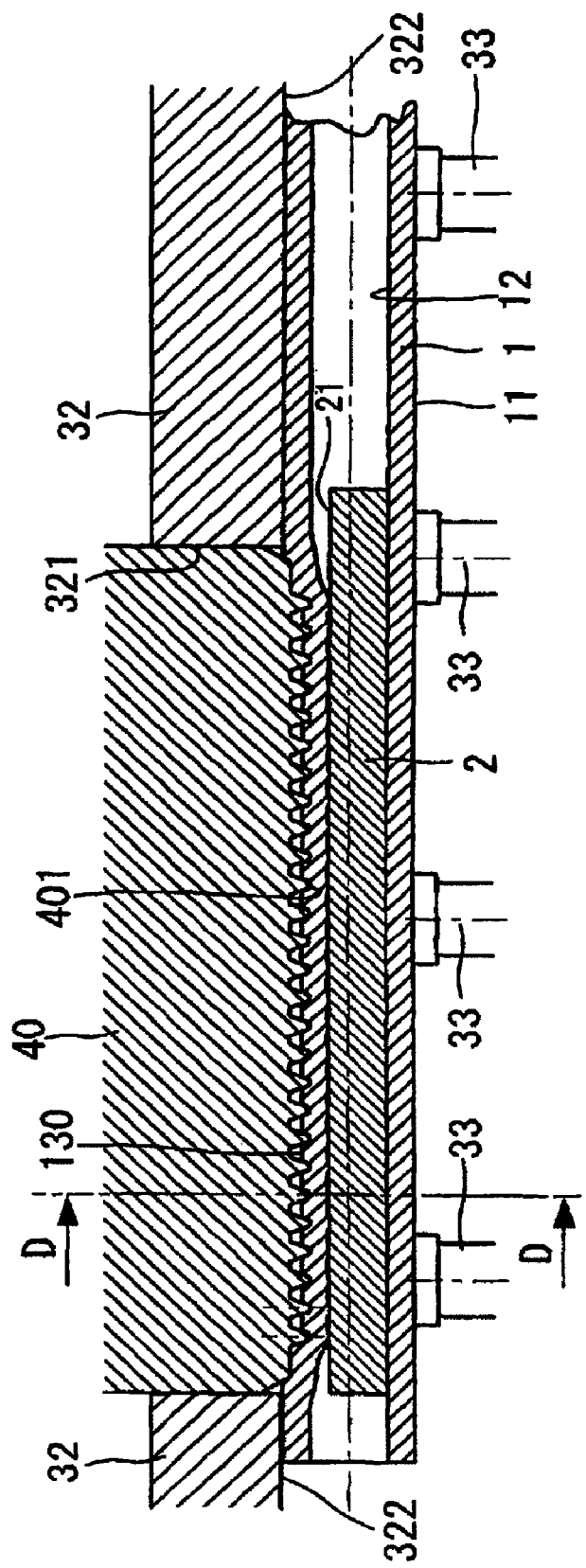

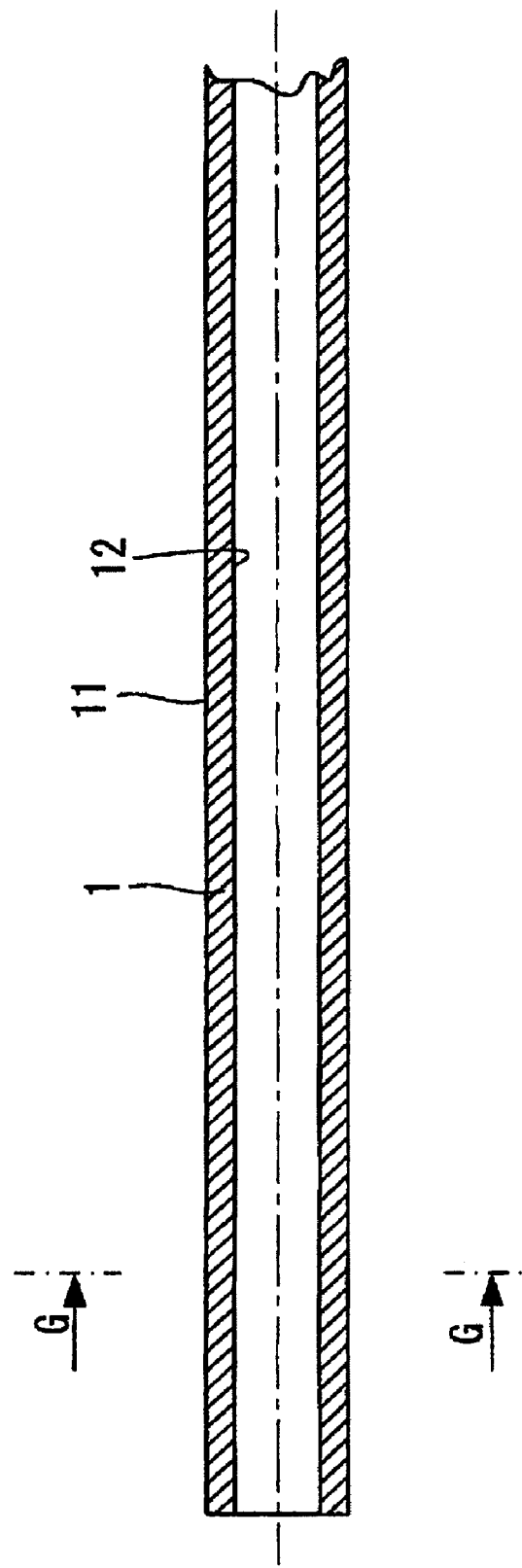

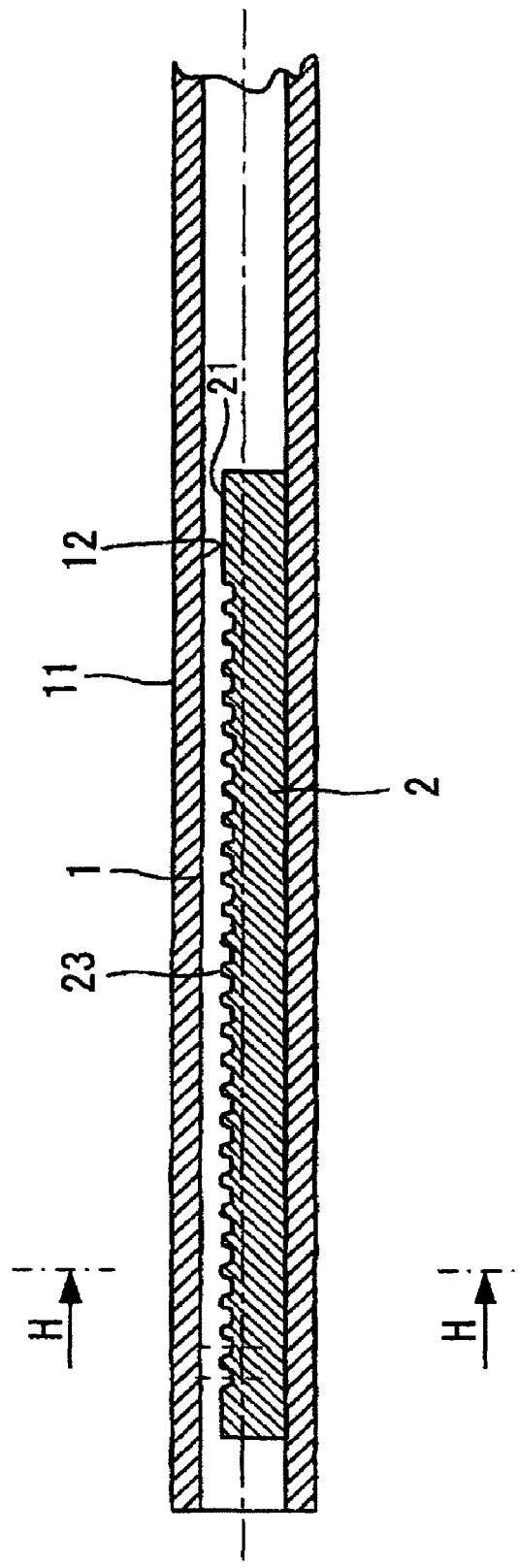

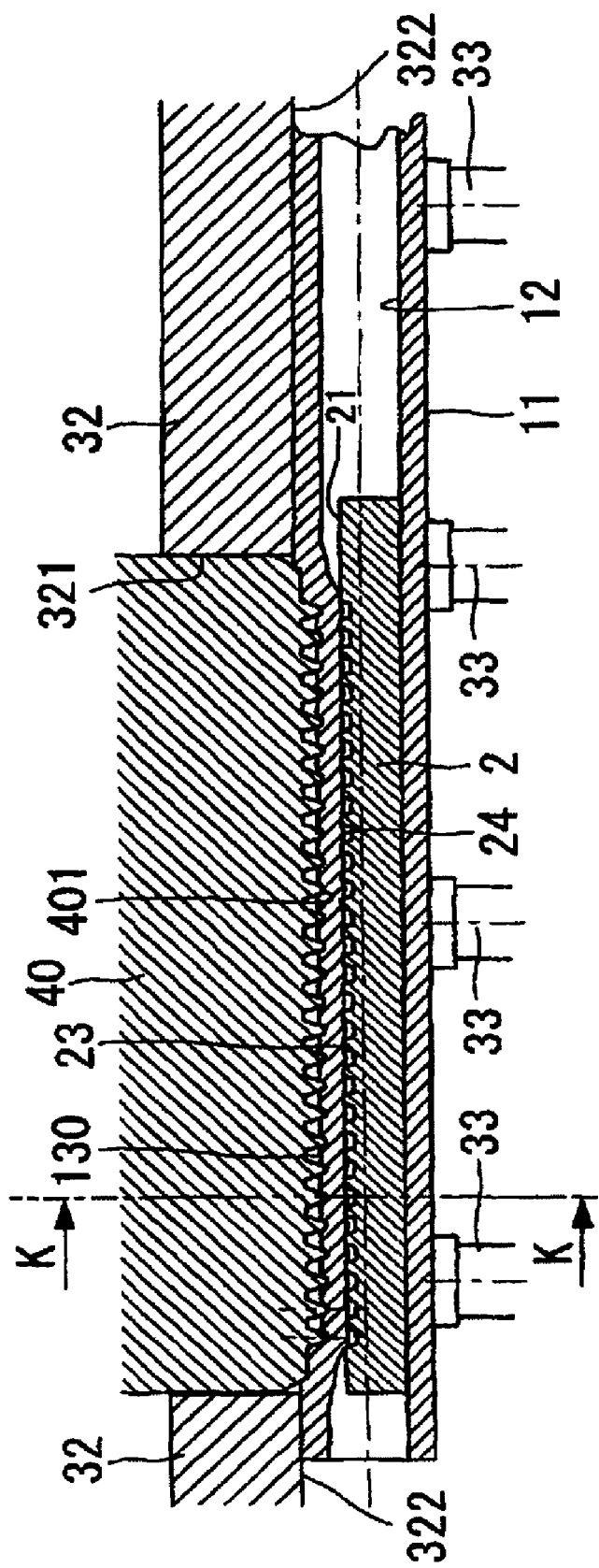

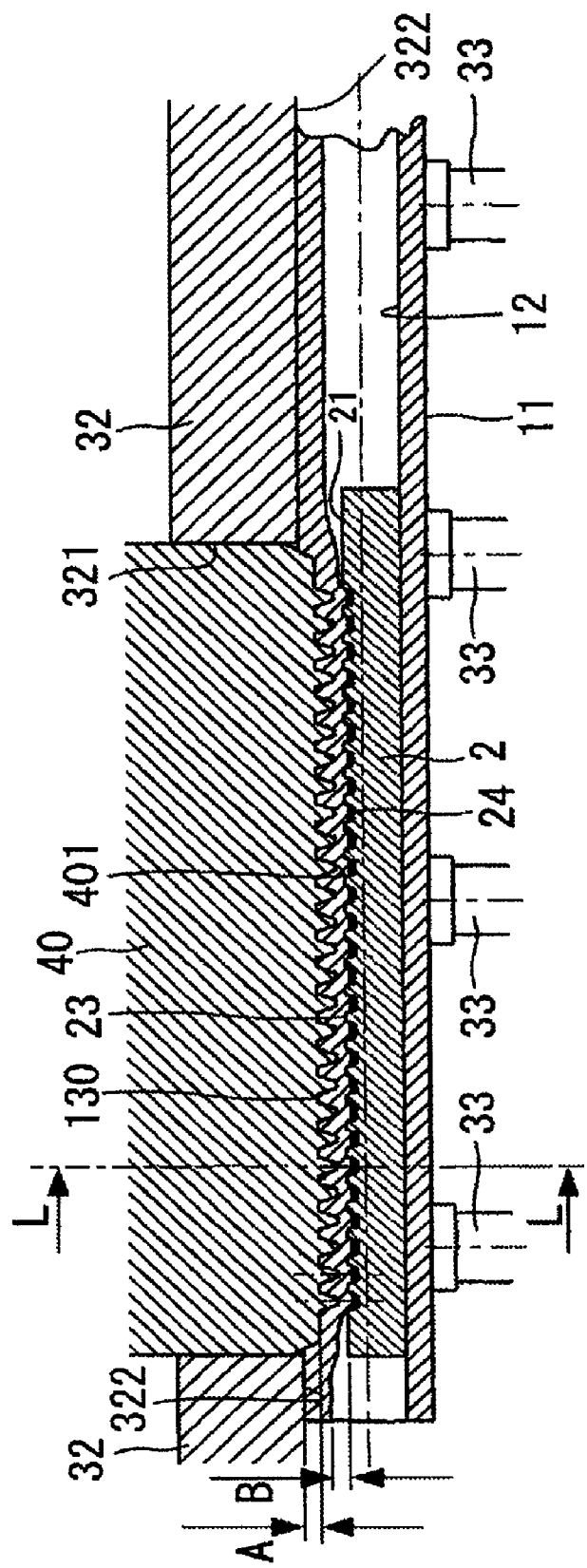

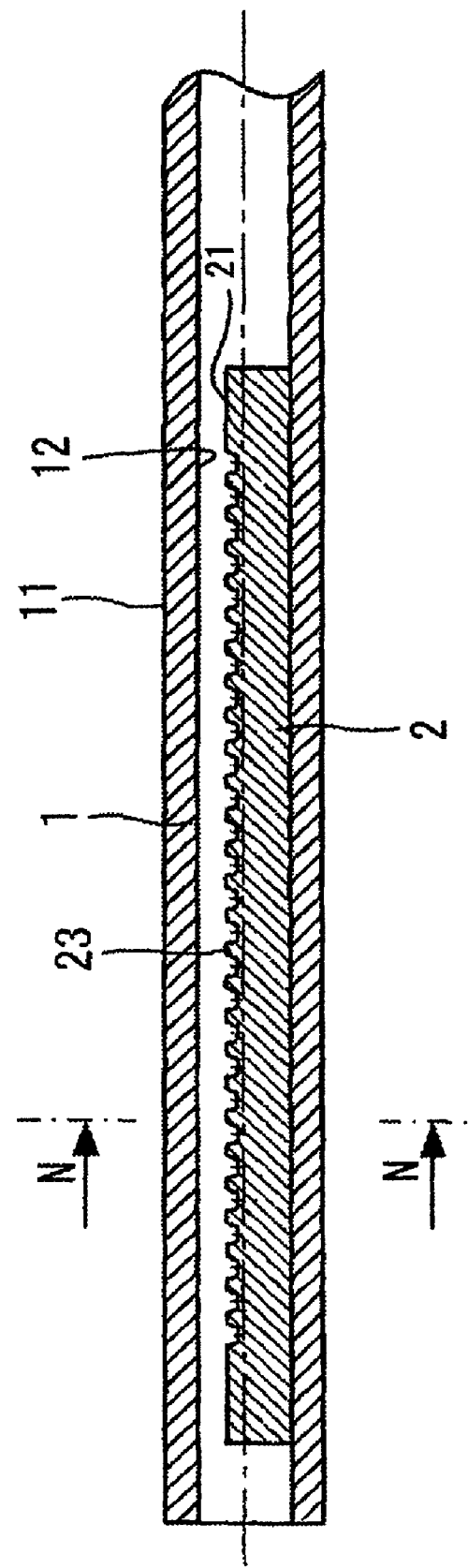

STEERING RACK AND METHOD OF MANUFACTURING THE SAME

TECHNICAL FIELD

The present invention relates to a steering rack and to a method of manufacturing the same.

BACKGROUND ART

Conventionally, in a method of manufacturing a steering rack, rack teeth have been formed by cutting a blank. However, in recent years, steering racks tend to be formed by plastic working using a die for the purpose of reducing cost.

For example, JP-A-10-58081 and JP-A-2001-79639 disclose methods of manufacturing a rack, in which a solid round bar is used as a rack blank, excess thickness parts which have been excluded while forming rack teeth are protruded toward a side of the rack as burrs, and the protruded burrs are removed by pressing or machining. However, this manufacturing method requires an extra step for eliminating the burrs so that the processing cost becomes high. Further, because the excess thickness parts are excluded to the side part as the burrs, a load to be applied to a die is large. In addition, because a blank material runs to a side of the burrs, the material is liable to be insufficiently filled into the rack teeth.

JP-B2-3442298 discloses another method of manufacturing a rack, in which a rack blank in a form of a solid round bar is finely processed by turning to have a rack teeth forming portion, and excess thickness parts, which are excluded while forming rack teeth, are received inside a run-off absorbing portion formed on a rear side of a die opposite to the rack teeth in a multistep in order to prevent burrs from being formed. However, according to this manufacturing method, the shape of the die is complex. Further, the die is of a closing type so that a stress applied to the die is large. Thus, the lifetime of the die is short, and the manufacturing cost of the die is high. In addition, because the shape of the rear side opposite to the rack teeth has a multistep configuration and is complex, a shape of a rack guide (see a component designated by a reference numeral 21 in FIG. 12 of JP-A-2004-34829), which guides the rear side with respect to the rack teeth, becomes complex. Thus, there has been a disadvantage in that the cost of a steering apparatus becomes high.

Moreover, in the manufacturing methods disclosed in JP-A-10-58081, JP-A-2001-79639, and JP-B2-3442298, the rack blanks are in a form of the solid round bar. Thus, a portion other than the rack teeth forming portion is solid and heavy. Therefore, when drilling a hole to such a portion so as to lighten the rack, the processing cost for drilling a hole is added. Furthermore, because the rack blank is heated in order to sufficiently fill the material within the rack teeth, there has been a disadvantage in that accuracy in forming the rack teeth is degraded.

JP-B2-3-5892, JP-B2-2928427, U.S. Pat. No. 6,575,009 B2, and JP-A-2002-178095 disclose some other methods of manufacturing a rack, in which rack teeth are formed by pressing a mandrel into a bore hole of a hollow tubular rack blank. However, in such a manufacturing method, because a large processing force is required for stroking the mandrel, a plurality of mandrels having sizes that are slightly different from each other are exchangingly used. Thus, a processing time is long, and a dedicated processing machine is needed. Accordingly, the manufacturing cost of the rack is high. Further, because a thickness of the bottom part of the rack teeth is thin, there has been a disadvantage in that the strength of the rack teeth is deteriorated.

DISCLOSURE OF THE INVENTION

It is an object of one or more embodiments of the present invention to provide a steering rack and a method of manufacturing the same, in which the steering rack is lightweight, and a shape of an associated die is simple and has a long lifetime, a manufacturing cost is reduced, filling degree of a material within a teeth shape is improved, and a rigidity of entire rack teeth is enhanced.

According to one or more embodiments of the invention, a method of manufacturing a steering rack includes providing a first rack blank in a form of a pipe having a bore hole, and a second rack blank or a mandrel having such a cross-sectional shape that a gap is provided between the second rack blank or the mandrel and an inner circumferential surface of the first rack blank, inserting the second rack blank or the mandrel into the bore hole of the first rack blank, restraining an outer circumferential surface of the first rack blank other than a rack teeth forming portion of the first rack blank by a first die, forming rack teeth on the first rack blank by pressing a punch having a rack teeth shaped portion onto the rack teeth forming portion of the first rack blank, and causing the first rack blank to contact an outer circumferential surface of the second rack blank or the mandrel facing the rack teeth forming portion of the first rack blank, and allowing a blank material, which has been excluded in the forming the rack teeth, to flow into the gap between the inner circumferential surface of the first rack blank and the second rack blank or the mandrel such that the blank material is accommodated in the gap.

According to one or more embodiments of the invention, the providing the first rack blank and the second rack blank or the mandrel includes providing the first rack blank having a hollow cylindrical shape.

According to one or more embodiments of the invention, the providing the first rack blank and the second rack blank or the mandrel includes providing the second rack blank which is solid.

According to one or more embodiments of the invention, the providing the first rack blank and the second rack blank or the mandrel further includes providing the second rack blank having a cylindrical shape.

According to one or more embodiments of the invention, the providing the first rack blank and the second rack blank or the mandrel includes providing the second rack blank having an axial length which is equal to or longer than a length of the rack teeth forming portion of the first rack blank.

According to one or more embodiments of the invention, the providing the first rack blank and the second rack blank or the mandrel includes forming teeth on the outer circumferential surface of the second rack blank facing the rack teeth forming portion of the first rack blank at a pitch equal to a pitch of the rack teeth shaped portion of the punch.

According to one or more embodiments of the invention, the method further includes, after the allowing the blank material, which has been excluded, to flow into the gap such that the blank material is accommodated in the gap, sizing the rack teeth to obtain a required rack teeth by holding and pressing the first rack blank between a second die having a required rack teeth shaped portion and a third die having an outer circumference corresponding to a required shape of the outer circumferential surface of the first rack blank other than the rack teeth forming portion.

According to one or more embodiments of the invention, the sizing the rack teeth includes forming the required rack teeth while narrowing a tooth width of a root of the rack teeth formed on the first rack blank to a required tooth width.

According to one or more embodiments of the invention, the method further includes, after the sizing the rack teeth, extracting the mandrel from the bore hole of the first rack blank.

According to one or more embodiments of the invention, the forming the rack teeth includes firstly forming the rack teeth by a first punch formed with a first rack teeth shaped portion having a pressure angle that is smaller than a pressure angle of a required rack teeth shape, and secondly forming the rack teeth by a second punch formed with a rack teeth shaped portion having a pressure angle that is closer to the pressure angle of the required rack teeth shape than the pressure angle of the first rack teeth shaped portion.

According to one or more embodiments of the invention, the sizing the rack teeth further includes further forming the required rack teeth without restraining the tooth width of the root of the rack teeth formed on the first rack blank.

According to one or more embodiments of the invention, the forming the rack teeth includes forming the rack teeth having a tooth height which is larger than a tooth height of a required rack teeth shape.

According to one or more embodiments of the invention, the forming the rack teeth includes forming the rack teeth by the punch having the rack teeth shaped portion such that a pressure angle of a rack tooth shape at each end in an axial direction of the first rack blank is 0 degree to 45 degrees on a side of an adjacent rack tooth shape and such that an angle formed between the rack tooth shape and an axis of the first rack blank on a side of the respective ends is 5 degrees to 45 degrees.

According to one or more embodiments of the invention, the restraining the first rack blank by the first die includes restraining the first rack blank by a pair of restraining surfaces of the first die, wherein the pair of restraining surfaces is formed in such a tapered shape that a width between the restraining surfaces continuously decreases toward a direction in which the punch is pressed.

According to one or more embodiments of the invention, the providing the first rack blank and the second rack blank or the mandrel includes providing the mandrel which is solid and having a cylindrical shape, wherein the surface of the mandrel facing the rack teeth forming portion of the first rack blank is flat along a length the rack teeth forming portion.

According to one or more embodiments of the invention, the method further includes, before the restraining the first rack blank by the first die, forming a tapered part on the rack teeth forming portion of the first rack blank.

According to one or more embodiments of the invention, a method of manufacturing a steering rack includes providing a first rack blank, forming a tapered part ion a rack teeth forming portion of the first rack blank, and forming rack teeth by pressing a punch having a rack teeth shaped portion onto the rack teeth forming portion of the first rack blank on which the tapered part is formed.

According to one or more embodiments of the invention, the method further includes, before the forming the rack teeth, inserting a second rack blank or a mandrel having a diameter that is less than an inner diameter of the first rack blank into the first rack blank at the rack teeth forming portion.

According to one or more embodiments of the invention, there is provided a steering rack manufactured by one of the aforementioned manufacturing methods.

According to one or more embodiments of the invention, a steering rack includes a first rack blank in a form of a pipe having a bore hole, and a second rack blank inserted into the bore hole of the first rack blank. Rack teeth are formed on an outer circumferential surface of the first rack blank, and an inner circumferential surface of a rack teeth forming portion of the first rack blank is attached to the second rack blank such that the first rack blank bites into the second rack blank due to plastic deformation.

According to one or more embodiments of the invention, an axial length of the second rack blank is equal to or longer than a length of the rack teeth forming portion of the first rack blank.

According to one or more embodiments of the invention, teeth are formed on an outer circumferential surface of the second rack blank at a pitch that is equal to a pitch of the rack teeth of the first rack blank.

In the method of manufacturing a steering rack and the steering rack manufactured by the method according to one or more embodiments of the invention, there are used the first rack blank in a form of the pipe having the bore hole, and the second rack blank having such a cross-sectional shape that the gap is provided in the bore hole between the first rack blank and a side of the second rack blank perpendicular to the rack teeth forming portion of the first rack blank.

Therefore, the blank material excluded in the formation of the rack teeth is caused to flow in the space between the bore hole of the first rack blank and the outer circumference of the second rack blank, and to be accommodated in the space. Further, the gap remains in the bore hole. Thus, the die is not brought into a closed condition, and the forming load is small. Thus, the lifetime of the die is lengthened. Further, the small forming load enables the cold forming of the rack. Accordingly, precision in forming the rack teeth is enhanced.

The bore hole of the first rack blank abuts against the second rack blank. The reaction force enables the effective use of the blank material in forming the rack teeth of the first rack blank. The filling degree, at which the teeth are filled with the material, is enhanced. The second rack blank bites into the bore hole surface of the first rack blank, so that the first rack blank and the second rack blank are joined together. Consequently, the rigidity of the entire rack teeth is enhanced.

Further, the blank material excluded in the formation of the rack teeth is caused to flow in the bore hole of the rack blank and to be accommodated in the bore hole. Thus, no burr is generated in the formed rack so that the number of processes required to remove burrs is reduced. Also, the shape of the die is simple, so that the rack can be formed by a general-purpose press. Thus, a die manufacturing cost and a forming equipment cost can be reduced. Because the mandrel may not be used, a processing time is short.

In the method of manufacturing a steering rack and the steering rack manufactured by the method according to one or more embodiments of the invention, the axial length of the second rack blank may be equal to the length of the rack teeth forming portion of the first rack blank. Therefore, portions other than the rack teeth forming portion can be lightened so that a process of drilling a hole to lighten the rack can be omitted.

In the method of manufacturing a steering rack and the steering rack manufactured by the method according to one or more embodiments of the invention, the teeth are formed on an outer circumferential surface of the second rack blank, which faces the rack teeth forming portion of the first rack blank, at a pitch that is equal to the pitch of the rack teeth shaped portion of the punch. Thus, an additional gap is provided between a concave part of the teeth of the second rack blank and the bore hole of the first rack blank, so that the forming load can be further reduced.

Also, a convex part of the teeth of the second rack blank pushes the blank material toward the rack teeth forming side of the first rack blank. Thus, the blank material is caused to more effectively flow to the rack teeth. Consequently, the filling degree, at which the teeth are filled with the material, is enhanced.

In the method of manufacturing a steering rack and the steering rack manufactured by the method according to one or more embodiments of the invention, in the intermediate forming process, the width between respective sides of the outer circumference perpendicular to a side of the rack teeth forming portion is formed narrower than the width between the respective sides of the outer circumference of the required rack teeth shape, and in the sizing process, the rack teeth are formed to have a certain width.

Accordingly, it is easy to put the rack blank into the sizing process. Additionally, even in a case where the die used in the sizing process has a simple structure with a pair of upper and lower dies, no burr protrudes to the outer circumference of the rack blank. Thus, the number of processes required to remove burrs is reduced.

In the method of manufacturing a steering rack and the steering rack manufactured by the method according to one or more embodiments of the invention, there are used the first rack blank in the form of the pipe having the bore hole, and the second rack blank which is inserted into the bore hole of the first rack blank and has such a cross-sectional shape that the gap is provided in the bore hole of the first rack blank between the first rack blank and a side of the second rack blank perpendicular to the rack teeth forming portion of the first rack blank when forming the rack teeth.

Additionally, the punch having a rough rack teeth shaped portion is pressed to the rack teeth forming portion of the outer circumference of the first rack blank. Thus, the bore hole surface of the first track blank is caused to abut against the outer circumference of the second rack blank. Also, the tooth width of the root of the rack teeth protrudes from the outer circumference of the first rack blank. Thus, the rough rack teeth are formed in the intermediate forming process. Subsequently, upon completion of performing the intermediate forming process, the first rack blank is pressed between the die having the required rack teeth shaped portion, and the die having the required outer circumference shape at the side facing the rack teeth forming side, while the outer circumference of the first rack blank is sandwiched. Thus, the required rack teeth are formed by the sizing process, while the tooth width of the root of each of the rack teeth is decreased to the required tooth width of the rack blank.

Accordingly, all the blank material excluded at the formation of the rack teeth is accommodated in the space between the bore hole surface of the first rack blank and the outer circumference of the second rack blank. Also, the gap remains in this bore hole. Additionally, the width of the tooth root of the rack is not restrained in the intermediate forming process. Thus, the die is not put into a close condition. The forming load is small. Consequently, the lifetime of the die is lengthened. Further, the small forming load enables the cold forming of the rack.

The bore hole surface of the first rack blank abuts against the second rack blank. The reaction force enables the effective use of the blank material in forming the rack teeth in the first rack blank. The filling degree, at which the teeth are filled with the material, is enhanced. The second rack blank bites into the bore hole of the first rack blank, so that the first rack blank and the second rack blank are integrated with each other. Consequently, the rigidity of the entire formed rack blank is enhanced.

Further, the blank material excluded at the formation of the rack teeth is caused to flow in the bore hole of the rack blank and to be accommodated in the bore hole. Thus, no burr is generated in the formed rack. The number of processes required to remove burrs is reduced. Also, the shape of the die is simple, so that the rack can be formed by a general-purpose press. Thus, a die manufacturing const and a forming equipment cost can be reduced. Because no mandrel is used, a processing time is short.

In the method of manufacturing a steering rack and the steering rack manufactured by the method according to one or more embodiments of the invention, the mandrel is extracted from the bore hole of the first rack blank after the step of sizing the rack teeth is finished. Thus, the rack serving as a finished product is lightened.

Also, in the case of the steering rack manufacturing method according to one or more embodiments of the invention, and the steering rack manufactured by such a steering rack manufacturing method, the intermediate forming process includes a first forming step of forming the rough rack teeth by a punch, whose pressure angle is smaller than a pressure angle of a required rack teeth shaped portion, and a second forming step of forming the rack teeth by a punch in which a rack teeth shaped portion having a pressure angle that is closer to a pressure angle of the required rack teeth shaped portion than the pressure angle of the first rack teeth shaped portion, is formed.

Accordingly, in the first step, an amount of blank material needed for forming the rack teeth having a finished product shape can be assured at a small forming load. In the second step, the rack teeth can be formed at a further small forming load into a shape according to which the blank can easily be led to the sizing process.

In the method of manufacturing a steering rack and the steering rack manufactured by the method according to one or more embodiments of the invention, the step of sizing the rack teeth includes a first step of forming the required rack teeth by narrowing a width of a tooth root of each of the rack teeth formed in the first rack blank to a required tooth width, and a second step of forming the required rack teeth without restraining the width of the tooth root of each of the rack teeth formed in the first rack blank.

Therefore, the forming in the direction of the tooth width and the forming in the direction of a tooth trace are performed separately from each other. Thus, the forming load is small. The profile precision of a tooth surface and the uniformity of the tooth forms are enhanced.

In the method of manufacturing a steering rack and the steering rack manufactured by the method according to one or more embodiments of the invention, in the intermediate forming process, rough rack teeth having a tooth height, which is larger than a tooth height of the required rack teeth shaped portion, are formed.

Therefore, in the sizing process, a gap is assured between the edge and the bottom of each of the rack teeth. The die is not put into a closed condition. Accordingly, a tooth flank pressure rises at a small forming load, so that the precision of a tooth flank is enhanced.

In the method of manufacturing a steering rack and the steering rack manufactured by the method according to one or more embodiments of the invention, a punch used in the intermediate forming process is formed so that a pressure angle of each of tooth forms respectively provided at both ends in a direction along an axis line of the first rack blank ranges from 0 to 45 degrees at an adjacent rack tooth side, and that an angle formed between the tooth form at an end side and the axis line of the first rack blank ranges from 5 degrees to 45 degrees.

Thus, the strength and the durability of the punch are enhanced. Also, the first rack blank can be suppressed from extending in the direction of an axis line at the formation of the rough rack teeth. Additionally, the pitch precision of the formed rack teeth can be enhanced.

In the method of manufacturing a steering rack and the steering rack manufactured by the method according to one or more embodiments of the invention, the manufacturing method includes a step of forming a tapered part in a rack teeth forming portion of the first rack blank, and a step of forming rack teeth by pressing a punch having a rack teeth shaped portion to the rack teeth forming portion of the first rack blank, in which the tapered part is formed. This can facilitate the formation of the rack teeth and can prevent an excess thickness part from being generated at the formation of the rack teeth. Thus, the rack teeth can fully be filled with the material. Also, the manufacturing cost can be reduced.

BRIEF DESCRIPTION OF THE DRAWINGS

FIG. 3A is a process view illustrating a manufacturing method of a rack according to the first embodiment and is an explanatory view illustrating a state in which a first tubular rack blank is attached to a die used in an intermediate forming process of forming a rough rack.

FIG. 4A is an explanatory view illustrating a halfway state in forming in the intermediate forming process.

FIG. 7A is an explanatory view illustrating a second tubular rack blank for second embodiment of the invention.

FIG. 8A is an explanatory view of the second embodiment, and illustrates a state in which a second uneven solid rack blank is inserted into a bore hole of the first rack blank shown in FIG. 7A.

FIG. 10A is an explanatory view illustrating a halfway state in forming in the intermediate forming process.

FIG. 11A is an explanatory view illustrating a state at the end of the forming in the intermediate forming process.

FIG. 13A is an explanatory view of a third embodiment, and illustrates a modification of the second uneven solid rack blank to be inserted into the bore hole of the first rack blank.

Figure 1A:
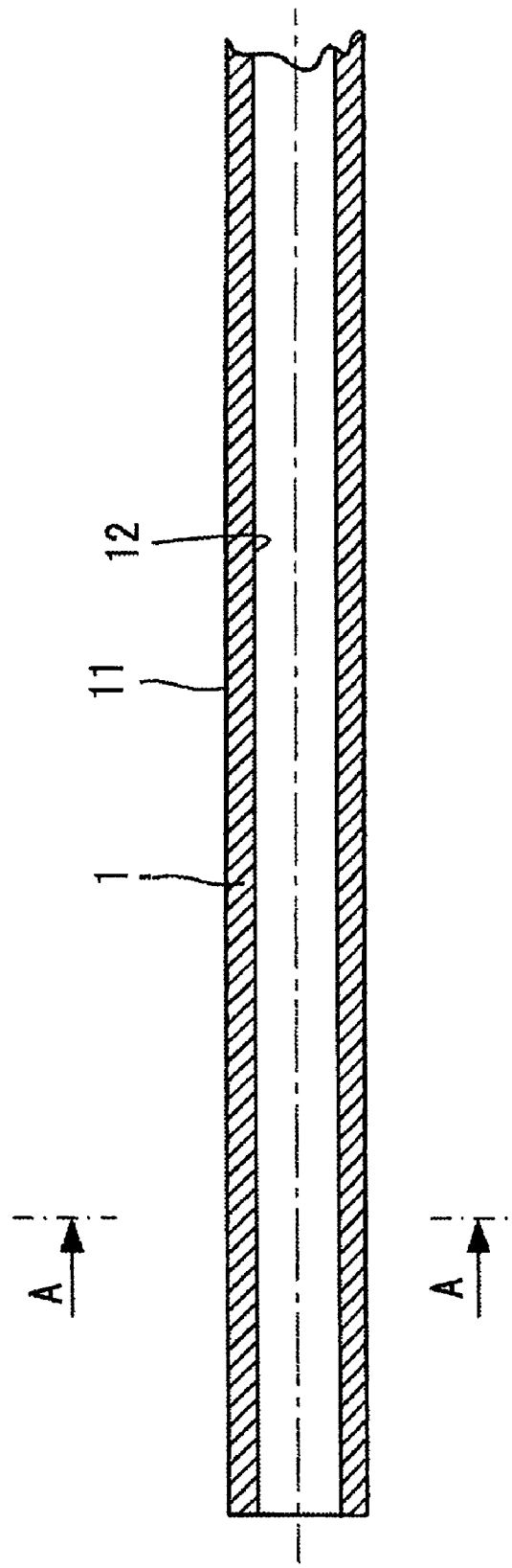
FIG. 1A is an explanatory view illustrating a first tubular rack blank for first embodiment of the invention.

EXPLANATION OF REFERENCE NUMERALS 1 first rack blank
11 outer circumference
12 bore hole
13, 14, 15, 16, 130 rack teeth
131 blank material
141 tooth edge part blank material
151, 152 roundings
17 left end surface side opening portion
11a tapered portion (a tapered shape)
11b rack teeth
2 second rack blank
21 top surface
22 outer circumference
23 teeth
24 gap
25 flat surface
31, 34, 37 lower dies
311 pressing surface (a restraining surface)
32 upper die
321 guide hole
322 pressing surface (a restraining surface)
33, 35 knockouts
341 inclined restraining surface
342 parallel restraining surface
36 tapered die
361, 371 tapered surfaces
372 U-shaped groove
40, 41, 43 punches
401, 411, 431 rack teeth shaped portion
412, 413 tooth bottoms
414 right end tooth
415 adjacent tooth
416 left end tooth
42 punch plate
45 U-shaped groove punch
451 U-shaped groove
46 teeth shaped punch
461 rack teeth shaped portion
51, 52, 53 gaps
61 upper die
611 pressing surface (a restraining surface)
62, 63, 64 lower dies
621 pressing surface (a restraining surface)
631, 641 rack teeth shaped portion
632 arc shaped restraining surface
7 mandrel
71 top surface
72 outer circumference
70 core member

BEST MODE FOR CARRYING OUT THE INVENTION

Hereinafter, embodiments of a steering rack and a manufacturing method the same according to the invention will be described in detail with reference to the drawings.

First Embodiment

Figure 1B:
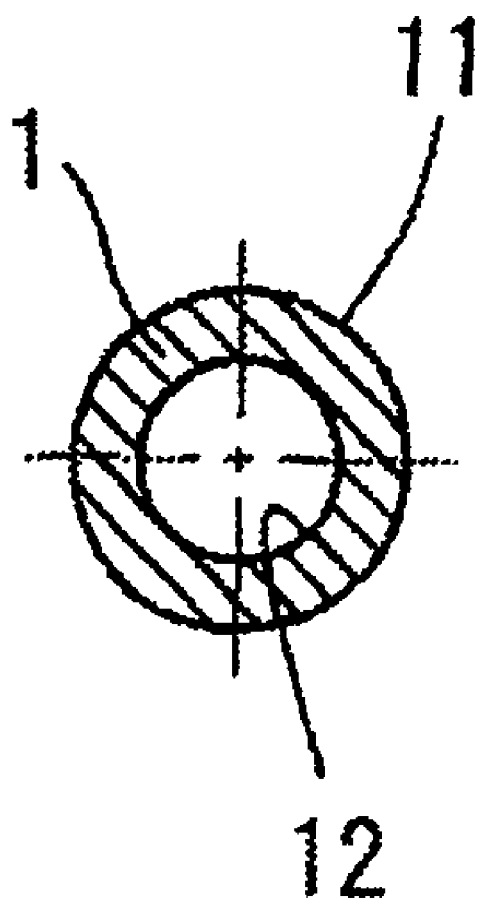
FIG. 1B is a cross-sectional view taken along the line A-A shown in FIG. 1A.

As shown in FIGS. 1A and 1B, a first tubular rack blank 1 according to a first embodiment is formed in a shape of a hollow cylinder so that each of an outer circumference 11 and a bore hole 12 has a circular cross-section. Although, the first rack blank 1 is shaped so that both of the outer circumference 11 and the bore hole 12 have the circular cross-sections in the first embodiment, the shape of the cross-section of each of the outer circumference 11 and the bore hole 12 is not limited to a circle. A tubular blank, which is configured so that each of the outer circumference 11 and the bore hole 12 has an optional cross-sectional shape such as a rectangle and a polygon, can be used.

Figure 2A:
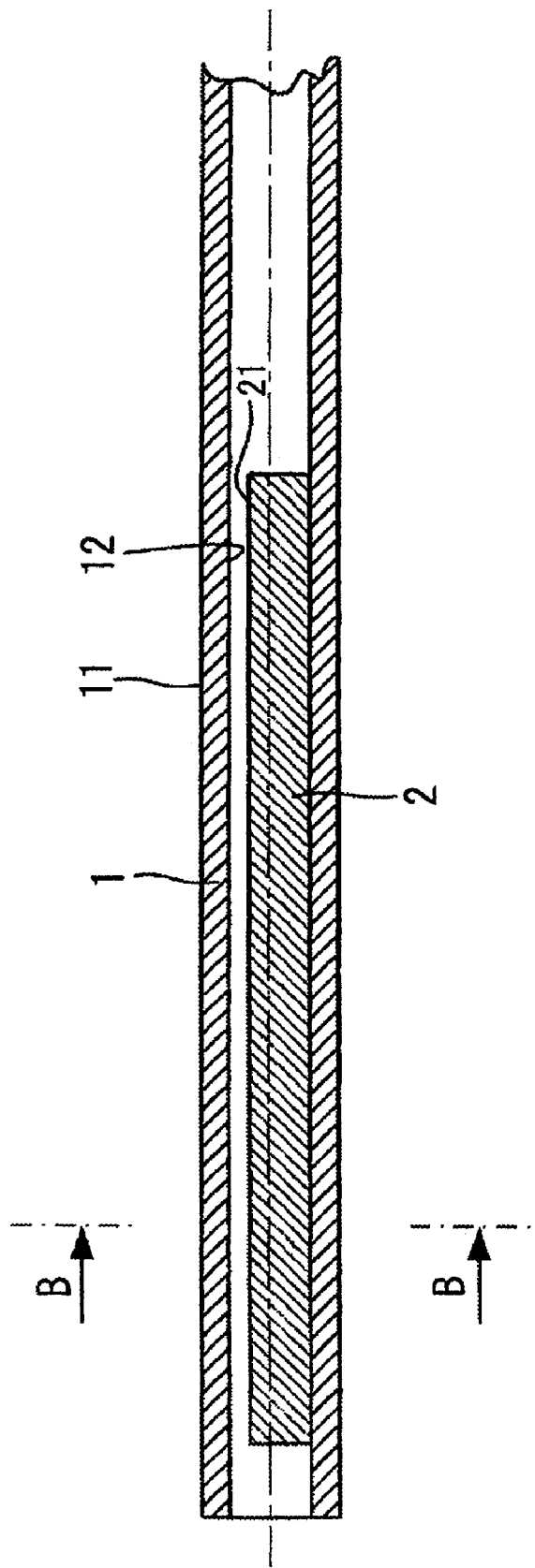
FIG. 2A is an explanatory view of the first embodiment, and illustrates a state in which a second solid rack blank is inserted into a bore hole of the first rack blank shown in FIG. 1A.
Figure 2B:
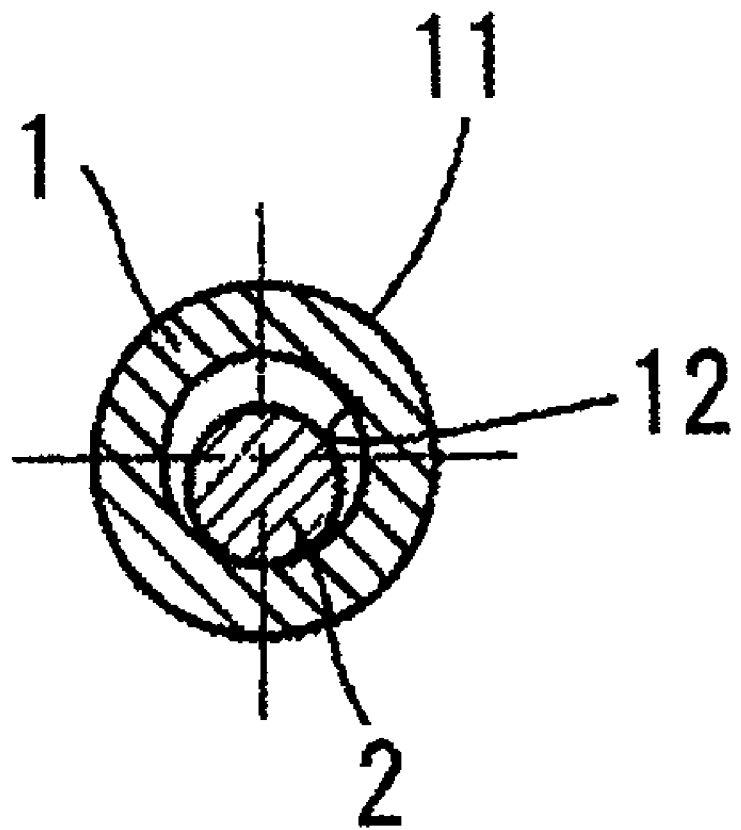
FIG. 2B is a cross-sectional view taken along the line B-B shown in FIG. 2A.

As shown in FIGS. 2A and 2B, a first tubular rack blank 1 having a bore hole, into which a second solid rack blank 2 is inserted, is used as a blank for forming a rack. In the first embodiment, the second rack blank 2 is formed in a shape of a solid cylinder.

Intermediate Forming Process

Figure 3B:
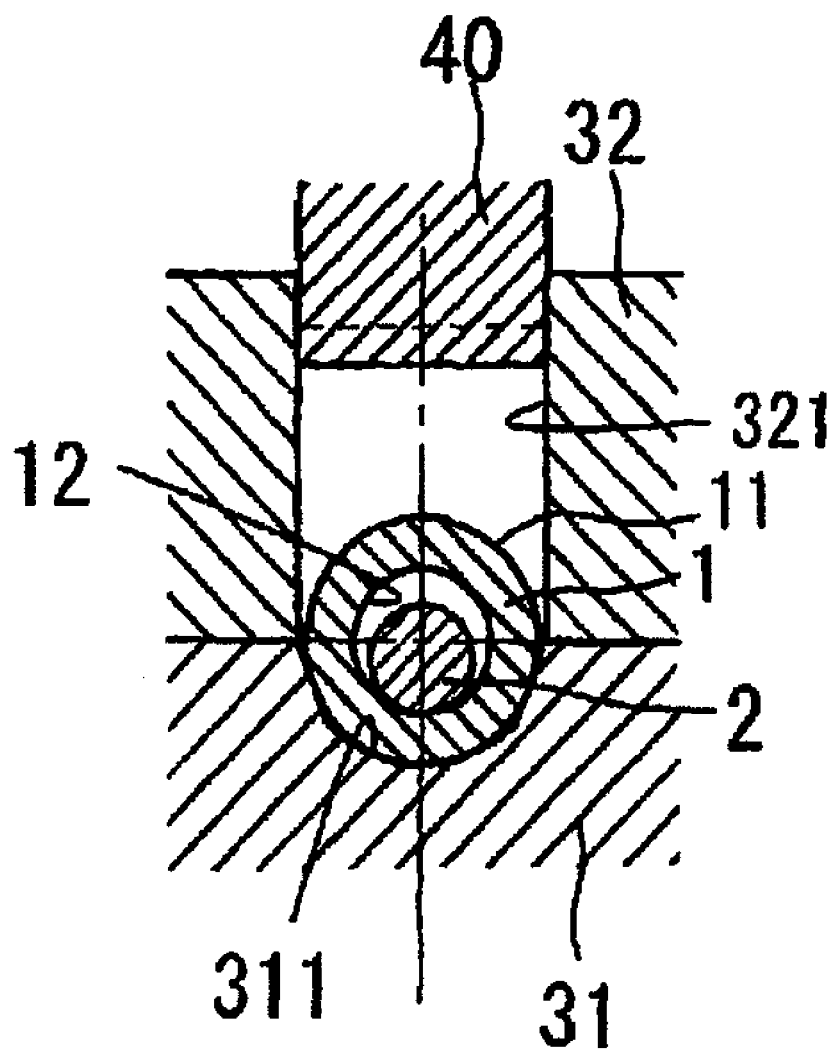
FIG. 3B is a cross-sectional view taken along the line C-C shown in FIG. 3A.

As shown in FIGS. 3A and 3B, a rack forming blank obtained by inserting the second rack blank 2 into the first rack blank 1 is put into between the lower die 31 and the upper die 32. A pressing surface (or restraining surface) 311, which is formed so that the width thereof is slightly narrower than the outer circumference 11 of the first rack blank 1 and which has a polygonal cross-sectional shape, is formed in the lower die 31.

A guide hole 321 used to guide the punch 40 in an up-down direction is formed in the upper die 32. A rough rack teeth shaped portion 401 is formed in the bottom surface of the punch 40 substantially over the entire lateral length shown in FIG. 3A. In the intermediate forming process, the rack teeth shaped portion 401 is pressed to the rack teeth forming portion of an outer circumference 11 of the first rack blank 11 to thereby form rough rack teeth (roughly processed rack teeth).

An axial length L1 of the second rack blank 2 is set to be slightly longer than an axial length L2 of the rack teeth shaped portion 401 of the punch 40 (i.e., a length of the rack teeth formed in the first rack blank 1). Preferably, an axial length L1 of a second rack blank 2 is at least equal to an axial length L2 of the rack teeth shaped portion 401 of the punch 40. Also, a second rack blank 2 is disposed in a bore hole 12 of the first rack blank 1 to cover a rack teeth forming range formed in the first rack blank 1.

A semicircular pressing surface (or restraining surface) 322 having the same cross-sectional shape as that of the outer circumference 11 of the first rack blank 1 on a part of the upper die 32 other than the guide hole 321. Four knockouts 33 are fit into the lower die 31 to be able to slide in an up-down direction. An upward pushing force is always provided to the knockouts 33 by a spring (not shown).

The knockouts 33 press the punch 40 to the first rack blank 1 and support the first rack blank 1 from below by an upward pushing force when the rough rack teeth are formed in the first rack blank 1. Also, upon completion of performing the intermediate forming process, when the punch 40 rises, the knockouts 33 upwardly push the first rack blank 1 by the pushing force of the spring (not shown), and forcibly separate the rack teeth forming portion of the first rack blank 1 from the lower die 31.

Figure 4B:
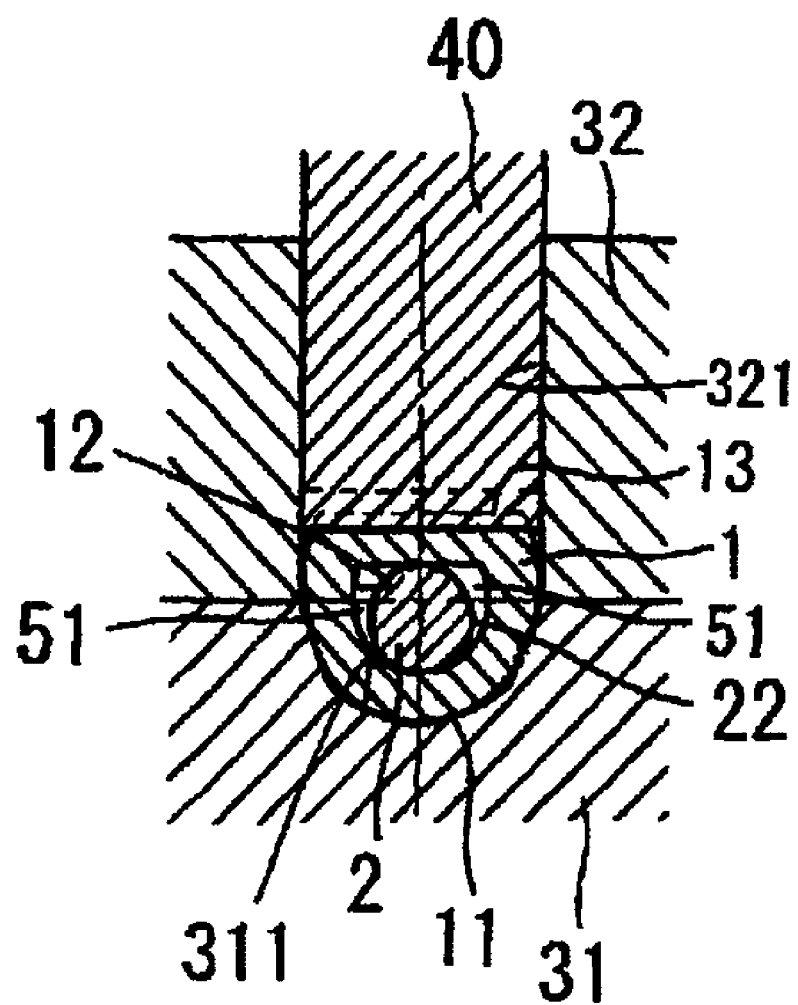
FIG. 4B is a cross-sectional view taken along the line D-D shown in FIG. 4A.

When the punch 40 is downwardly pushed along the guide hole 32, as shown in FIGS. 4A and 4B, the outer circumference 11 of the first rack blank 1 is downwardly pushed to the rack teeth shaped portion 401 of the punch 40. This pushdown starts the forming of the rack teeth 130 toward a part of the outer circumference, which is at the side of the punch 40, so that a surface of the first rack blank 1, which is at the side of the bore hole 12, abuts against the top surface of the second rack blank 2 (i.e., a surface facing the rack teeth forming side of the first rack blank 1).

In a halfway state in forming in the intermediate forming process illustrated in FIGS. 4A and 4B, a thin-walled portion of the first hollow rack blank 1 has only to undergo plastic deformation. Thus, differently from the case of using a solid blank, a forming weight can be low. Additionally, gaps 51, 51 are present between a side perpendicular to the rack teeth forming side of the bore hole 12 of the first rack blank 1 and the outer circumference 22 of the second rack blank 2. Consequently, the die is not put into a closed condition. Therefore, the forming load is small, so that the lifetime of the die is lengthened.

Figure 5A:
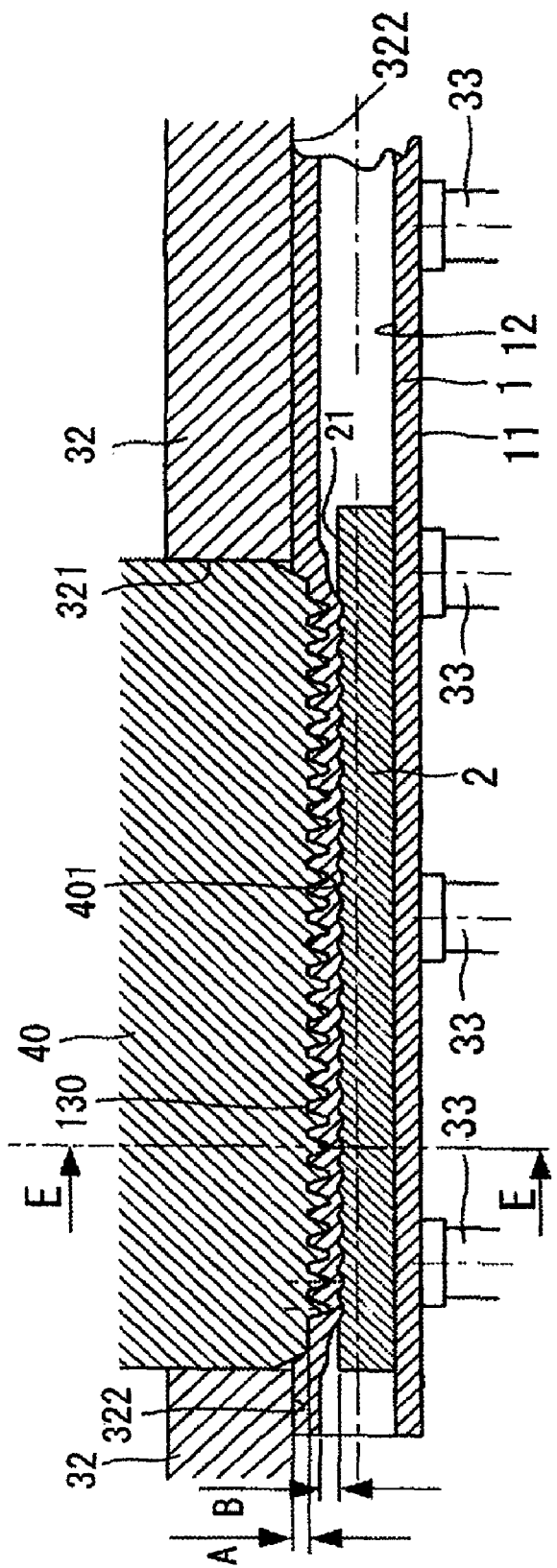
FIG. 5A is an explanatory view illustrating a state at the end of the forming in the intermediate forming process.
Figure 5B:
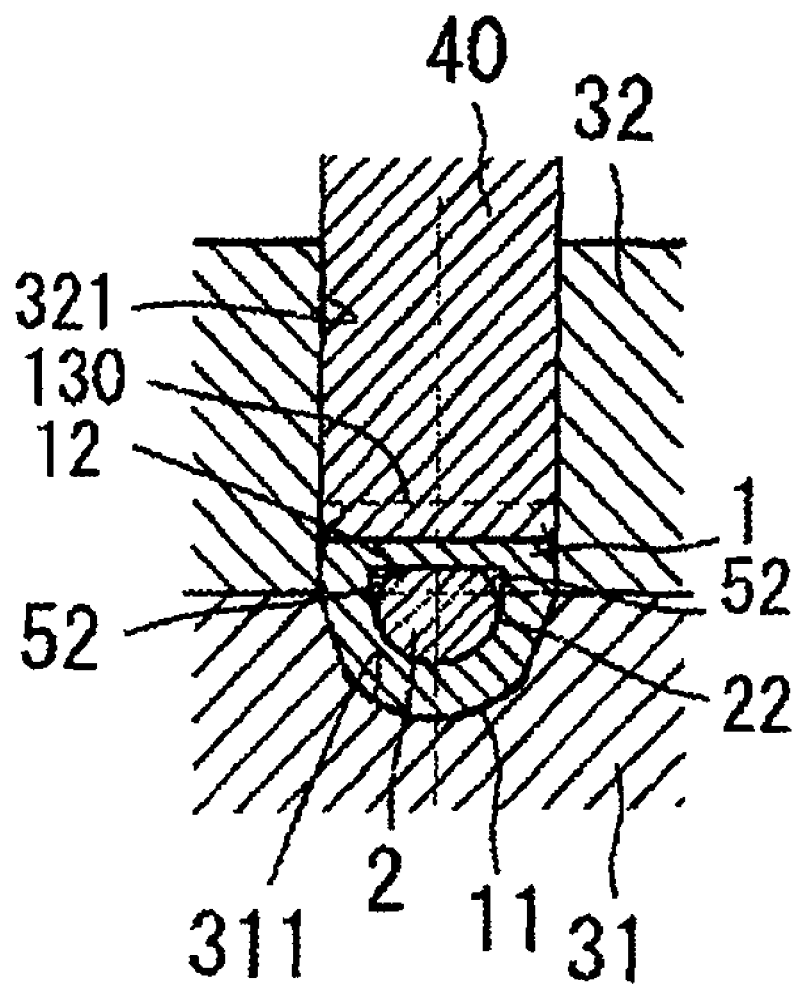
FIG. 5B is a cross-sectional view taken along the line E-E shown in FIG. 5A.

When the punch 40 is further downwardly pushed along the guide hole 321, as shown in FIGS. 5A and 5B, the bore hole 12 of the first rack blank 1 bites into the top surface 21 of the second rack blank 2, while the plastic deformation of the top surface 21. The reaction force causes the blank material to upwardly flow, so that the blank material is effectively used for forming the rack teeth 130 in the first rack blank 1. Consequently, the filling degree, at which the teeth form part is filled with the material, can be increased.

Further, even when the forming of the rack teeth in the intermediate forming process is finished, as shown in FIGS. 5A and 5B, gaps 52, 52 remain between the rack teeth forming side of the bore hole 12 of the first rack blank 1 and the outer circumference 22 of the second rack blank 2. Thus, the die is not put into a closed state. Therefore, the forming load is low. Consequently, the lifetime of the die is lengthened.

Also, because the forming load is small, the cold forming of the rack is possible. The precision of forming the rack teeth is enhanced. Moreover, the top surface 21 of the second rack blank 2 bites into the bore hole 12 of the first rack blank 1, so that the first rack blank 1 and the second rack blank 2 are integrated with each other. Thus, the rigidity of the entire formed rack teeth is increased.

That is, the blank material (or excess thickness material) excluded at the formation of the rack teeth 130 is caused to flow in a space between the bore hole 12 of the first rack 1 and the outer circumference 22 of the second rack blank 2. As shown in FIGS. 5B and 5A, a dimensional relation between a gap B between the bore hole 12 of the first rack blank 1 and the top surface 21 of the second rack blank 2 and a dimension A of a bottom part of the rack teeth shaped portion 401 in the punch 40, which is pushed into the first rack blank 1 is set to be B≧0.7A.

Consequently, a sufficient space between the bore hole 12 of the first rack blank 1 and the outer circumference 22 of the second rack blank 2 is assured. Thus, the rack teeth 130 can be formed at a low forming load.

Sizing Process

Figure 6A:
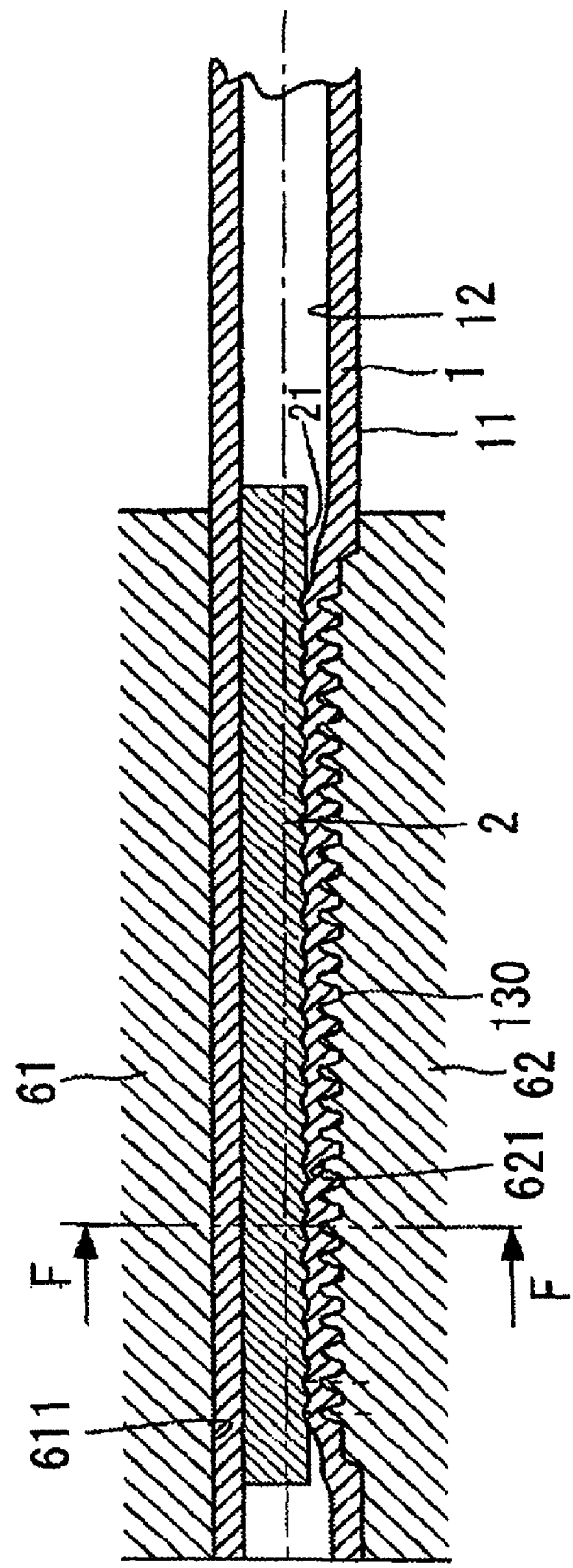
FIG. 6A is a process view illustrating a post-process after the state shown in FIG. 5A and is an explanatory view illustrating a sizing process of forming required rack teeth.
Figure 6B:
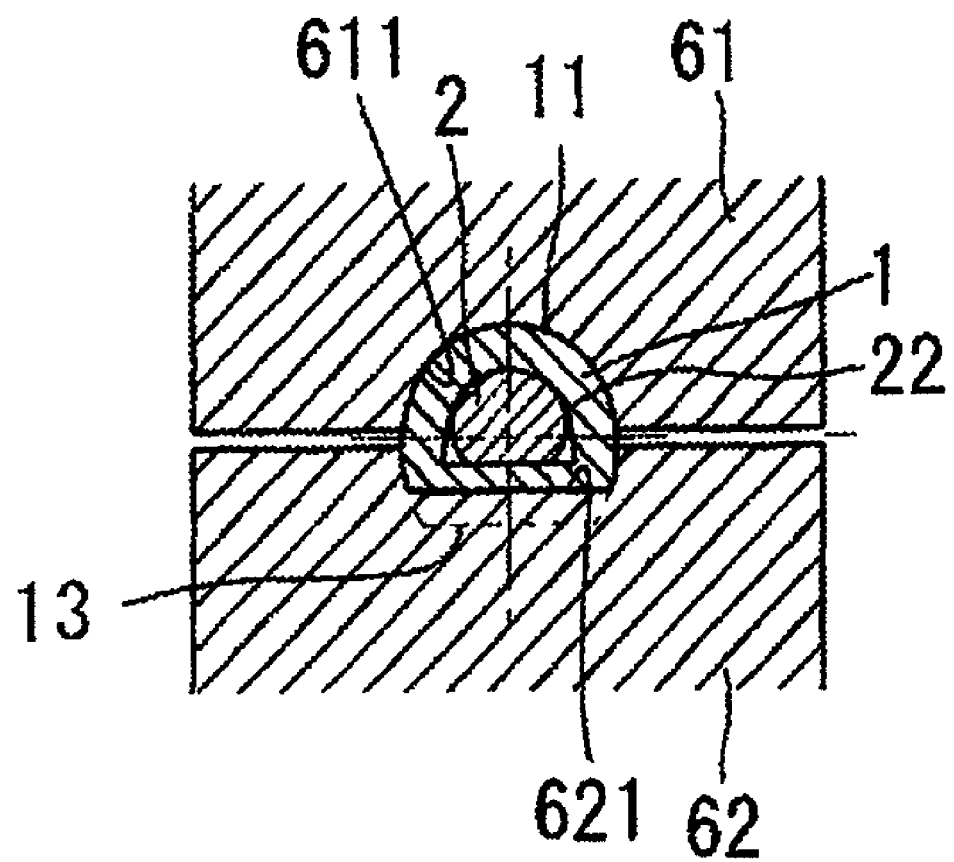
FIG. 6B is a cross-sectional view taken along the line F-F shown in FIG. 6A.

The first rack blank 1, the intermediate forming process of which has been finished, is brought into a sizing-forming die illustrated in FIGS. 6A and 6B. The outer circumference of the first rack blank 1 is pressed between a semicircular pressing surface (or restraining surface) 611 formed on the bottom surface of the upper die 61 and a pressing surface 621 having a required rack teeth shaped portion, which is formed on the top surface of the lower die 62. Consequently, the required rack teeth (i.e., the finish-processed rack teeth) are formed while the width of the outer circumference at the side perpendicular to the rack teeth forming side of the first rack blank 1 is increased.

The width between both sides of the outer circumference at the side perpendicular to the rack teeth side is set in the intermediate forming process to be narrower than the width between both sides of the outer circumference of the required rack teeth. Therefore, it is easy to input the first rack blank 1 to the sizing process. Also, even in a case where the die used in the sizing process has a simple structure including a pair of upper and lower dies, no burr protrudes to the outer circumference of the rack blank. Thus, the number of processes required to remove burrs is reduced.

In the first embodiment, all the blank material (or excess thickness part) excluded at the formation of the rack teeth 130 is accommodated in the space between the bore hole 12 of the first rack blank 1 and the outer circumference 22 of the second rack blank 2. Thus, no burr is generated in the formed rack. Consequently, the number of processes required to remove burrs is reduced. Additionally, because the tubular rack blank is used, the part other than the rack teeth forming portion is lightened. Further, the shape of the rear-side of the rack teeth is simple. Accordingly, the shape of the rack guide configured to guide the rear side of the rack teeth is simplified.

Also, the shape of the die is simple. The forming can be performed by a general purpose press. Thus, a die manufacturing cost and a forming equipment cost can be reduced. Because no mandrel is used, a processing time is short. Additionally, the sufficient thickness of the bottom of each of the rack teeth is assured. Moreover, the strength of the rack teeth is enhanced.

Second Embodiment

Next, a second embodiment of the invention will be described.

In the following description, only a structural part differing from the first embodiment will be described, and the overlapping description will be omitted.

The second embodiment is an example which assures a gap between the bore hole 12 of the first rack blank 1 and the top surface 21 of the second rack blank 2 at the forming by forming teeth on the top surface 21 of the second rack blank 2. Consequently, the forming load is further reduced. The convex part of the top surface 21 enables the more efficient use of the blank material for the forming of the rack blank 130 of the first rack blank 1. Consequently, the filling degree, at which the teeth is filled with the blank material, is increased.

Figure 7B:
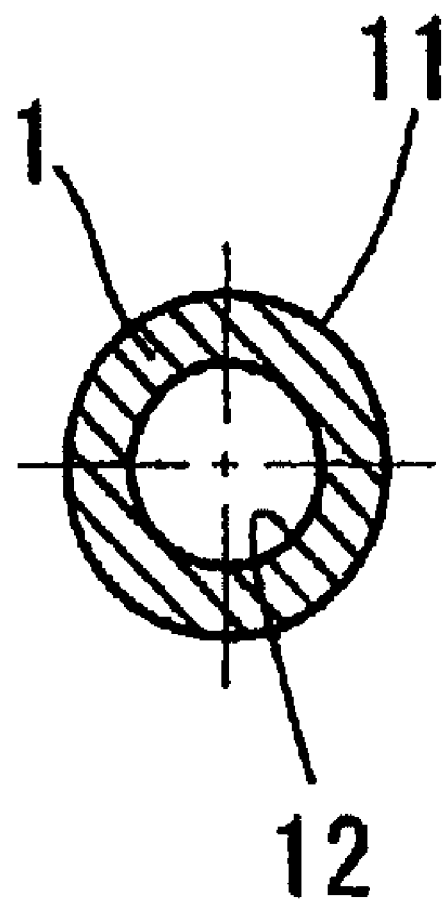
FIG. 7B is a cross-sectional view taken along the line G-G shown in FIG. 7A.

As shown in FIGS. 7A and 7B, the first tubular rack blank 1 of the second embodiment is formed like a hollow cylinder so that the cross-section of each of the outer circumference 11 and the bore hole 12 is circle. The first tubular rack blank 1 of the second embodiment has completely the same shape as that of the first rack blank 1 of the first embodiment.

Figure 8B:
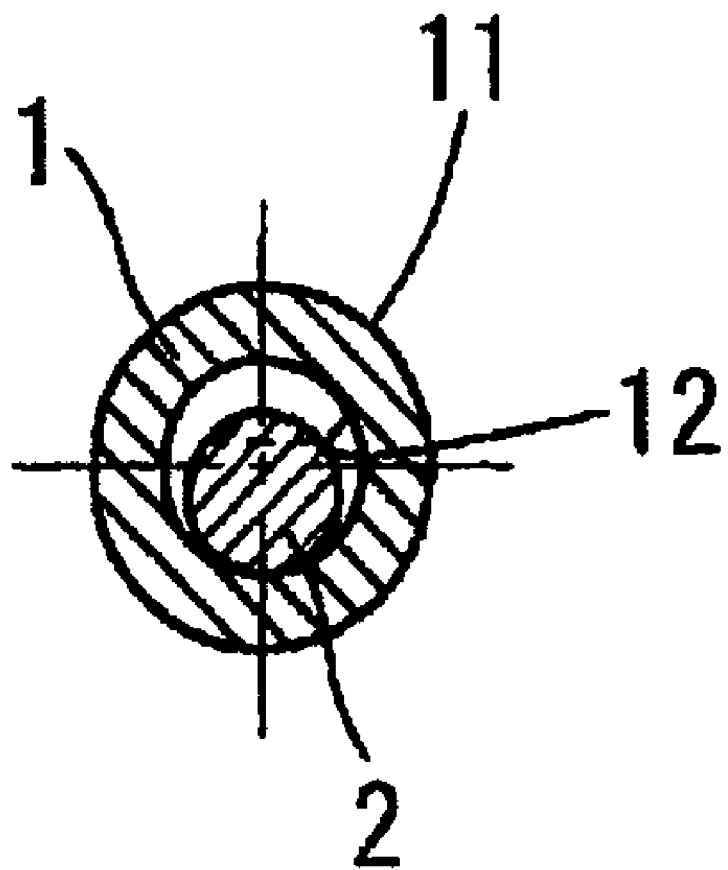
FIG. 8B is a cross-sectional view taken along the line H-H shown in FIG. 8A.

As shown in FIGS. 8A and 8B, the second rack blank 2 to be inserted into the bore hole 12 is solid and cylindrical. Teeth 23, which are equal in the number to rack teeth 130 (corresponding to the rack teeth shaped portion 401 of the punch 40) formed in the first rack blank 1 at the same pitch, are formed on the top surface 21 (i.e., a surface facing the rack teeth forming side of the first rack blank 1) of the second rack blank 2.

Intermediate Forming Process

Figure 9A:
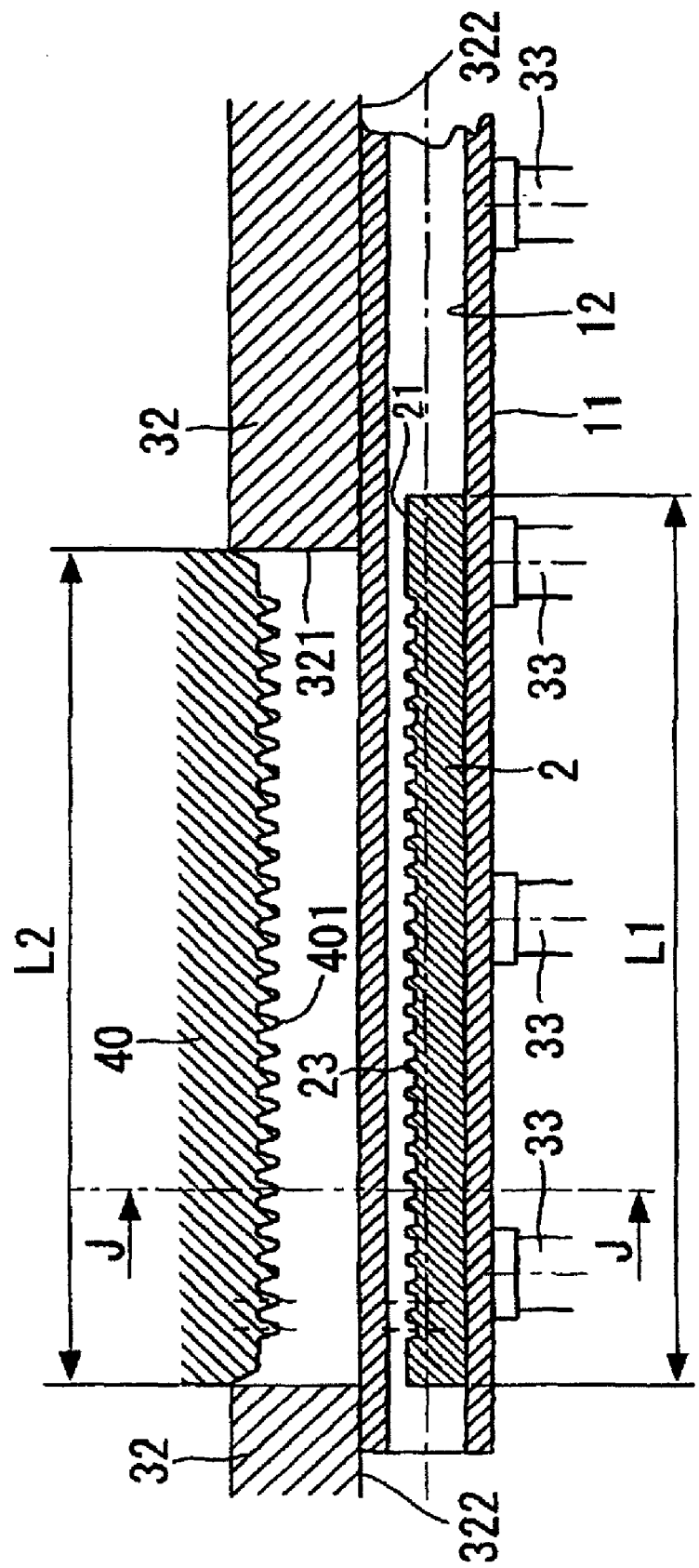
FIG. 9A is a process view illustrating a manufacturing method of a rack according to the second embodiment and is an explanatory view illustrating a state in which the first tubular rack blank is attached to a die used in an intermediate forming process of forming a rough rack.
Figure 9B:
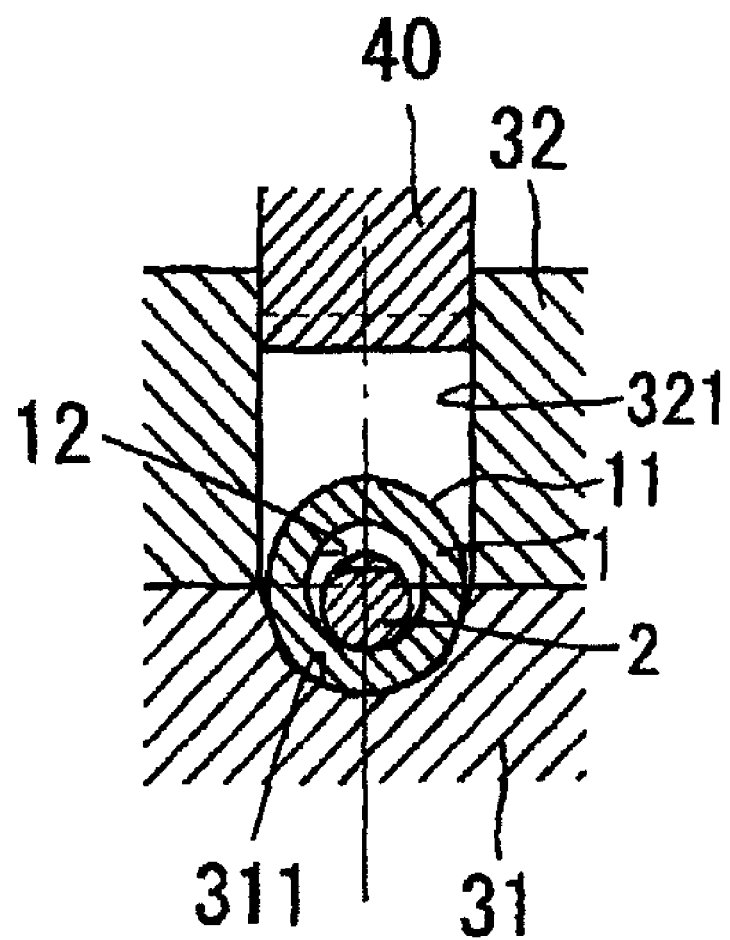
FIG. 9B is a cross-sectional view taken along the line J-J shown in FIG. 9A.

As shown in FIGS. 9A and 9B, the shape of each of the lower die 31, the upper die 32, the punch 40, and the knockouts 33 are the same as that of an associated component of the first embodiment. The axial length L1 of the second rack blank 2 is set to be slightly longer than the axial length L2 (i.e., the length of the rack teeth forming portion formed in the first rack blank 1) of the rack teeth shaped portion 401 of the punch 40.

Further, the second rack blank 2 is disposed in the bore hole 12 of the first rack blank 1 to cover a rack teeth forming range formed in the first rack blank 1. Also, the second rack blank 2 is disposed in the bore hole 12 of the first rack blank 1 so that the position of a concave part of the teeth 23 of the top surface 21 of the second rack blank 2 coincides with the position of a convex part of the teeth of the rack teeth shaped portion 401 of the punch 40.

Figure 10B:
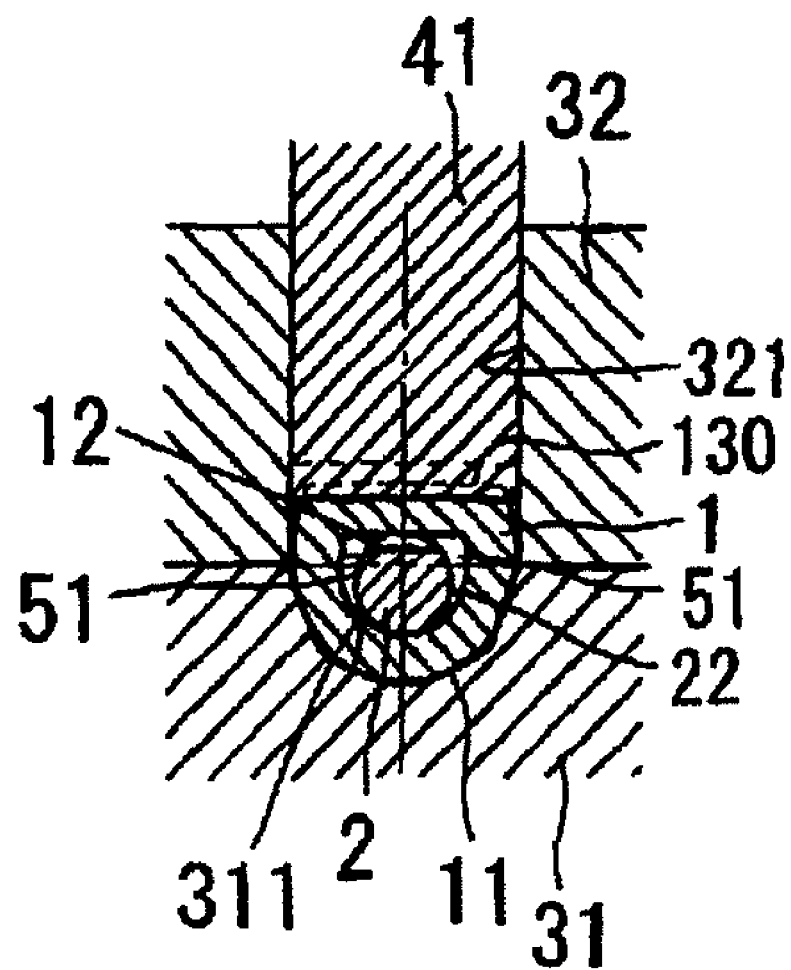
FIG. 10B is a cross-sectional view taken along the line K-K shown in FIG. 10A.

When the punch 40 is downwardly pushed along the guide hole 321 in this state, as shown in FIGS. 10A and 10B, the outer circumference 11 of the first rack blank 1 is downwardly pushed by the rack teeth shaped portion 401 of the punch 40. This pushdown starts the forming of the rack teeth 130 toward a part of the outer circumference 11 of the first rack blank 1, which is at the side of the punch 40, so that the bore hole 12 of the first rack blank 1 abuts against the top surface 21 of the second rack blank 2 (i.e., a surface facing the rack teeth forming side of the first rack blank 1).

In a halfway state in forming in the intermediate forming process illustrated in FIGS. 10A and 10B, a thin-walled portion of the first hollow rack blank 1 has only to undergo plastic deformation. Thus, differently from the case of using a solid blank, a forming weight can be low. Additionally, gaps 51, 51 are present between a side perpendicular to the rack teeth forming side of the bore hole 12 of the first rack blank 1 and the outer circumference 22 of the second rack blank 2. Consequently, the die is not put into a closed condition. Accordingly, the forming load is small, so that the lifetime of the die is lengthened.

Additionally, in the second embodiment, a gap 24 is present between the concave part of the teeth 23 of the top surface 21 of the second rack blank 2 and the bore hole 12 of the first rack blank 1. The forming load is further smaller than the first embodiment.

Figure 11B:
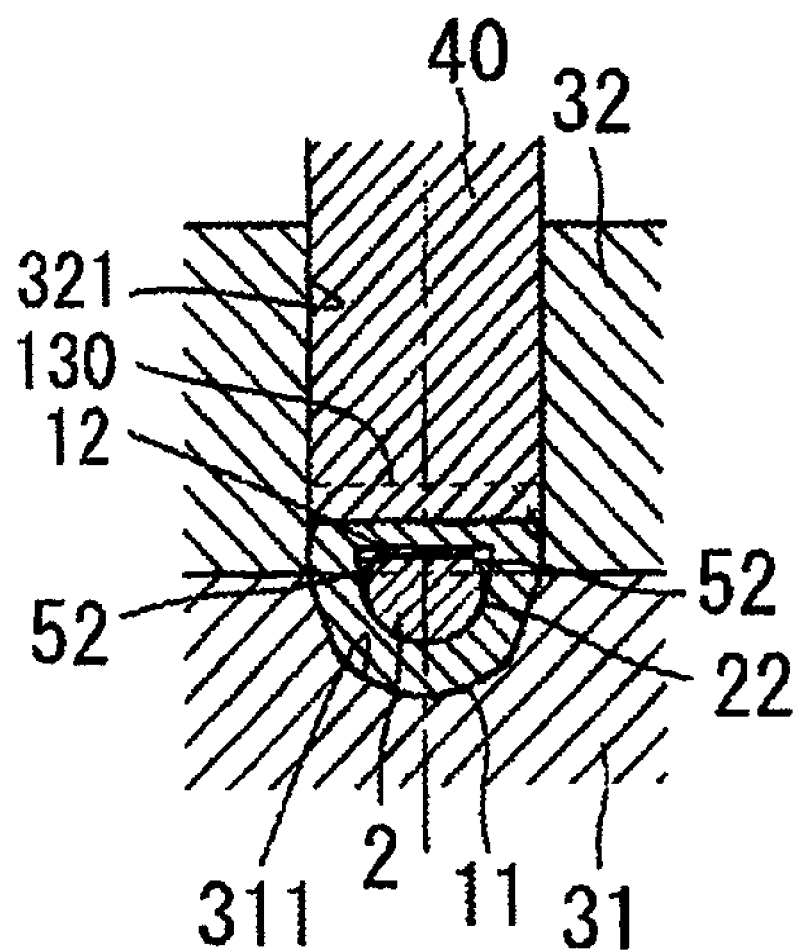
FIG. 11B is a cross-sectional view taken along the line L-L shown in FIG. 11A.

When the punch 40 is further downwardly pushed along the guide hole 321, as shown in FIGS. 11A and 11B, the inner circumference 12 of the first rack blank 1 bites into the teeth 23 of the top surface 21 of the second rack blank 2, so that the convex part of the teeth 23 serves to effectively cause the blank material to upwardly flow. Thus, the filling degree, at which the teeth are filled with the material, is further enhanced, as compared with the first embodiment.

Further, even when the forming of the rack teeth in the intermediate forming process is finished, as shown in FIGS. 11A and 11B, gaps 52, 52 remain between the rack teeth forming side of the bore hole 12 of the first rack blank 1 and the outer circumference 22 of the second rack blank 2. Thus, the die is not put into a closed state. Therefore, the forming load is low. Consequently, the lifetime of the die is lengthened.

Moreover, the bore hole 12 of the first rack blank 1 bites into the top surface 21 of the second rack blank 2, so that the first rack blank 1 and the second rack blank 2 are integrated with each other. Thus, the rigidity of the entire formed rack teeth is increased.

Sizing Process

Figure 12A:
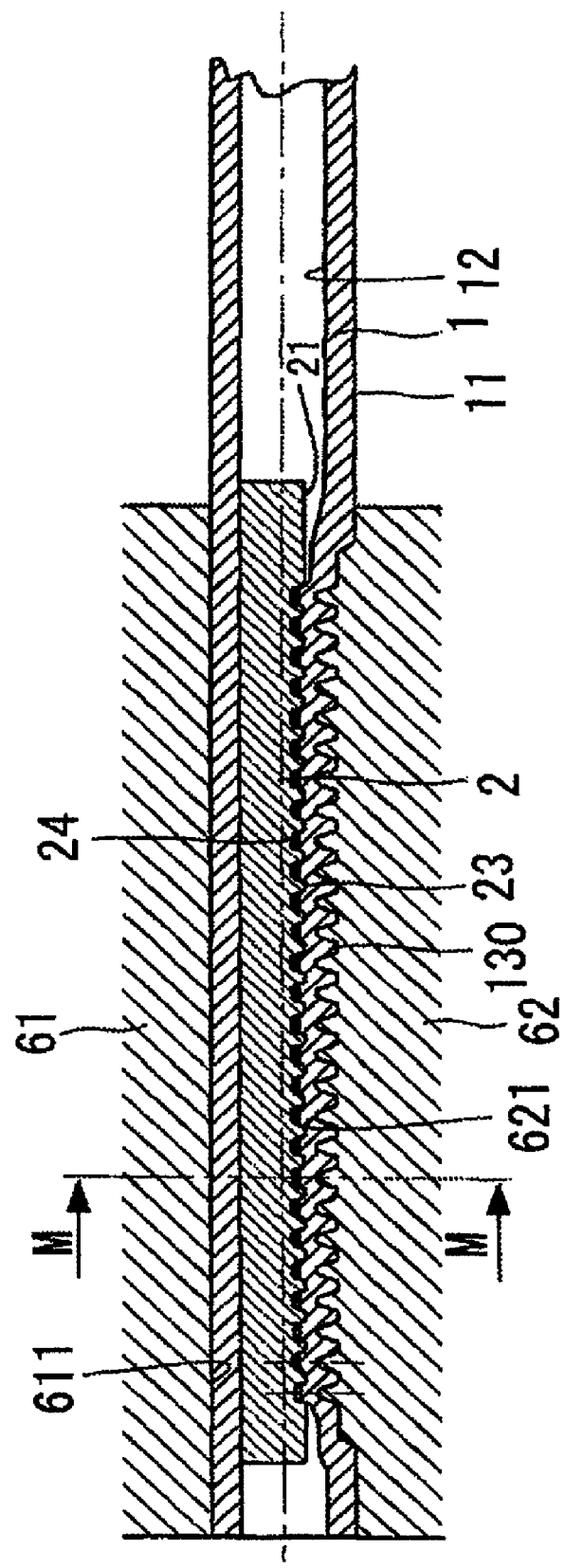
FIG. 12A is a process view illustrating a post-process after the state shown in FIG. 11A and is an explanatory view illustrating a sizing process of forming required rack teeth.
Figure 12B:
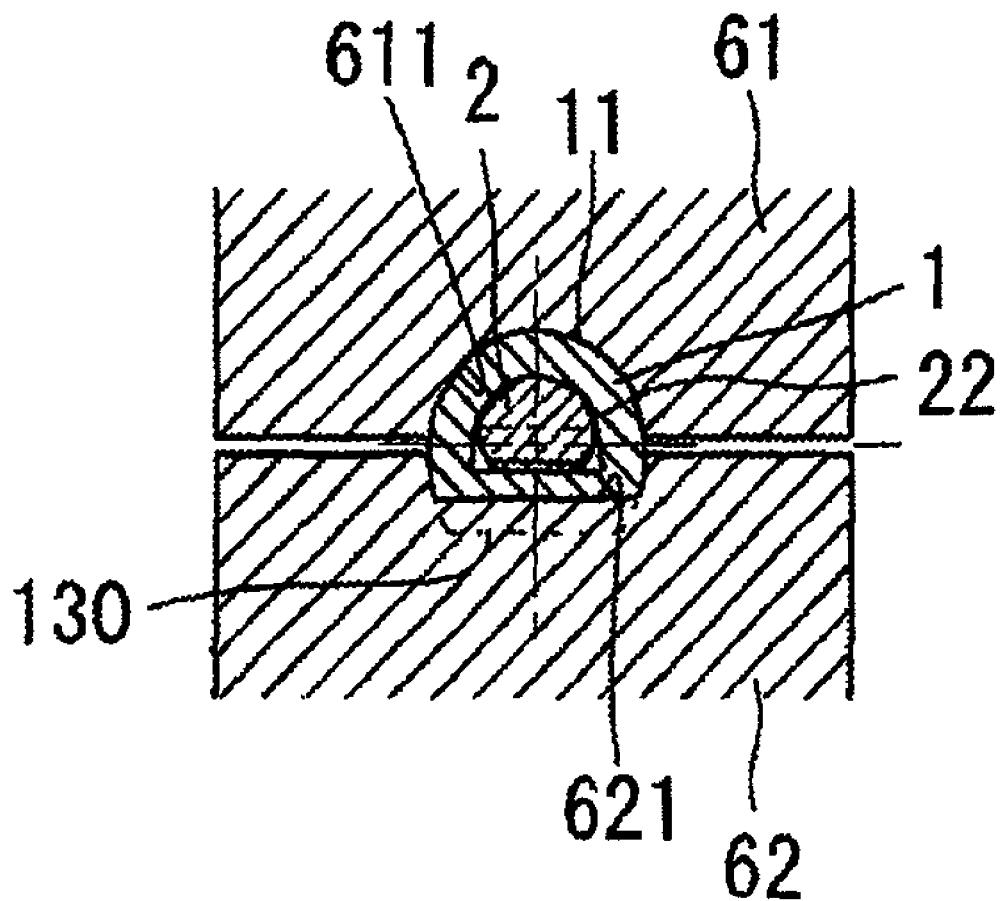
FIG. 12B is a cross-sectional view taken along the line M-M shown in FIG. 12A.

The first rack blank 1, the intermediate forming process of which has been finished, is brought into a sizing-forming die illustrated in FIGS. 12B and 12A. The outer circumference of the first rack blank 1 is pressed between a semicircular pressing surface (or restraining surface) 611 formed on the bottom surface of the upper die 61 and a pressing surface 621 having a required rack teeth shaped portion, which is formed on the top surface of the lower die 62. Consequently, the required rack teeth (i.e., the finish-processed rack teeth) are formed while the width of the outer circumference at the side perpendicular to the rack teeth forming side of the first rack blank 1 is increased.

Third Embodiment

Next, a third embodiment of the invention will be described. In the following description, only a structural part differing from the second embodiment will be described, and the overlapping description will be omitted.

As shown in FIGS. 8A and 8B, the second rack blank 2 to be inserted into the bore hole 12 is solid and cylindrical in the second embodiment. The teeth 23, which are equal in the number to rack teeth 130 formed in the first rack blank 1 at the same pitch, are formed on the top surface 21 of the second rack blank 2. However, the shape of the second rack blank 2 is not limited to the cylindrical shape.

Figure 13B:
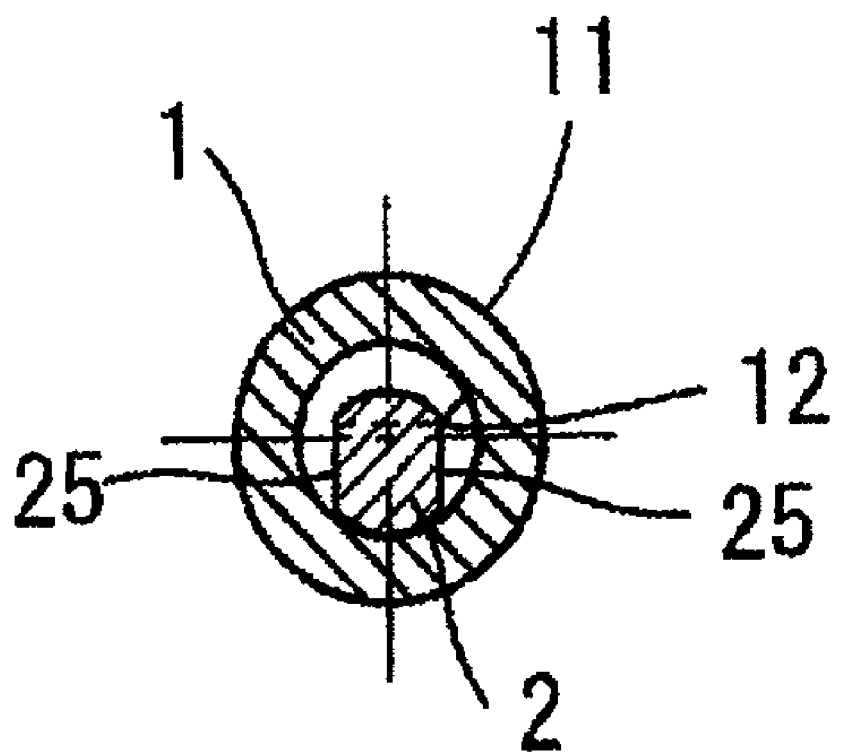
FIG. 13B is a cross-sectional view taken along the line N-N shown in FIG. 13A.

That is, according to the third embodiment illustrated in FIGS. 13A and 13B, flat surfaces 25, 25 are formed over the entire length of the second rack blank 2 on both sides of the outer circumference at the side perpendicular to the rack teeth forming side of the first rack blank 1, respectively. Teeth 23, which are equal in the number to the rack teeth 130 formed in the first rack blank 1 at the same pitch, are formed on the top surface 21 of the second rack blank 2. However, the teeth 23 can be omitted.

Fourth Embodiment

Figure 14A:
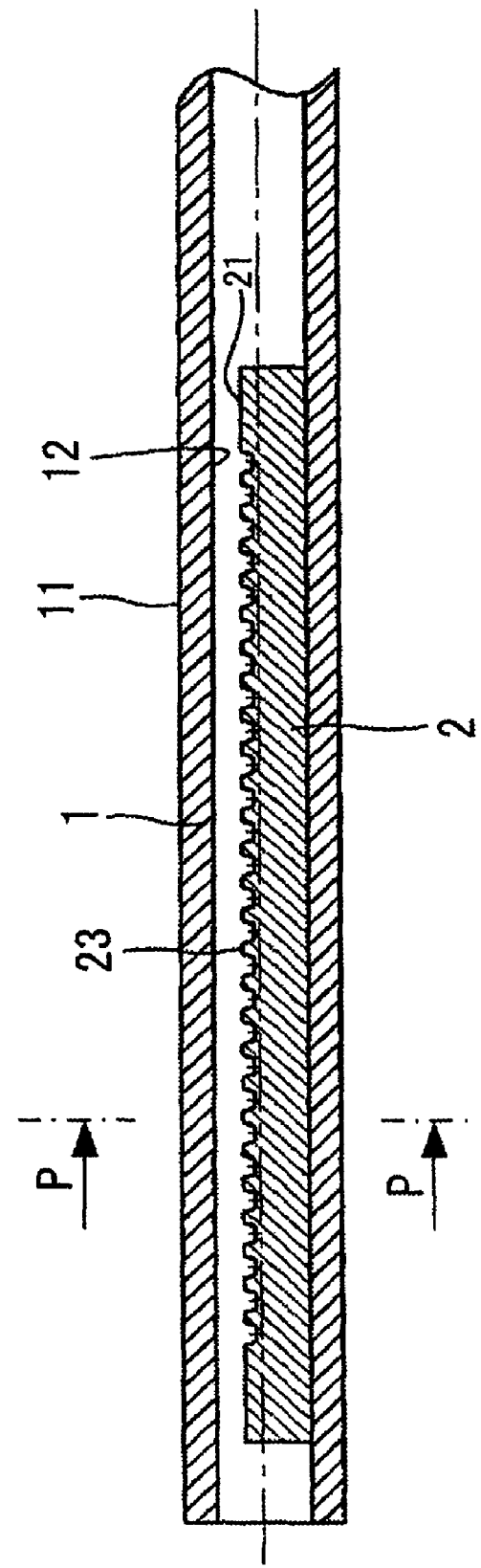
FIG. 14A is an explanatory view of a fourth embodiment, and illustrates a modification of the second uneven solid rack blank to be inserted into the bore hole of the first rack blank.
Figure 14B:
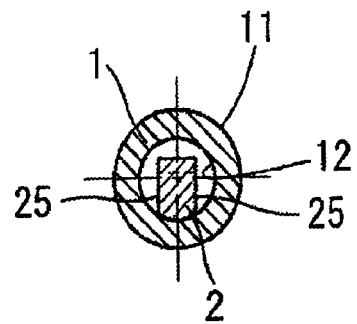
FIG. 14B is a cross-sectional view taken along the line P-P shown in FIG. 14A.

Further, according to a fourth embodiment illustrated in FIGS. 14A and 14B, flat surfaces 25, 25 are formed over the entire length of the second rack blank 2 on both sides of the outer circumference at the side perpendicular to the rack teeth forming side of the first rack blank 1, respectively. The top surface 21 of the second rack 2 is also formed to be a flat surface. Additionally, teeth 23, which are equal in the number to the rack teeth 130 formed in the first rack blank 1 at the same pitch, are formed on the top surface 21 formed to be flat. However, the teeth 23 can be omitted.

Fifth Embodiment

Hereinafter, a fifth embodiment of the invention is described with reference to FIGS. 15A to 22.

First Step of Intermediate Forming Process

Figure 15A:
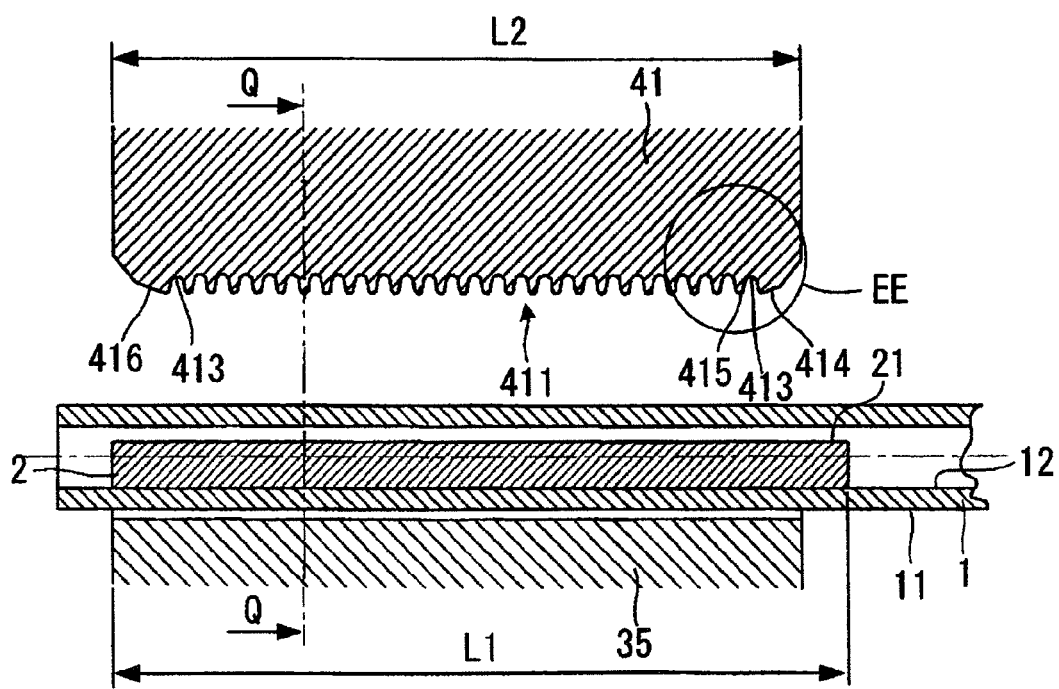
FIG. 15A is a process view illustrating a manufacturing method of a rack according to fifth embodiment and is an explanatory view illustrating a state in which a first tubular rack blank having a bore hole, into which a second solid rack blank is inserted, is attached to a die used in a first step of an intermediate forming process of forming a rough rack.
Figure 15B:
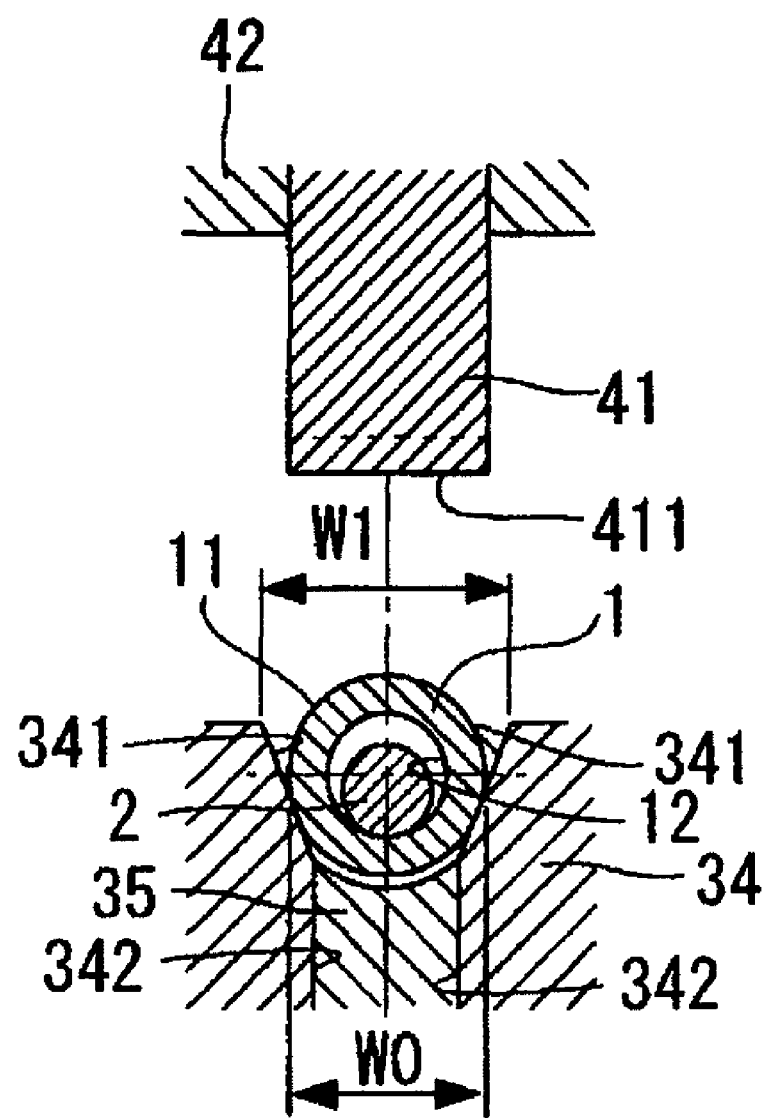
FIG. 15B is a cross-sectional view taken along the line Q-Q shown in FIG. 15A.

A rack forming blank obtained by inserting a second rack blank 2, which is the same as that of the first embodiment, into a first rack blank 1, which is the same as that of the first embodiment, is prepared. As shown in FIGS. 15A and 15B, the outer circumference 11 of the first rack blank 1 is restrained by the lower die 34. A punch 41 having a rough rack teeth shaped portion is pressed to a rack teeth forming portion formed on the outer circumference of the rack blank 1 to thereby form rough rack teeth (i.e., roughly processed rack teeth).

The punch 41 is attached to a punch plate 42 of the bottom surface of an upwardly and downwardly movable ram (not shown) of a press machine. A rough rack teeth shaped portion 411 is formed substantially over the entire lateral length, as viewed in FIG. 15A. In a first step of the intermediate forming process, first step processing is performed so that this rack teeth shaped portion 411 is pressed to the rack teeth forming portion of the outer circumference 11 of the rack blank 1 to thereby form rough rack teeth (i.e., roughly processed rack teeth).

The axial length L1 of the second rack blank 2 is set to be slightly longer than an axial length L3 (i.e., a length of the rack teeth formed in the first rack blank 1) of the rack teeth shaped portion 411 of the punch 41. Preferably, an axial length L1 of a second rack blank 2 is at least equal to an axial length L3 of the rack teeth shaped portion 411 of the punch 41. Also, a second rack blank 2 is disposed in a bore hole 12 of the first rack blank 1 to cover a rack teeth forming range formed in the first rack blank 1.

Inclined restraining surfaces 341, 341 are formed on an upper side of the lower die 34. Parallel restraining surfaces 342, 342 are continuously formed by being connected to the lower sides of the inclined restraining surfaces 341, 341. The width W1 between the upward opening ends of the inclined restraining surfaces 341, 341 is set to be slightly larger than an outside dimension WO of the outer circumference 11 of the first rack blank 1. The width of the inclined restraining surface 341 linearly decreases toward a downward direction (i.e., a direction in which the punch 41 is pressed), as viewed in FIG. 15B. The inclined restraining surface 341 is formed in parallel to a central axis of the first rack blank 1 by being tapered with respect to a perpendicular surface passing through the central axis of the first rack blank 1.

A knockout 35 is fit between the parallel restraining surfaces 342, 342 to be able to slide in an up-down direction. An upward pushing force is always provided to the knockout 35 by a spring (not shown). When the knockout 35 presses the punch 41 to the first rack blank 1 to form rough rack teeth in the first rack blank 1, the knockout 35 supports the first rack blank 1 from below by an upward pushing force when the rough rack teeth are formed in the first rack blank 1. Also, upon completion of performing the intermediate forming process, when the punch 40 rises, the knockout 35 upwardly pushes the first rack blank 1 by the pushing force of the spring (not shown), and forcibly separates the first rack blank 1 from the lower die 31.

Figure 15C:
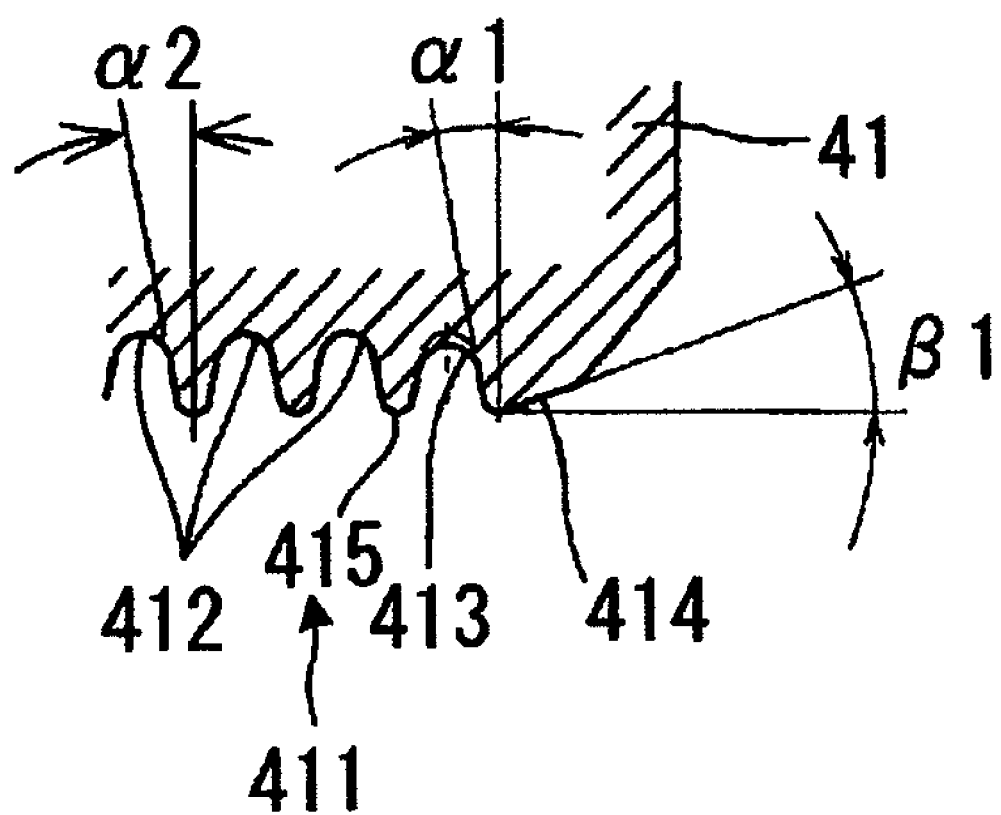
FIG. 15C is an enlarged cross-sectional view of a part EE shown in FIG. 15A.

As shown in FIG. 15C, the rack teeth shaped portion 411 of the punch 41 used in the first step of the intermediate forming process is formed at a pressure angle $\alpha 2$ (in the fifth embodiment of the invention, the a pressure angle $\alpha 2$ is 10 degrees), which is less than the pressure angle (in the fifth embodiment of the invention, this pressure angle is 20 degrees). An amount of blank material needed for forming the rack teeth having a shape in a finished product is assured at a small forming load in the rack teeth formed in the first step.

Also, the strength and the durability of the punch 41 are enhanced by performing the rounding of the tooth bottoms 412 of the rack teeth shaped portion in the punch 41 used in the first step. The tooth bottoms 413, 413 at both lateral ends of the rack teeth shaped portion 411 are set so that a rounding dimension is larger than the rounding dimension of the tooth bottom 412 at the other portion. Consequently, the strength and the durability of the punch 41 are further enhanced.

Additionally, the rack teeth shaped portion 411 of the punch 41 used in the first step is set so that the pressure angle $\alpha 1$ (i.e., the pressure angle at the side of the adjacent tooth 415) at the left side of a right end tooth 414, as viewed in FIG. 15A, is 10 degrees. Also, the inclination of the tooth form at the right side (i.e., the end-side tooth form) of the right-end tooth 414 is set so that an angle $\beta 1$ formed between a straight line (i.e., an axis line of the first rack blank 1) extending rightwardly and horizontally from the tooth edge of the tooth 414 and the right-side tooth form is 20 degrees. The left-end tooth 416 is formed to have the same shape as that of the right-end tooth 414, as viewed in FIG. 15A.

The strength and the durability of the punch 41 are enhanced by forming the teeth at both ends of the rack teeth shaped portion 411 into this shape. Further, the first rack blank 1 is suppressed from extending in the direction of an axis line thereof at the formation of the rough rack teeth. Consequently, the pitch precision of the formed rack teeth can be enhanced. Preferably, the pressure angle $\alpha 1$ of each of the left-end tooth 414 and the right-end tooth 415 ranges from 0 to 45 degrees. Preferably, the angle $\beta 1$ ranges from 5 degrees to 45 degrees.

Figure 16A:
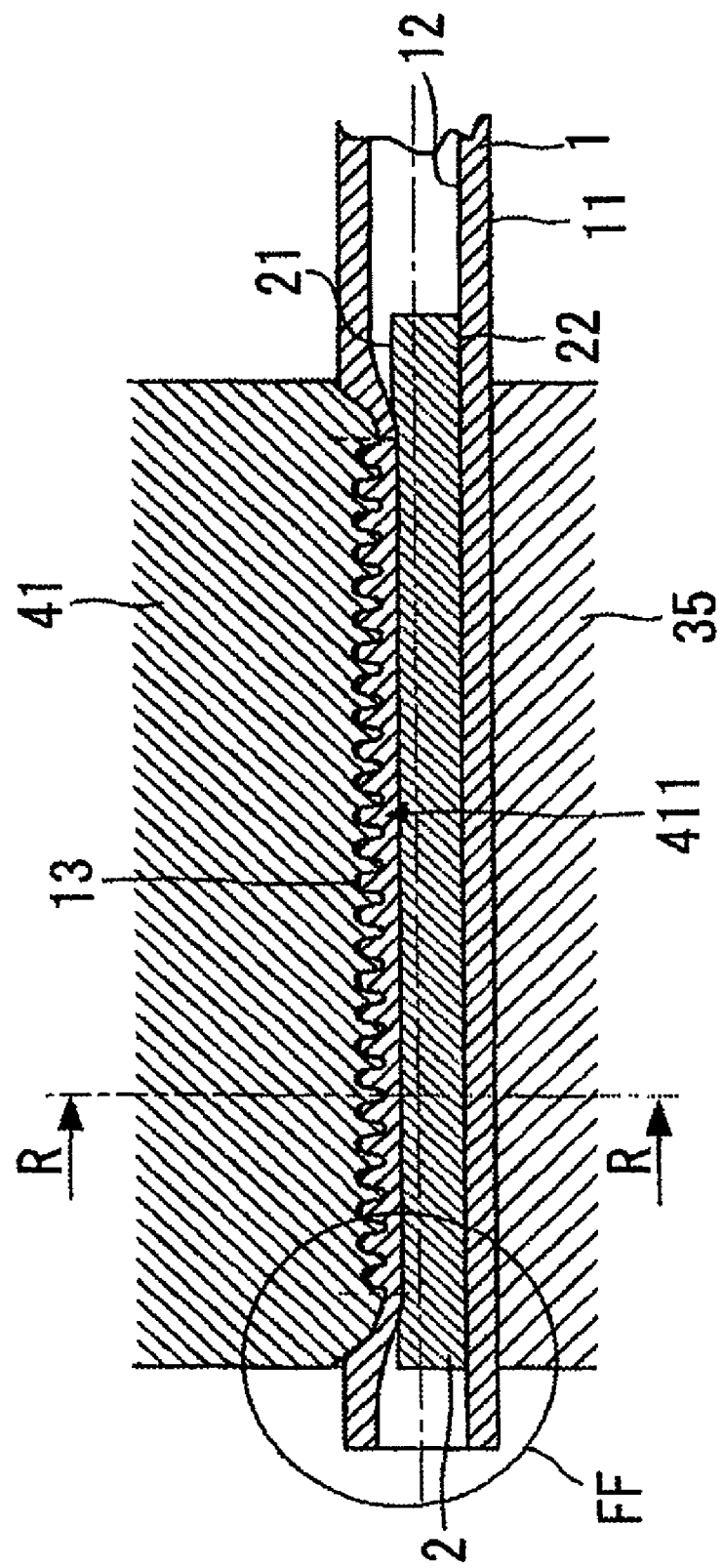
FIG. 16A is an explanatory view illustrating a state at the end of the forming in the first step of the intermediate forming process.
Figure 16B:
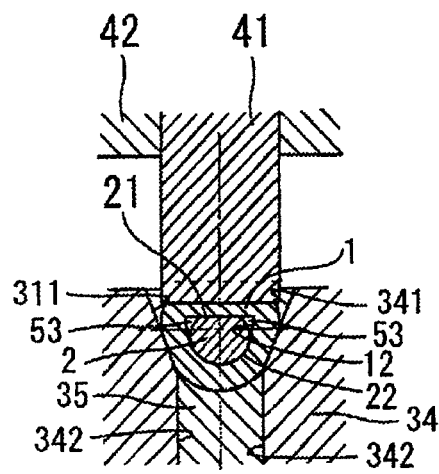
FIG. 16B is a cross-sectional view taken along the line R-R shown in FIG. 16A.
Figure 16C:
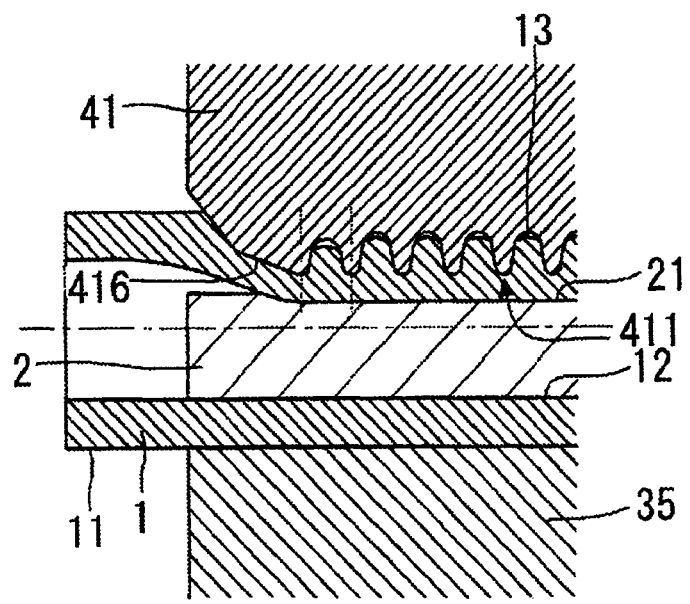
FIG. 16C is an enlarged cross-sectional view of a part FF shown in FIG. 16A.

When the punch 41 is downwardly pushed, the outer circumference 11 of the first rack blank 1 is downwardly pushed to the rack teeth shaped portion 411 of the punch 41. As shown in FIGS. 16A and 16B, this pushdown causes the forming of the rack teeth 13 in the outer circumference 11 of the first rack blank 1, which is at the side of the punch 41, so that the bore hole 12 of the first rack blank 1 abuts against the top surface 21 of the second rack blank 2 (i.e., a surface facing the rack teeth forming side of the first rack blank 1).

In a halfway state in forming in the intermediate forming process from a state illustrated in FIGS. 15A and 15B to a state illustrated in FIGS. 16A and 16b, a thin-walled portion of the first hollow rack blank 1 has only to undergo plastic deformation. Thus, differently from the case of using a solid blank, a forming weight can be low. Additionally, a gap is present between a side perpendicular to the rack teeth forming side of the bore hole 12 of the first rack blank 1 and the outer circumference 22 of the second rack blank 2. Consequently, the die is not put into a closed condition. Therefore, the forming load is small, so that the lifetime of the die is lengthened.

When the punch 41 is further downwardly pushed, as shown in FIGS. 16A and 16B, the bore hole 12 of the first rack blank 1 bites into the top surface 21, while the plastic deformation of the top surface 21. The reaction force causes the blank material to upwardly flow, so that the blank material is effectively used for forming the rack teeth 13 in the first rack blank 1. Consequently, the filling degree, at which the teeth form part is filled with the material, can be increased.

Further, even when the forming of the rack teeth in the intermediate forming process is finished, as shown in FIGS. 16A and 16B, gaps 53, 53 remain between the rack teeth forming side of the bore hole 12 of the first rack blank 1 and the outer circumference 22 of the second rack blank 2. Thus, the die is not put into a closed state. Accordingly, the forming load is low. Consequently, the lifetime of the die is lengthened. Further, the blank material (or excess thickness material) excluded at the formation of the rack teeth 13 is caused to flow in a space between the bore hole 12 of the first rack 1 and the outer circumference 22 of the second rack blank 2.

Also, because the forming load is small, the cold forming of the rack is possible. The precision of forming the rack teeth is enhanced. Moreover, the top surface 21 of the second rack blank 2 bites into the bore hole 12 of the first rack blank 1, so that the first rack blank 1 and the second rack blank 2 are integrated with each other. Thus, the rigidity of the entire formed rack teeth is increased.

Second Step of Intermediate Forming Process

Figure 17A:
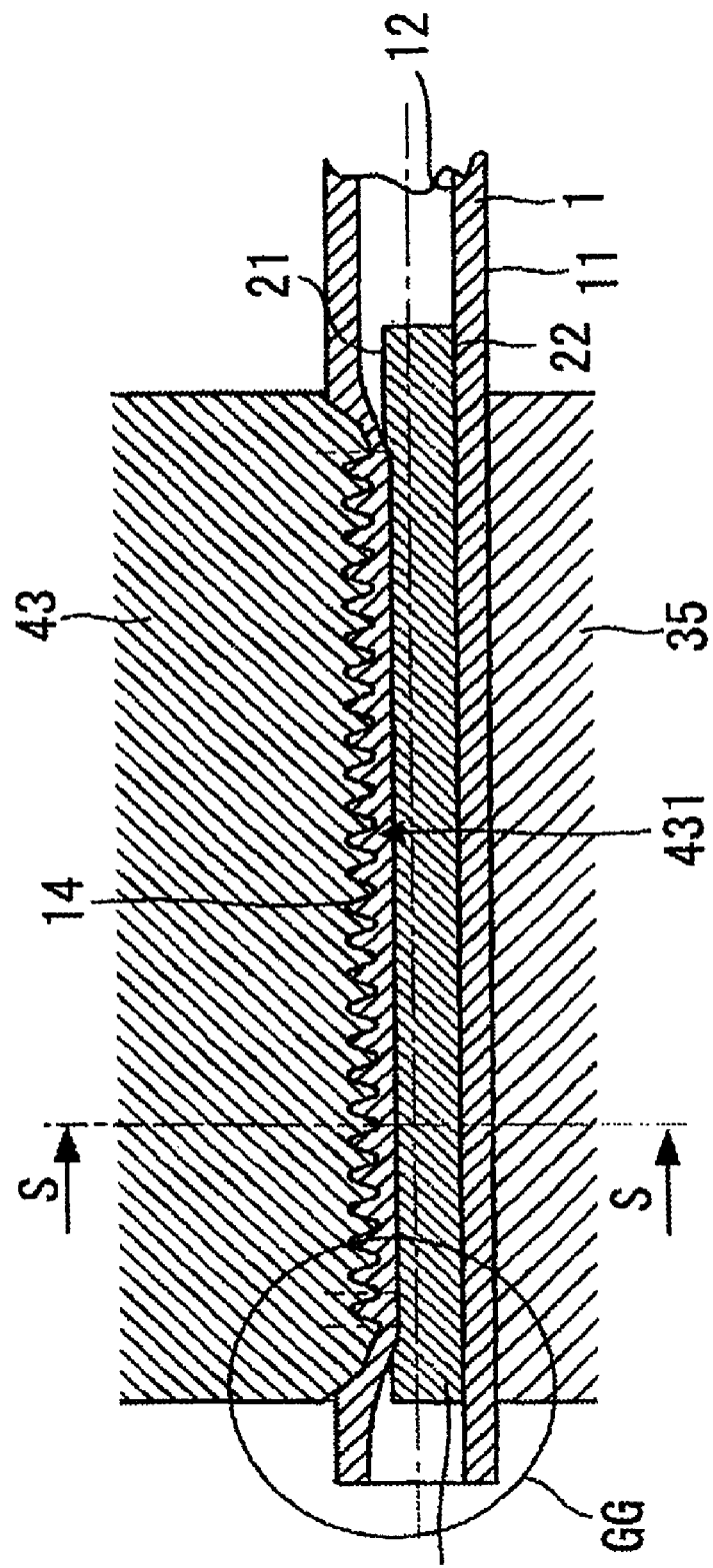
FIG. 17A is an explanatory view illustrating a state at the end of the forming in a second step of the intermediate forming process which is a post-process after the state shown in FIG. 16A.
Figure 17B:
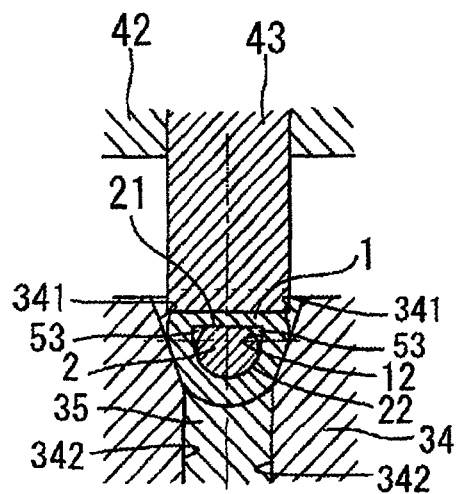
FIG. 17B is a cross-sectional view taken along the line S-S shown in FIG. 17A.

When the first step of the intermediate forming process illustrated in FIGS. 16A and 16B is finished, as shown in FIGS. 17A and 17B, the outer circumference 11 of the first rack blank 1 is restrained by the lower die 34 having the same shape as shown in FIGS. 16A and 16B. Processing in a second step is performed, in which a punch 43 (which differs in rack teeth shaped portion from the punch 41 used in the first step) having a rough rack teeth shaped portion is pressed to the rack teeth forming portion formed in the outer circumference of the rack blank 1 and in which rough rack teeth (i.e., roughly processed rack teeth) are formed.

Figure 17C:
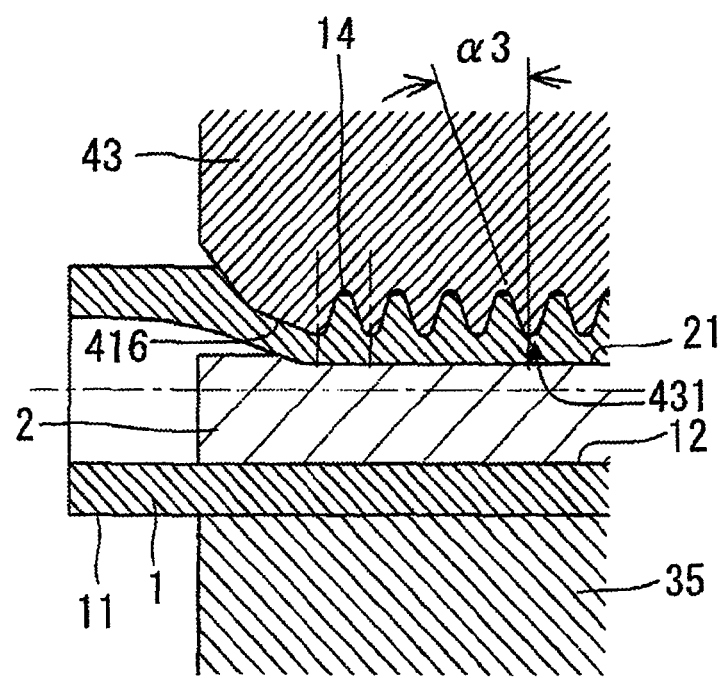
FIG. 17C is an enlarged cross-sectional view of a part GG shown in FIG. 17A.

As shown in FIG. 17C, a rack teeth shaped portion 431 is formed at a pressure angle α3 (in the fifth embodiment of the invention, the pressure angle α3 is 19.5 degrees), which is extremely close to the pressure angle (which is 20 degrees in the fifth embodiment of the invention) in the punch 43 used in the second step of the intermediate forming process. The rack teeth shaped portion 431 of the punch 43 is formed so that the tooth height thereof is slightly larger than the tooth height of the rack teeth which is a product.

When the punch 43 is downwardly pushed, the outer circumference 11 of the first rack blank 1 is downwardly pushed by the rack teeth shaped portion 431. As shown in FIGS. 17A and 17B, rack teeth 14, which are larger in tooth height and pressure angle than the rack teeth 13 formed in the first step (however, slightly larger in tooth height than the rack teeth of a finished product) and are formed due to this pushdown.

Figure 18A:
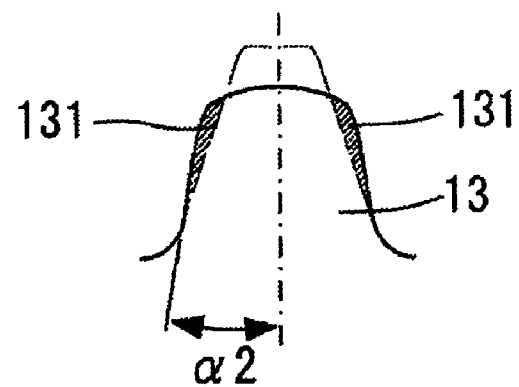
FIG. 18A illustrates rack teeth formed in the first step of the intermediate forming process.
Figure 18B:
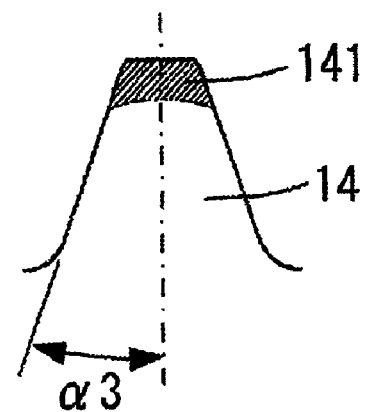
FIG. 18B illustrates rack teeth formed in the second step of the intermediate forming process.

That is, FIG. 18A illustrates the rack teeth 13 formed in the first step of the intermediate forming process. FIG. 18B illustrates the rack teeth 14 formed in the second step of the intermediate forming process. As indicated by hatching in FIG. 18A, excess blank materials 131, 131 are present in the rack teeth 13 formed in the first step so that addendum parts are thicker in the direction of a tooth thickness than the rack teeth to be formed as a finished product. As shown in FIG. 18A, in the second step of the intermediate forming process, the blank materials 131, 131 used in the first step are caused to flow in the direction of the tooth edge and are filled in the rack teeth 14 formed in the second step as the tooth edge blank material 141.

Figure 19:
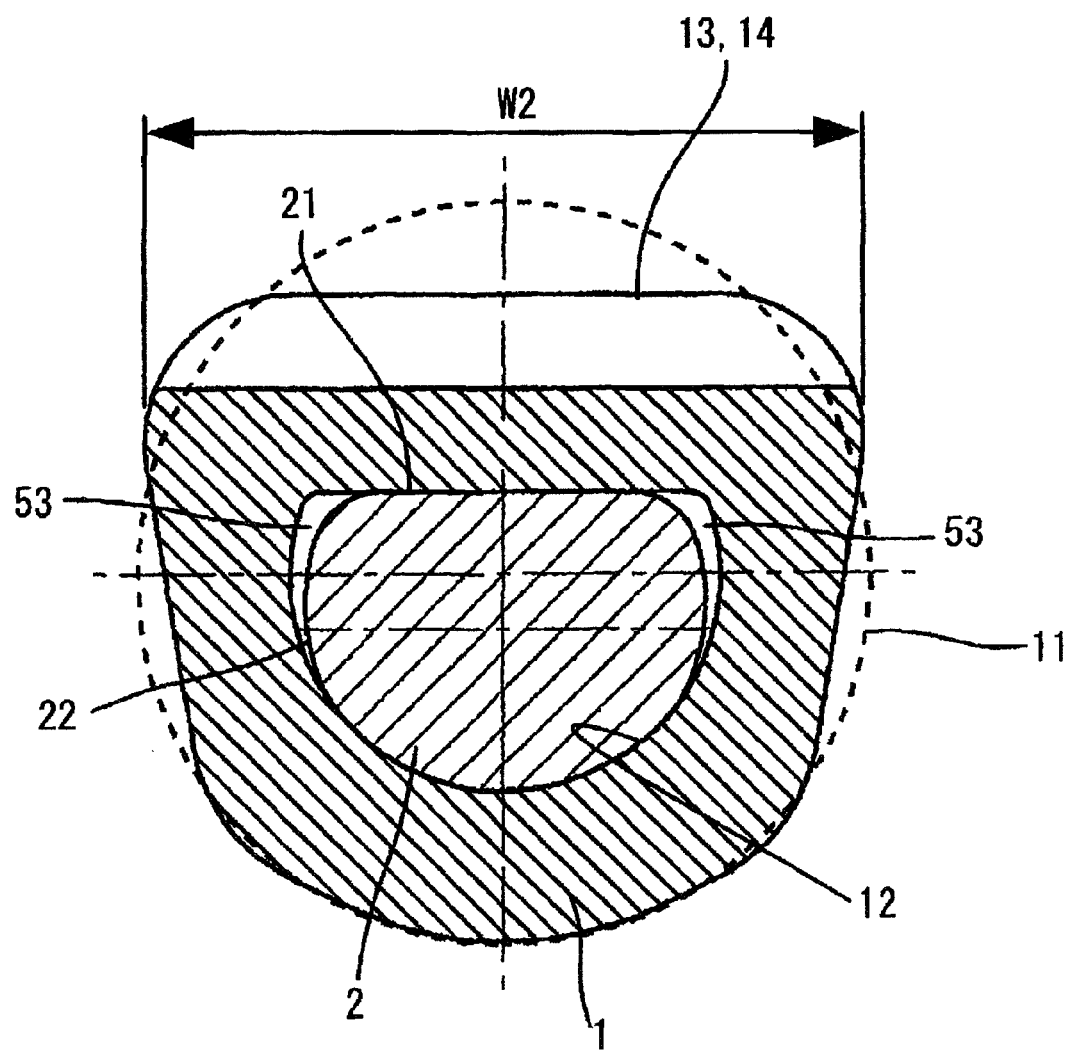
FIG. 19 is an enlarged cross-sectional view of the first rack blank and the second rack blank, which illustrates a state at the end of the forming in the second step of the intermediate forming process.

As shown in FIG. 15B, the lower die 34 used in the first step and the second step of the intermediate forming process is formed so that the width W1 between the upper opening ends of the inclined restraining surfaces 341, 341 is slightly larger than the outside diameter dimension W0 of the outer circumference 11 of the first rack blank 1. Thus, at the forming, no restraining force acts in the direction of the width of the upper half of the rack blank 1. Accordingly, as shown in FIG. 19, the upper half of the first rack blank 1 having undergone the first step and the second step of the intermediate forming process is formed so that a part having the width (i.e., the width between both sides perpendicular to the rack teeth forming side) of the tooth root of each of the rack teeth 13 and 14 outwardly protrudes in a radial direction from the outer circumference 11 of the first rack blank 1.

Thus, in the second step of the intermediate forming process, processing is performed on the blank only to reduce the thickness of the rack teeth so that the pressure angle thereof is made to be closer to the pressure angle of the rack teeth serving as a product, and that the tooth height is increased. Thus, the forming load is small. Also, in the first step and the second step of the intermediate forming process, the width of the tooth root of each of the rack teeth 13 and 14 is not restrained. Accordingly, the die is not put into a closed state. Therefore, the forming load is small, so that the lifetime of the die is lengthened.

First Step of Sizing Process

Figure 20A:
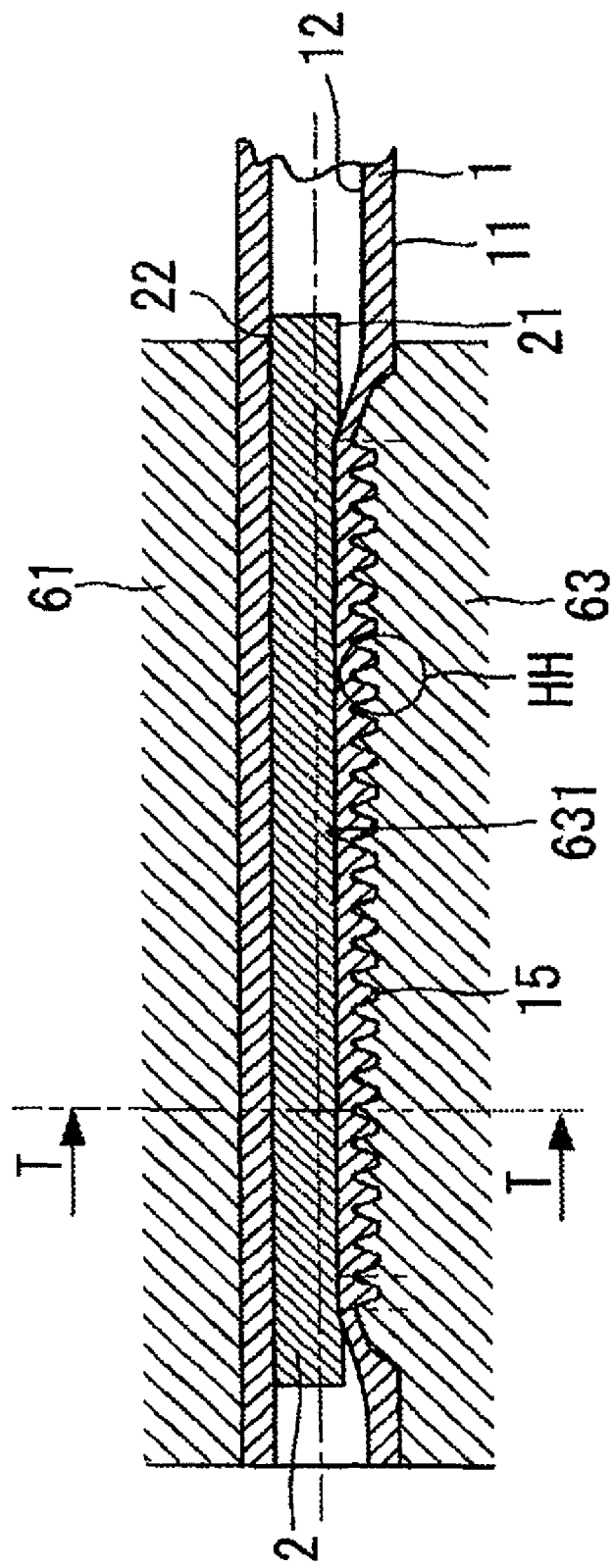
FIG. 20A is a process view illustrating a post-process after the intermediate forming process illustrated in FIG. 17A and is an explanatory view illustrating a state at the end of the forming in a first step of a sizing process of forming required rack teeth.
Figure 20B:
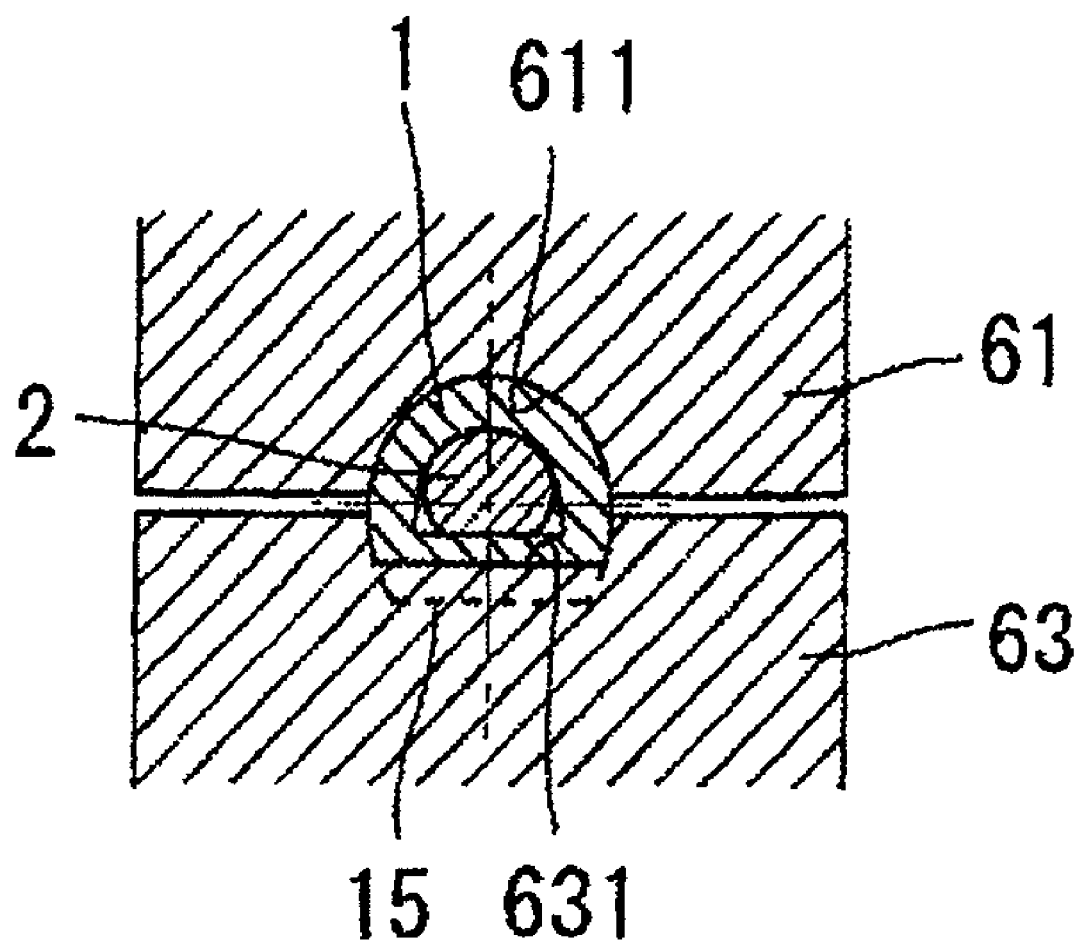
FIG. 20B is a cross-sectional view taken along the line T-T shown in FIG. 20A.
Figure 20C:
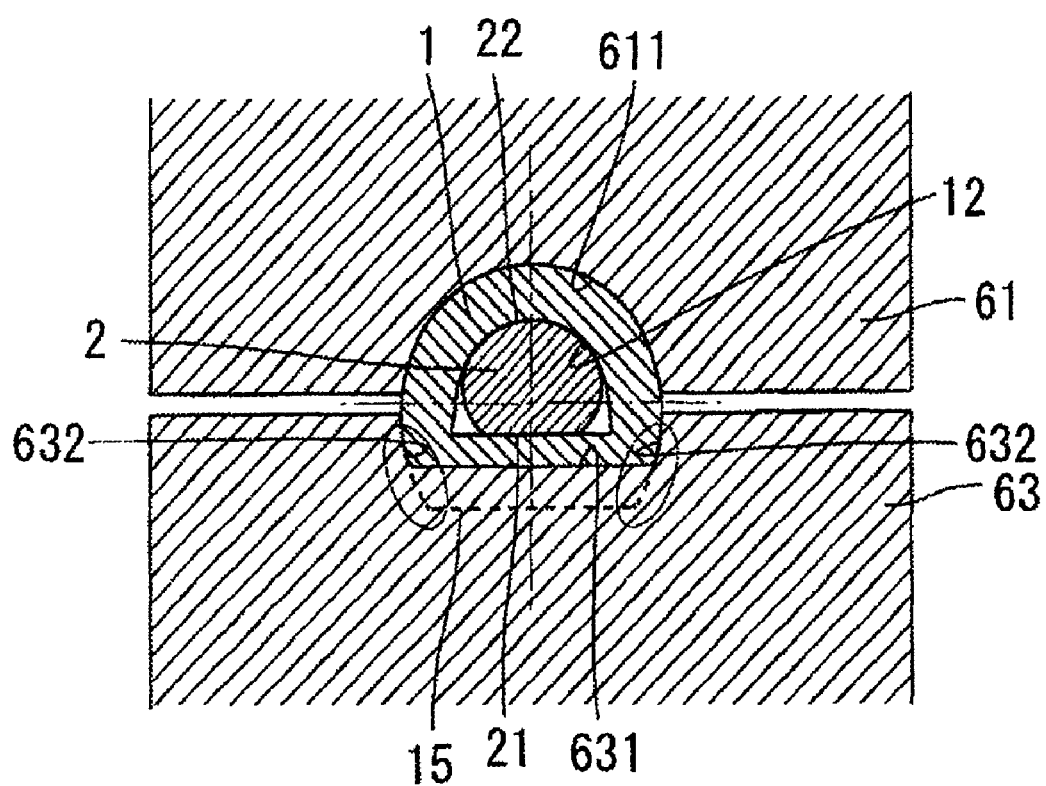
FIG. 20C is an enlarged cross-sectional view of a part shown in FIG. 20B.
Figure 20D:
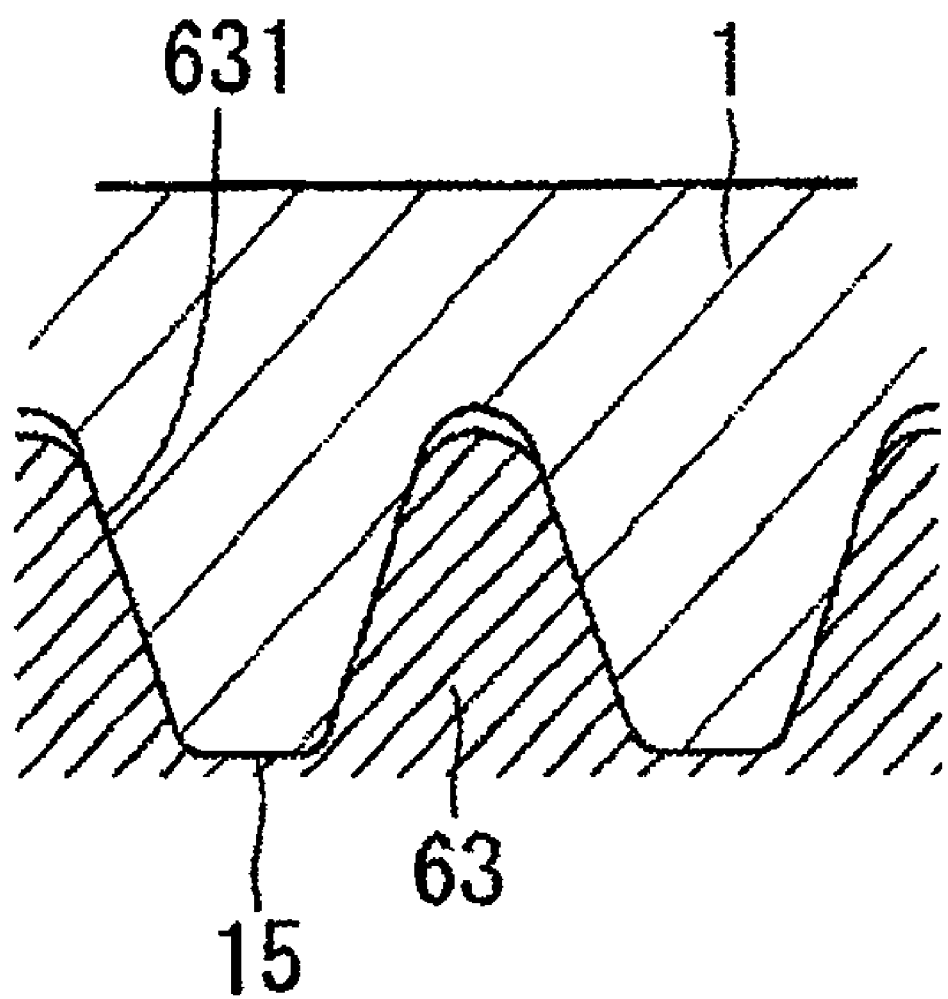
FIG. 20D is an enlarged cross-sectional view of a part HH shown in FIG. 20A.

The first rack blank 1 having undergone the second step of the intermediate forming process is brought into the sizing-forming die illustrated in FIGS. 20A and 20B. The outer circumference of the first rack blank 1 is pressed between the semicircular pressing surface (i.e., the restraining surface) 611 formed on the bottom surface of an upper die 61 and a required rack teeth shaped portion 631 formed in the top surface of a lower die 63. Consequently, the required rack teeth (i.e., the finish-processed rack teeth) 15 are formed while the width of the tooth root of each of the rack teeth of the first rack blank 1 is reduced.

In the second step of the intermediate forming process, the width of the tooth root of each of the rack teeth 14 of the first rack blank 1 is made to be larger than the width of each of the required rack teeth. Accordingly, the width of the tooth root of each of the rack teeth 14 of the first rack blank 1 is restrained by arc shaped restraining surfaces 632, 622 formed on both sides of the rack teeth shaped portion 631 of the lower die 63 to form the rack teeth 14 so that the width of the tooth root of each of the rack teeth 14 is set to be the width of each of the (circular-arc-like) required rack teeth (i.e., the finish-processed rack teeth) 15.

Figure 22:
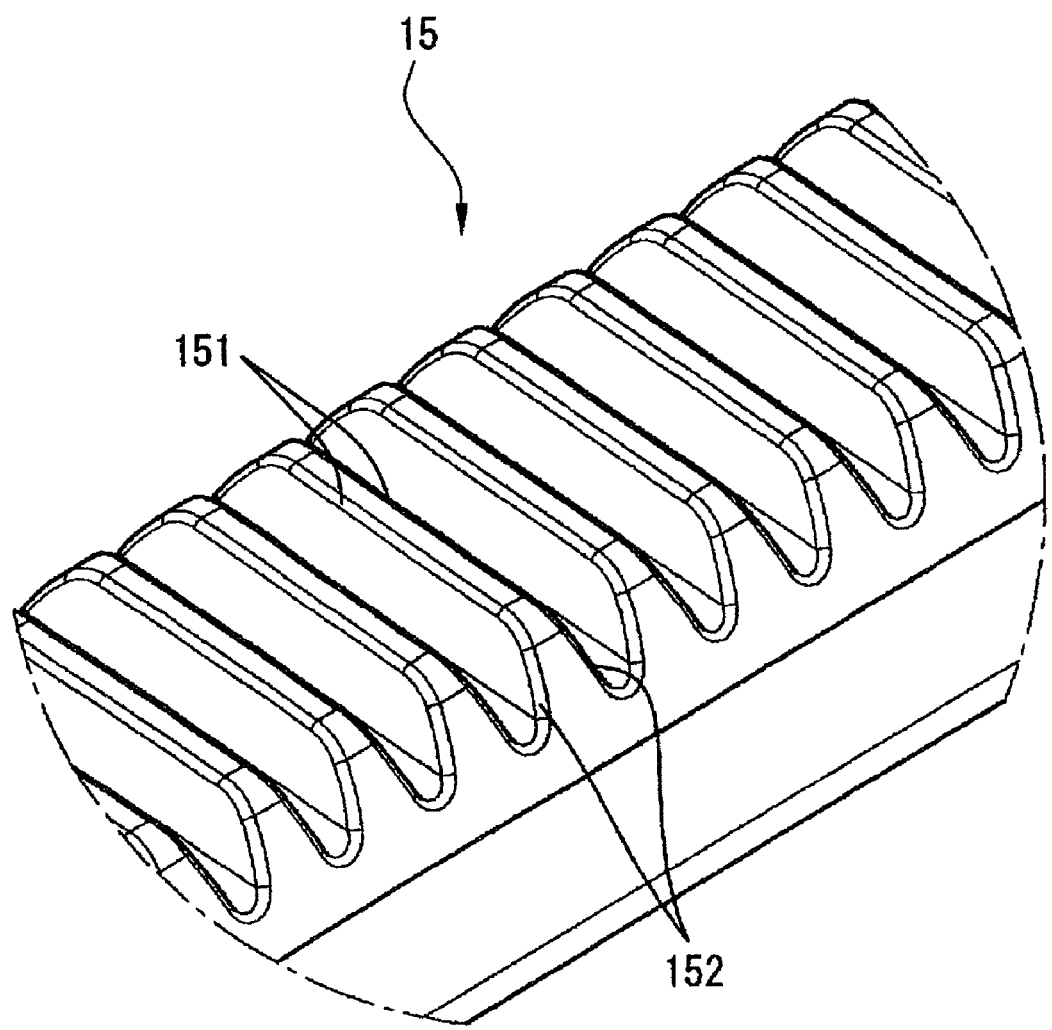
FIG. 22 is an enlarged perspective view of the first rack blank, which illustrates a state at the end of the forming in a first step of the sizing process.

FIG. 22 illustrates the rack teeth 15 at the end of the forming in the first step of the sizing process. As shown in FIG. 22, slight rounding is performed on corner portions (at both of the tooth edge side and the tooth width side) of each of the rack teeth 15 in the first step of the sizing process to thereby enhance the strength of the rack teeth 15.

The tooth height of each of the rack teeth 14 of the first rack blank 1 formed in the second step of the intermediate forming process is set to be larger than the tooth height of the required rack teeth. Therefore, a gap is assured between the tooth edges of the rack teeth shaped portion 631 of the lower die 63 and the bottoms of the rack teeth 14 of the lower die 63. Thus, the die is not put into a closed condition. Accordingly, the forming load is small, so that the lifetime of the die is lengthened.

Second Step of Sizing Process

Figure 21A:
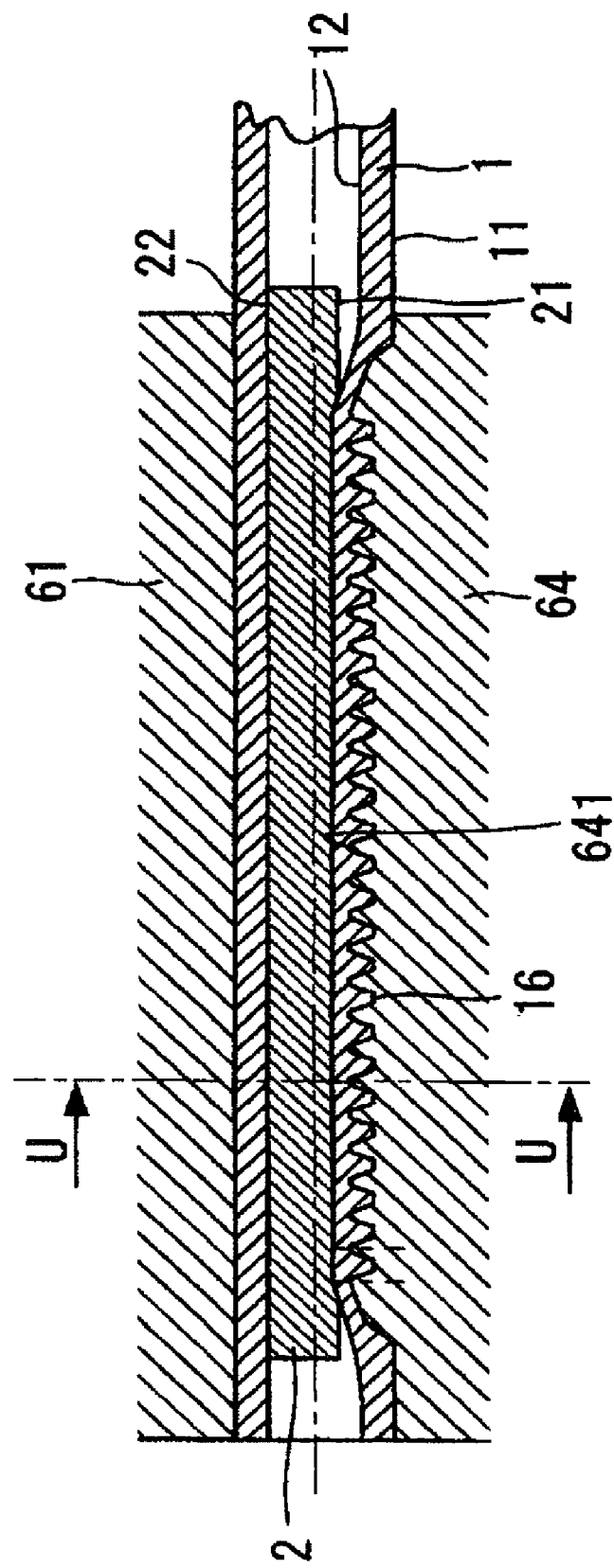
FIG. 21A is an explanatory view illustrating a state at the end of the forming in a second step of the sizing process, which is a post-process after the state illustrated in FIG. 20A.
Figure 21B:
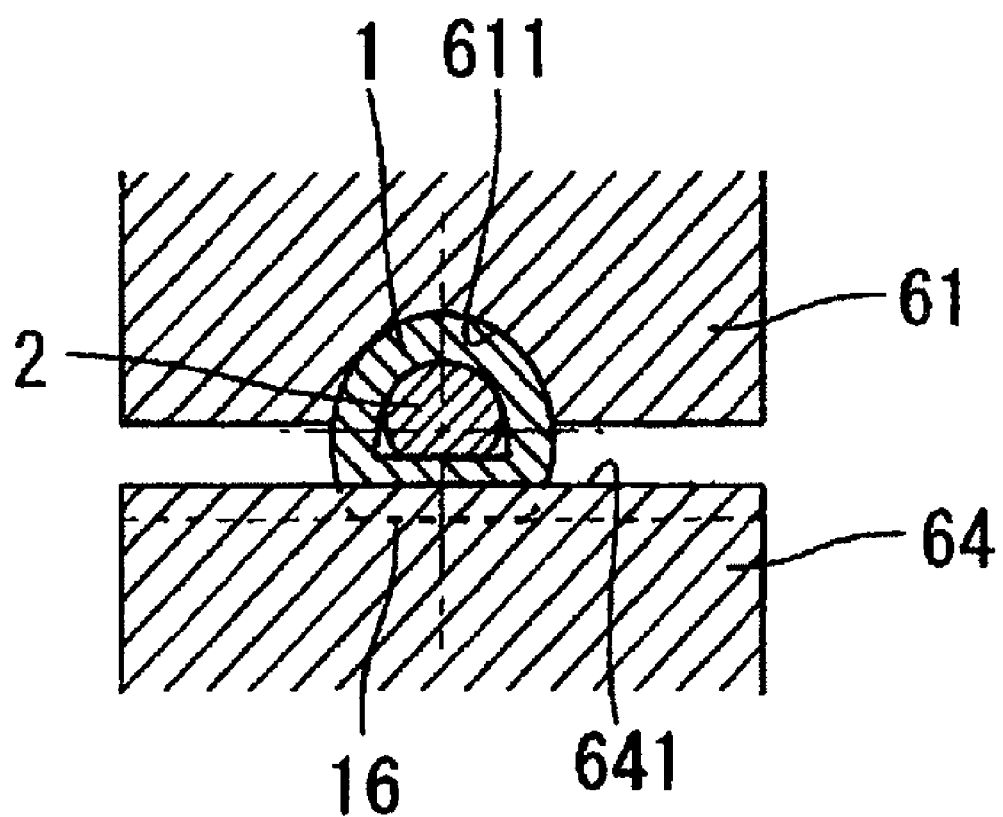
FIG. 21B is a cross-sectional view taken along the line U-U shown in FIG. 21A.
Figure 21C:
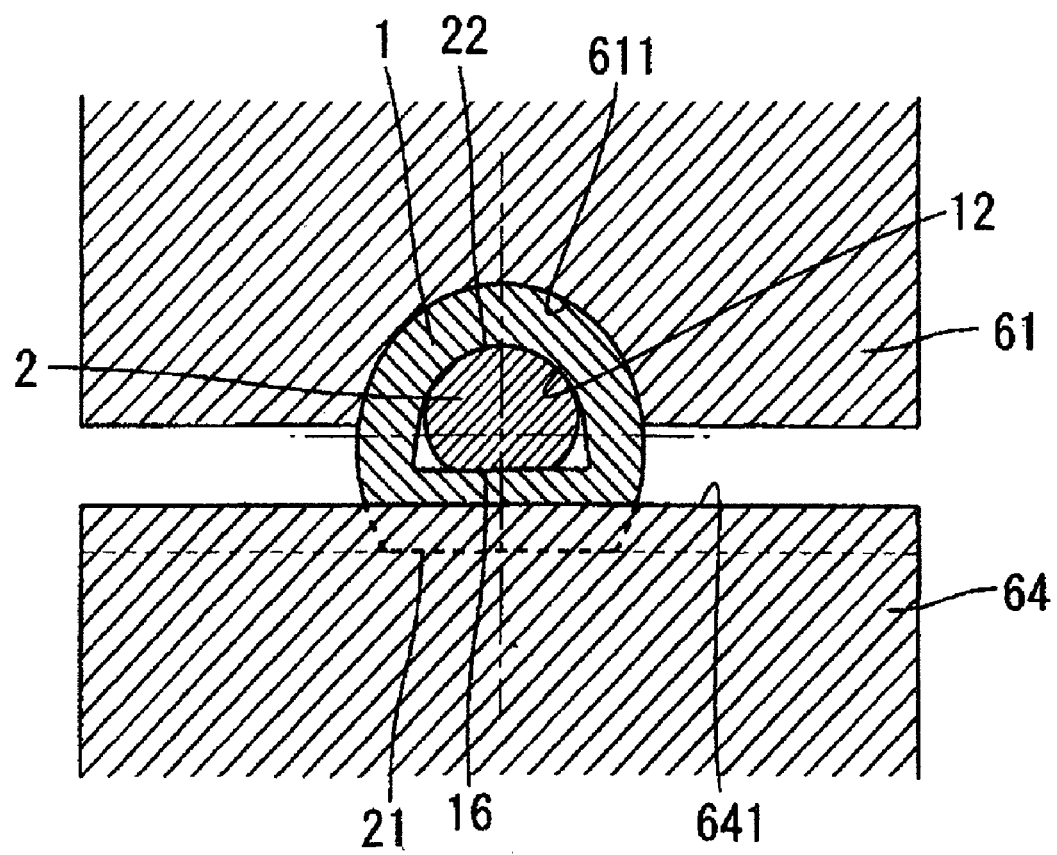
FIG. 21C is an enlarged cross-sectional view of a part shown in FIG. 21B.

The first rack blank 1 having undergone the first step of the sizing process is brought into the sizing-forming die illustrated in FIGS. 21A and 21B. The outer circumference of the first rack blank 1 is pressed between the semicircular pressing surface (i.e., the restraining surface) 611 formed on the bottom surface of an upper die 61 and a required rack teeth shaped portion 641 formed in the top surface of a lower die 64. Consequently, the required rack teeth (i.e., the finish-processed rack teeth) 16 are formed in the first rack blank 1.

In the second step of the sizing process, the lower die 64 does not restrain the width of each of the rack teeth 15 of the first rack blank 1. Additionally, a gap is assured between the tooth edges of the rack teeth shaped portion 641 of the lower die 64 and the tooth bottoms of the rack teeth 15. Thus, the die is not put into a closed condition. Accordingly, the forming load is small, so that the lifetime of the die is lengthened.

In the second step of the sizing process, correction forming of tooth traces and tooth edges, which has been insufficiently performed in the first step of the sizing process, is performed again to thereby enhance the precision of the tooth flank and the uniformity of the tooth form. Consequently, the durability of the rack teeth 16 is enhanced. Also, even in a case where the upper die 61 and the lower die 64 used in the second step of the sizing process constitute a simple structure including a pair of upper and lower dies, no burr protrudes to the outer circumference of the rack blank. Thus, the number of processes required to remove burrs is reduced.

In the fifth embodiment, all the blank material (or excess thickness part) excluded at the formation of the rack teeth is accommodated in the space between the bore hole 12 of the first rack blank 1 and the outer circumference 22 of the second rack blank 2. Thus, no burr is generated in the formed rack. Consequently, the number of processes required to remove burrs is reduced. Additionally, because the tubular rack blank is used, the part other than the rack teeth forming portion is lightened. Further, the shape of the rear-side of the rack teeth is simple. Accordingly, the shape of the rack guide configured to guide the rear side of the rack teeth is simplified.

Also, the shape of the die is simple. The forming can be performed by a general purpose press. Thus, a die manufacturing const and a forming equipment cost can be reduced. Because no mandrel is used, a processing time is short. Additionally, the sufficient thickness of the bottom of each of the rack teeth is assured. Moreover, the strength of the rack teeth is enhanced.

The second rack blanks used in the first to fourth embodiments can also be used as the second rack blank of the fifth embodiment.

Sixth Embodiment

Next, a sixth embodiment of the invention will be described.

In the following description, only a structural part differing from the second embodiment will described, and the overlapping description will be omitted. Further, the description is made by designating the same components with the same reference numeral.

The sixth embodiment is an example in which a mandrel serving as a processing jig is used instead of the second rack blank 2, and in which the mandrel is extracted from the first rack blank 1 upon completion of forming, to thereby lighten the rack.

First Step of Intermediate Forming Process

Figure 23A:
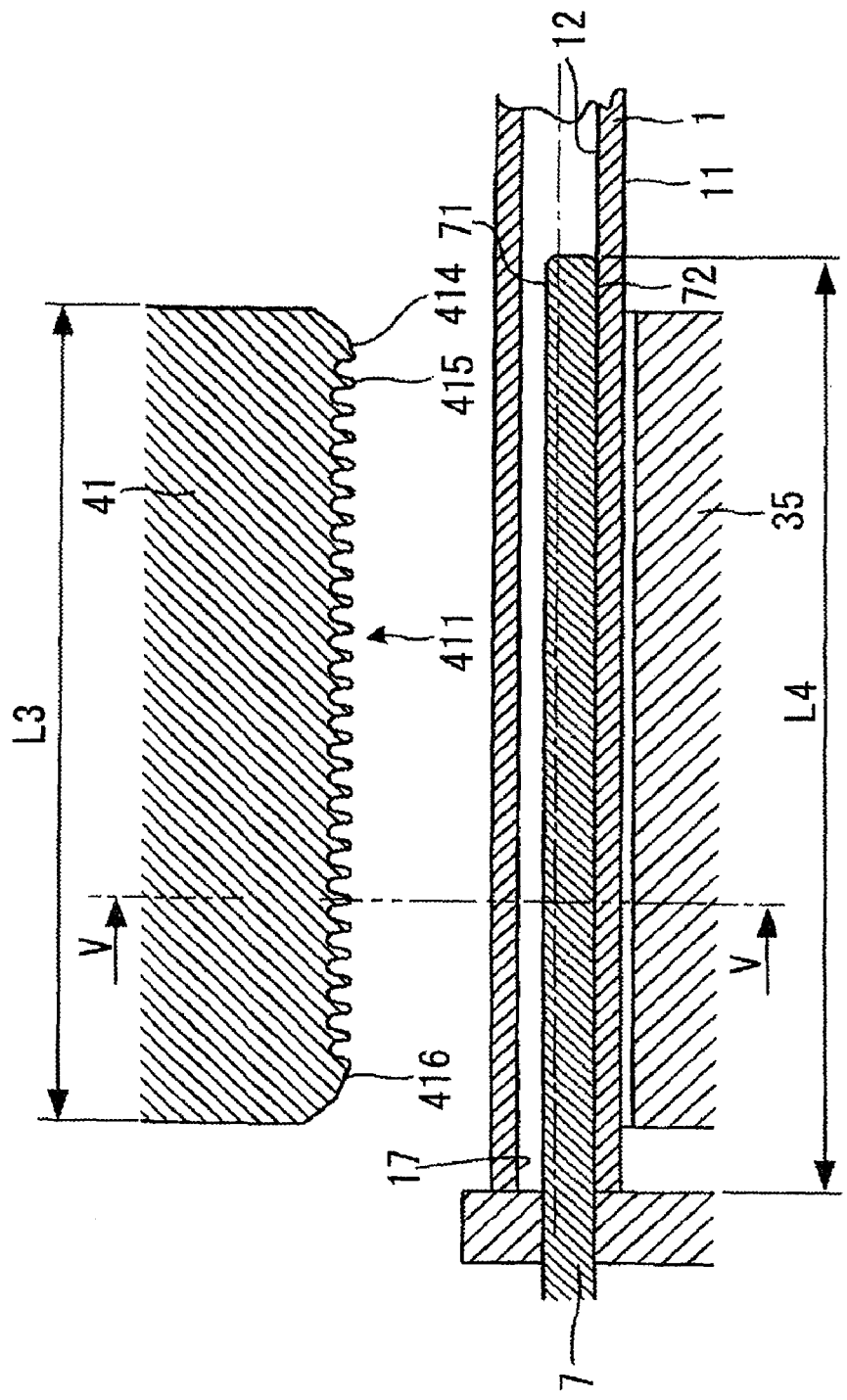
FIG. 23A is a process view illustrating a manufacturing method of a rack according to sixth embodiment and is an explanatory view illustrating a state in which a first tubular rack blank having a bore hole, into which a mandrel is inserted, is attached to a die used in a first step of an intermediate forming process of forming a rough rack.
Figure 23B:
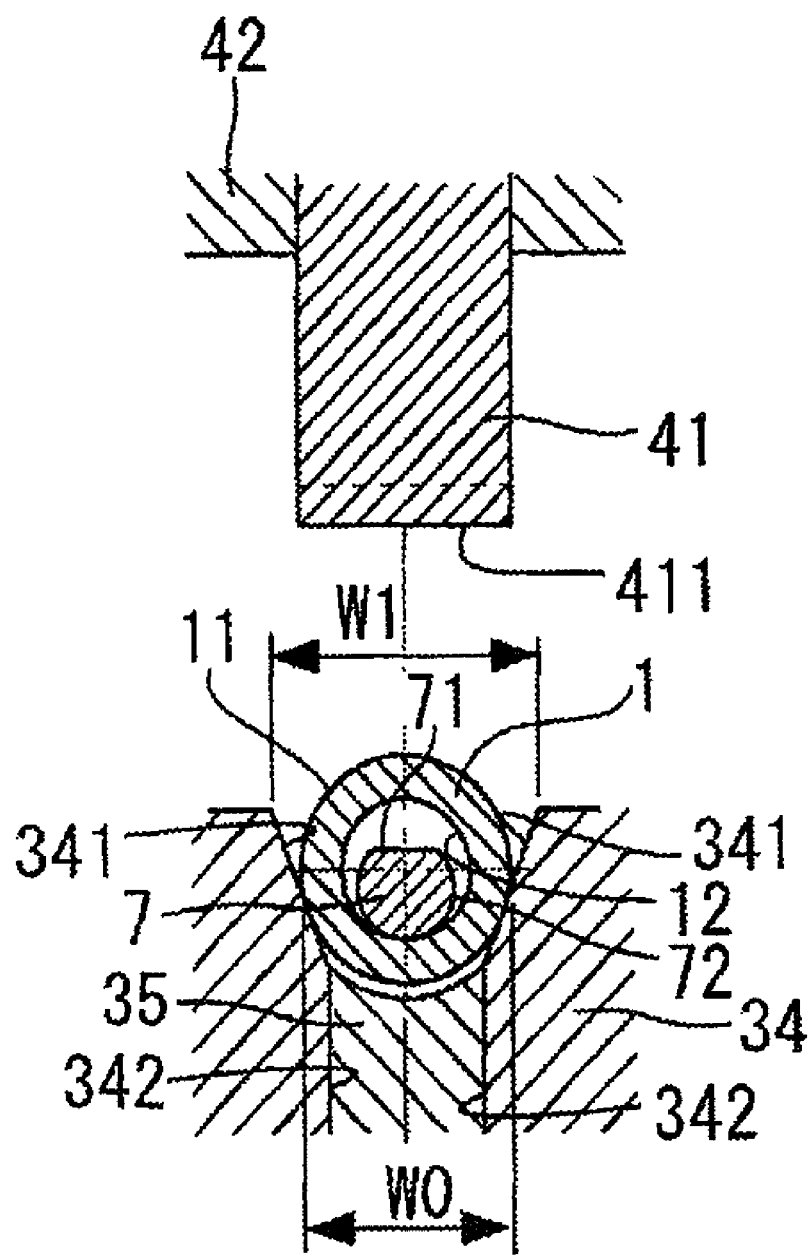
FIG. 23B is a cross-sectional view taken along the line V-V shown in FIG. 23A.

As shown in FIGS. 23A and 23B, the first tubular rack blank of the sixth embodiment is formed like a hollow cylinder so that the shape of the cross section of each of the outer circumference 11 and the bore hole 12 is a circle. The first tubular rack blank of the sixth embodiment has completely the same shape of the first rack blank of the fifth embodiment.

A blank obtained by inserting a solid mandrel 7 into the bore hole 12 of the first tubular rack blank 1 is used as a rack forming blank. The mandrel 7 of the fifth embodiment is formed like a solid cylinder. The top surface 71 of the mandrel 7 is formed like a flat surface over the entire axial length.

A rack forming blank obtained by inserting the mandrel 7 thereinto from a left-end-side opening portion 17 of the first rack blank 1 is prepared. As shown in FIG. 23B and FIG. 23A, the outer circumference 11 of the first rack blank 1 is restrained by the lower die 34. Then, a punch 41 having a rough rack teeth shaped portion is pressed to a rack teeth forming portion in the outer circumference of the rack blank 1 to thereby form a rough rack teeth (i.e., roughly processed rack teeth).

An axial length L4 of the mandrel 7 is set to be slightly larger than the axial length (i.e., the length of the rack teeth forming portion formed in the first rack blank 1) L3. Preferably, the axial length L4 of the mandrel 7 is at least equal to the axial length L3 of the rack teeth shaped portion 411 of the punch 41. Then, the mandrel 7 is disposed in the bore hole 12 of the first rack blank 1 to cover a rack teeth forming range formed in the first rack blank 1.

Figure 24A:
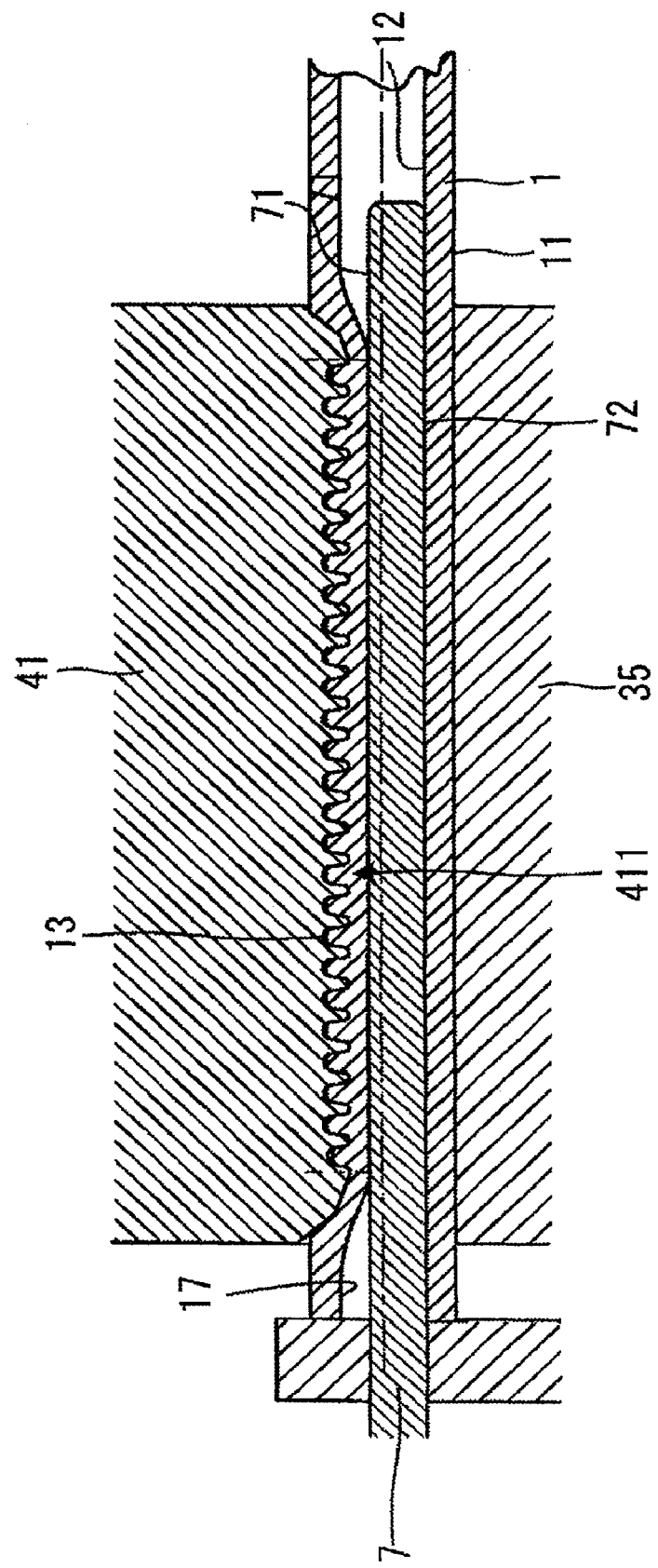
FIG. 24A is an explanatory view illustrating a state at the end of the forming in the first step of the intermediate forming process according to the sixth embodiment.

The shapes of the punch 41, the lower die 34, and the knockout 35 is the same as the shapes of those of the fifth embodiment, respectively. When the punch 41 is downwardly pushed, the outer circumference 11 of the first rack blank 1 is downwardly pushed by the rack teeth shaped portion 411 of the punch 41. As shown in FIG. 24A, due to this pushdown, the rack teeth 13 are formed in the outer circumference 11 of the first rack blank 1, which is at the side of the punch 41, so that the bore hole 12 of the first rack blank 1 abuts against the flat-surface-like top surface 71 (i.e., a surface facing the rack teeth forming side of the first rack blank 1) of the mandrel 7.

When the punch 41 is further downwardly pushed, as shown in FIG. 24A, the bore hole 12 of the first rack blank 1 presses the top surface 71 of the mandrel 7. The reaction force causes the blank material to upwardly flow, so that the blank material is effectively used for forming the rack teeth 13 of the first rack blank 1. Consequently, the filling degree, at which the teeth are filled with the material, is enhanced.

Even at the end of the forming of the rack teeth in the first step of the intermediate process, a gap remains between the side perpendicular to the rack teeth forming side of the bore hole 12 of the first rack blank 1 and the outer circumference 72 of the mandrel 7. Thus, the die is not put into a closed condition. Accordingly, the blank material (or excessive thinness material) excluded at the forming of the rack teeth 13 is caused to flow in a space between the bore hole 12 of the first rack blank 1 and the outer circumference 72 of the mandrel 7. Thus, all the blank material is accommodated in this space.

Second Step of Intermediate Forming Process

When the first step of the intermediate forming process illustrated in FIG. 24A is finished, the mandrel 7 is once extracted from the left-end-side opening portion 17 of the first rack blank 1. Then, the first rack blank 1 is brought into the die to be used in the second step illustrated in FIG. 24B. Subsequently, the mandrel 7 is inserted from the left-end-side opening portion 17 of the first rack blank 1.

Figure 24B:
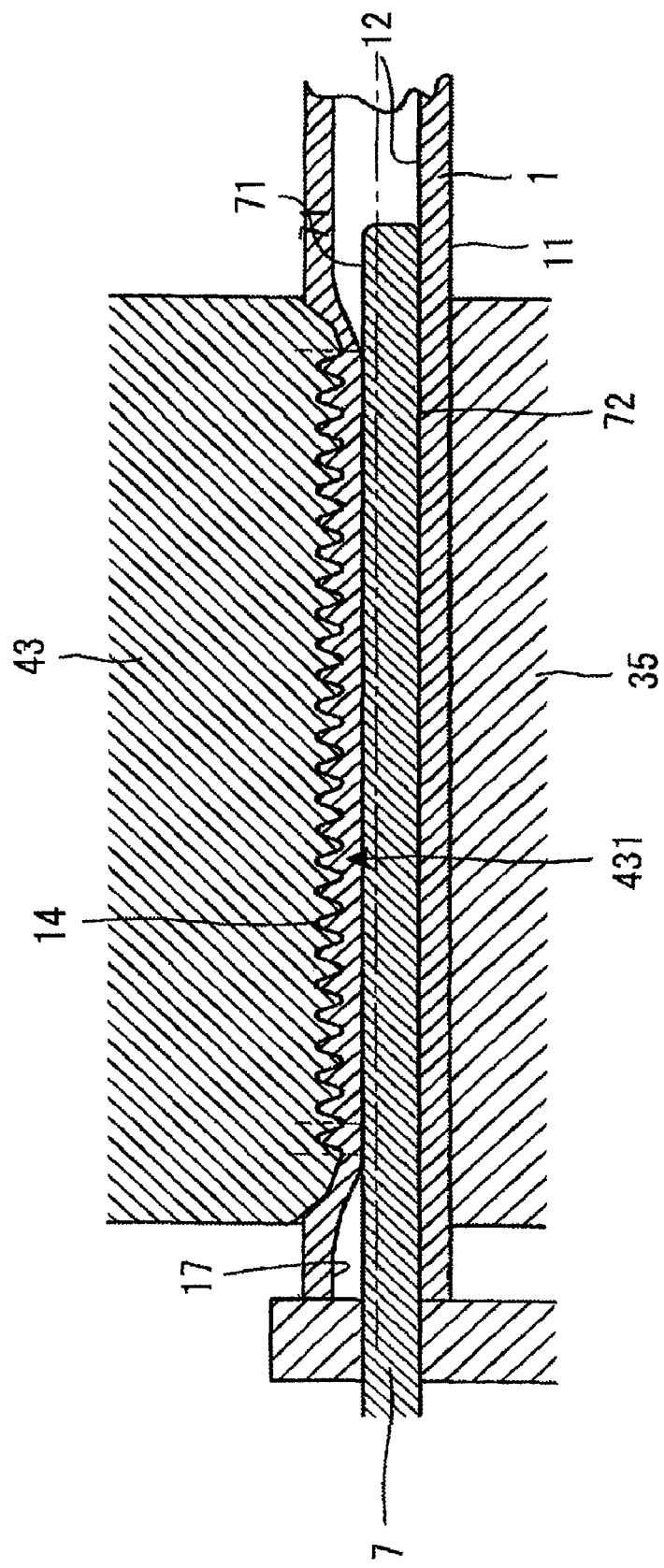
FIG. 24B is an explanatory view illustrating a state at the end of the forming in a second step of the sizing process, which is a post-process after the state illustrated in FIG. 24A.

As shown in FIG. 24B, the outer circumference 11 of the first rack blank 1 is restrained by the lower die 34 (not shown), which has the same shape as that illustrated in FIG. 24A. The punch 43 (which differs in the rack teeth shaped portion from the punch 41 used in the first step) is pressed to the rack teeth forming portion provided in the outer circumference of the rack blank 1. Then, processing to be performed in the second step for forming rough rack teeth (i.e., the roughly processed rack teeth) is performed. The shape of the punch 43 used in the second step of the intermediate forming process is the same as that of the punch used in the fifth embodiment.

When the punch 43 is downwardly pushed, the outer circumference 11 of the first rack blank 1 is downwardly pushed by the rack teeth shaped portion 431 of the punch 43. Rack teeth 14, which are larger in tooth height than the rack teeth 13 formed in the first step and have larger pressure angles, are formed in a part of the outer circumference 11 of the first rack blank 1, which is at the side of the punch 43. Additionally, the upper half of the first rack blank 1 having undergone the first step and the second step of the intermediate forming process is formed so that a part corresponding to the width (between both sides perpendicular to the rack teeth forming side) of each of the tooth roots outwardly protrudes from the outer circumference 11 of the first rack blank 1.

First Step of Sizing Process

When the second step of the intermediate forming process illustrated in FIG. 24B is finished, the mandrel 7 is once extracted from the left-end-side opening portion 17 of the first rack blank 1. Then, the first rack blank 1 is brought into the die used in the sizing process illustrated in FIGS. 25A and 25B. Subsequently, the mandrel 7 is again inserted thereinto from the left-end-side opening portion 17 of the first rack blank 1.

Figure 25A:
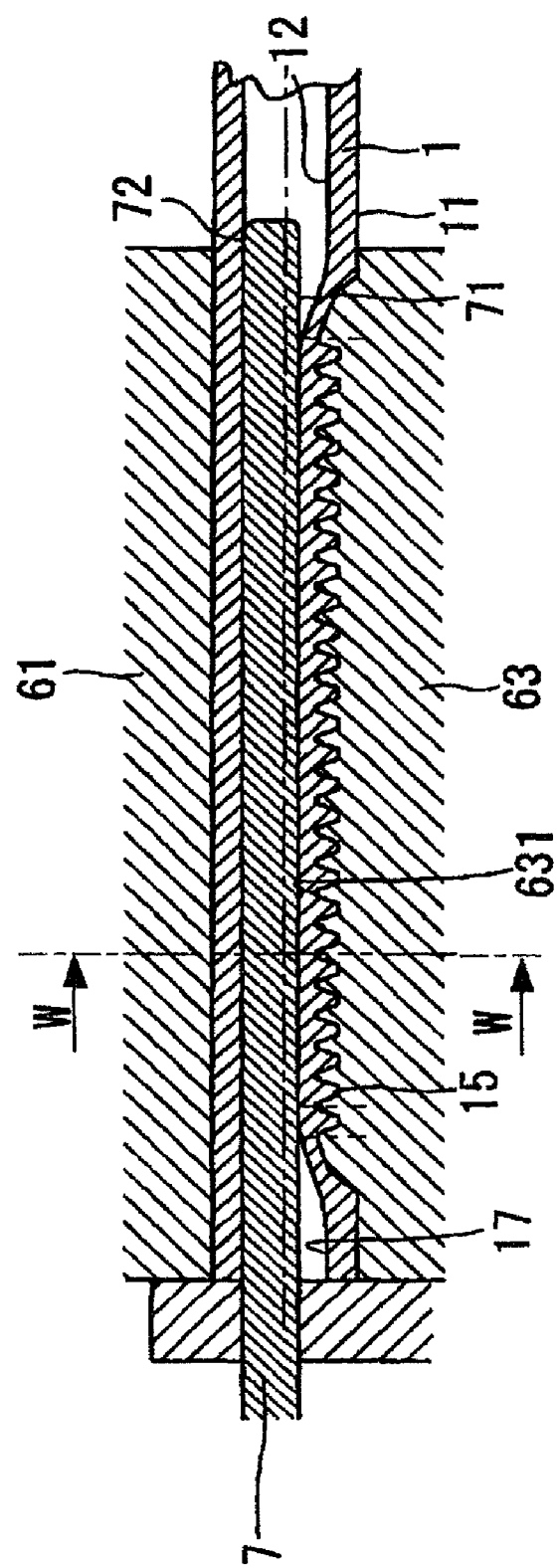
FIG. 25A is a process view illustrating a post-process after the second step of the intermediate forming process illustrated in FIG. 24B and is an explanatory view illustrating a state at the end of the forming in the first step of the sizing process of forming required rack teeth.
Figure 25B:
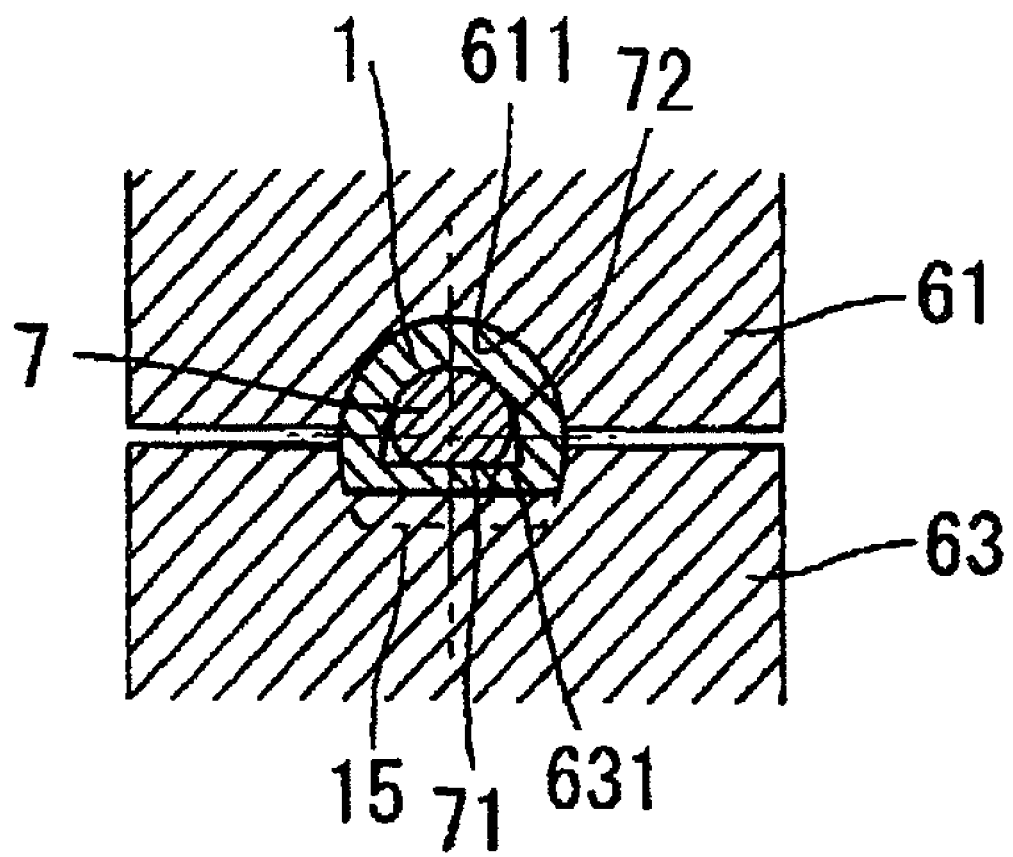
FIG. 25B is a cross-sectional view taken along the line W-W shown in FIG. 25A.

The outer circumference 11 of the first rack blank 1 is pressed between the semicircular pressing surface (or restraining surface) 611 formed on the bottom surface of the upper die 61 of the die illustrated in FIGS. 25A and 25B for sizing, and the required rack teeth shaped portion 631 formed in the top surface of the lower die 63 thereof. Consequently, the required rack teeth (i.e., the finish-processed rack teeth) 15 are formed while the width of the tooth root of each of the rack teeth of the first rack blank 1 is narrowed. The shapes of the upper die 61 and the lower die 63 are the same as those of the corresponding dies according to the fifth embodiment.

Second Step of the Sizing Process

When the first step of the sizing process is finished, the mandrel 7 is once extracted from the left-end-side opening portion 17 of the first rack blank 1. Then, the first rack blank 1 is brought into the die used in the second step of the sizing process illustrated in FIGS. 26A and 26B. Subsequently, the mandrel 7 is again inserted thereinto from the left-end-side opening portion 17 of the first rack blank 1.

Figure 26A:
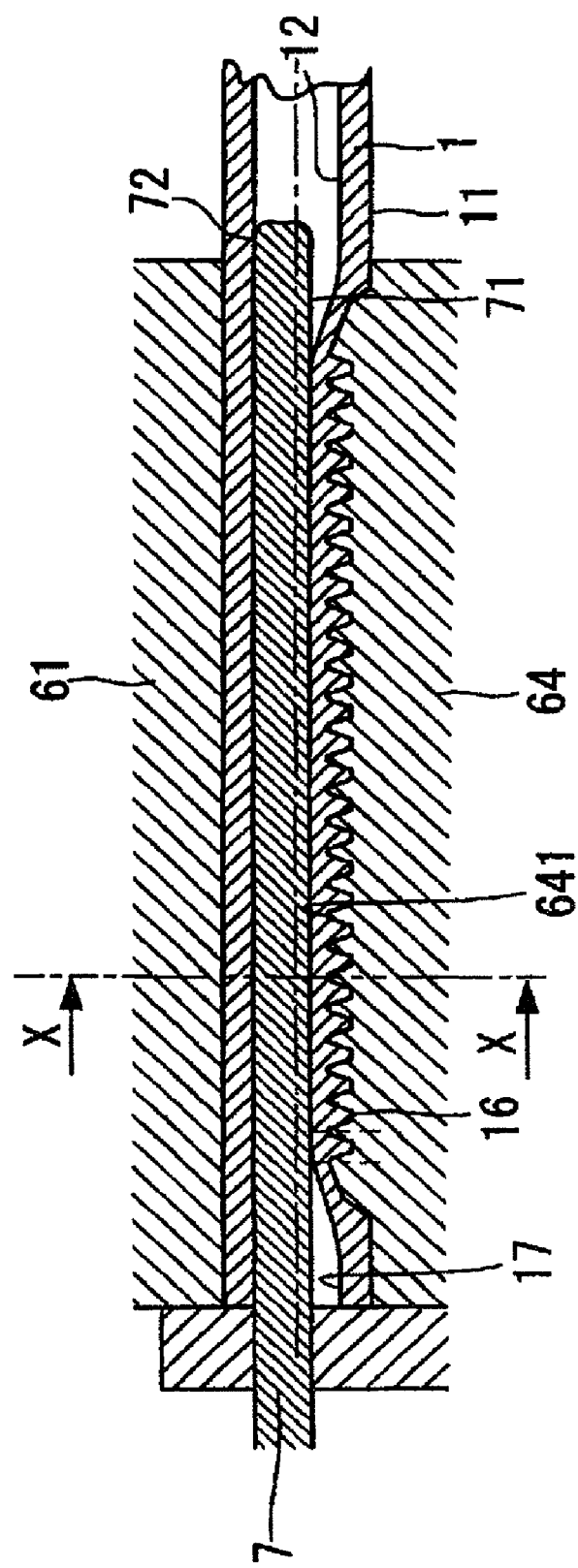
FIG. 26A is an explanatory view illustrating a state at the end of the forming in the second step of the sizing process, which is a post-process after the state illustrated in FIG. 25A.
Figure 26B:
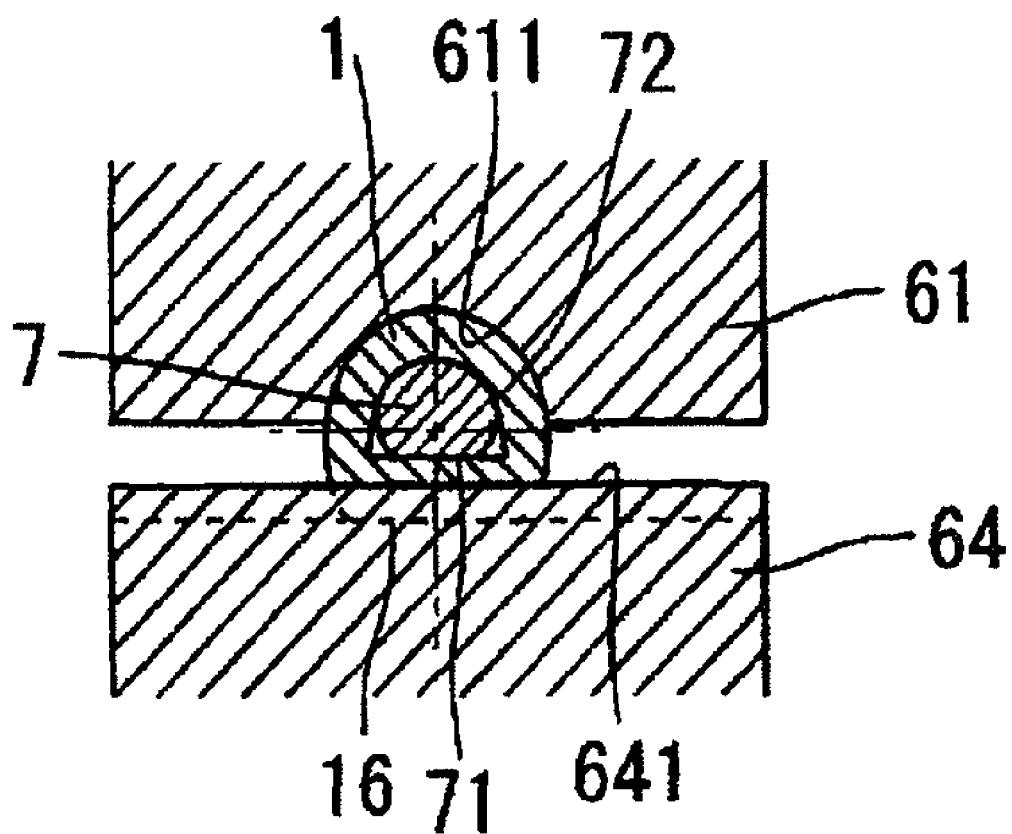
FIG. 26B is a cross-sectional view taken along the line X-X shown in FIG. 26A.
Figure 27A:
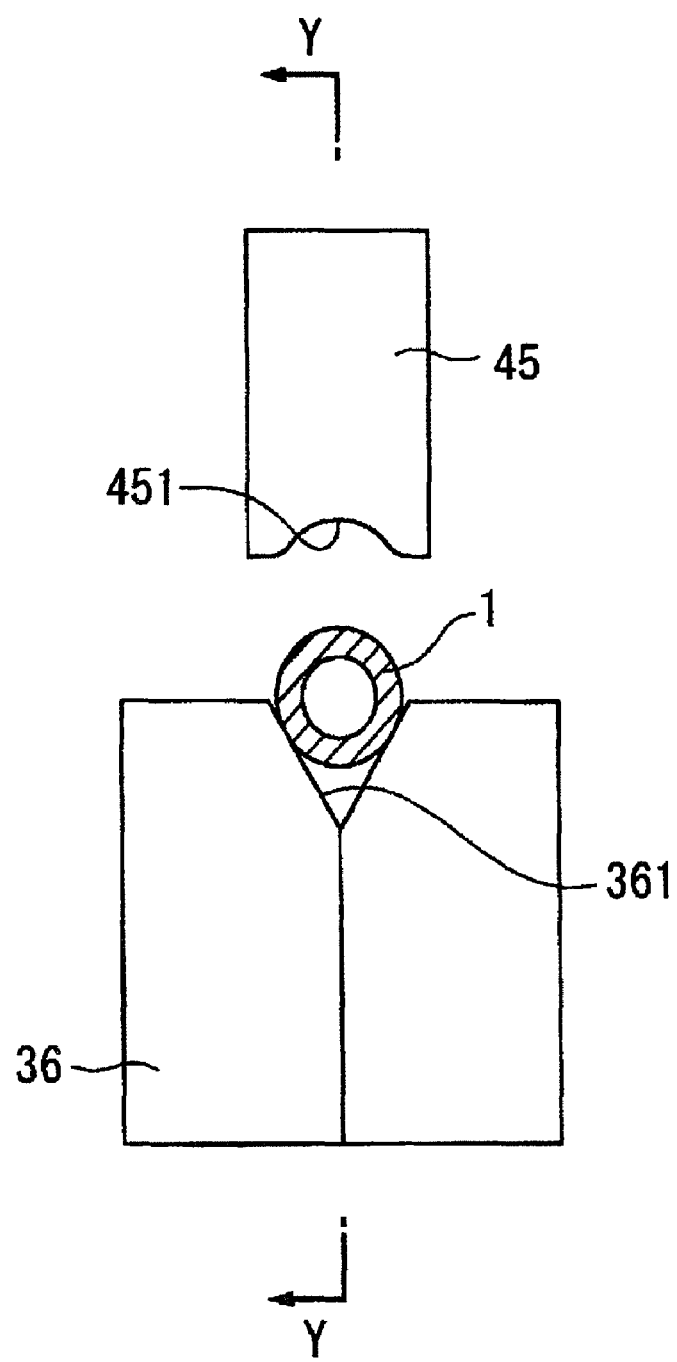
FIG. 27A is an explanatory view illustrating seventh embodiment according to the invention and is a partly cutaway cross-sectional view illustrating a state in which the first rack blank is set between a U-shaped grooved punch and a tapered die.
Figure 27B:
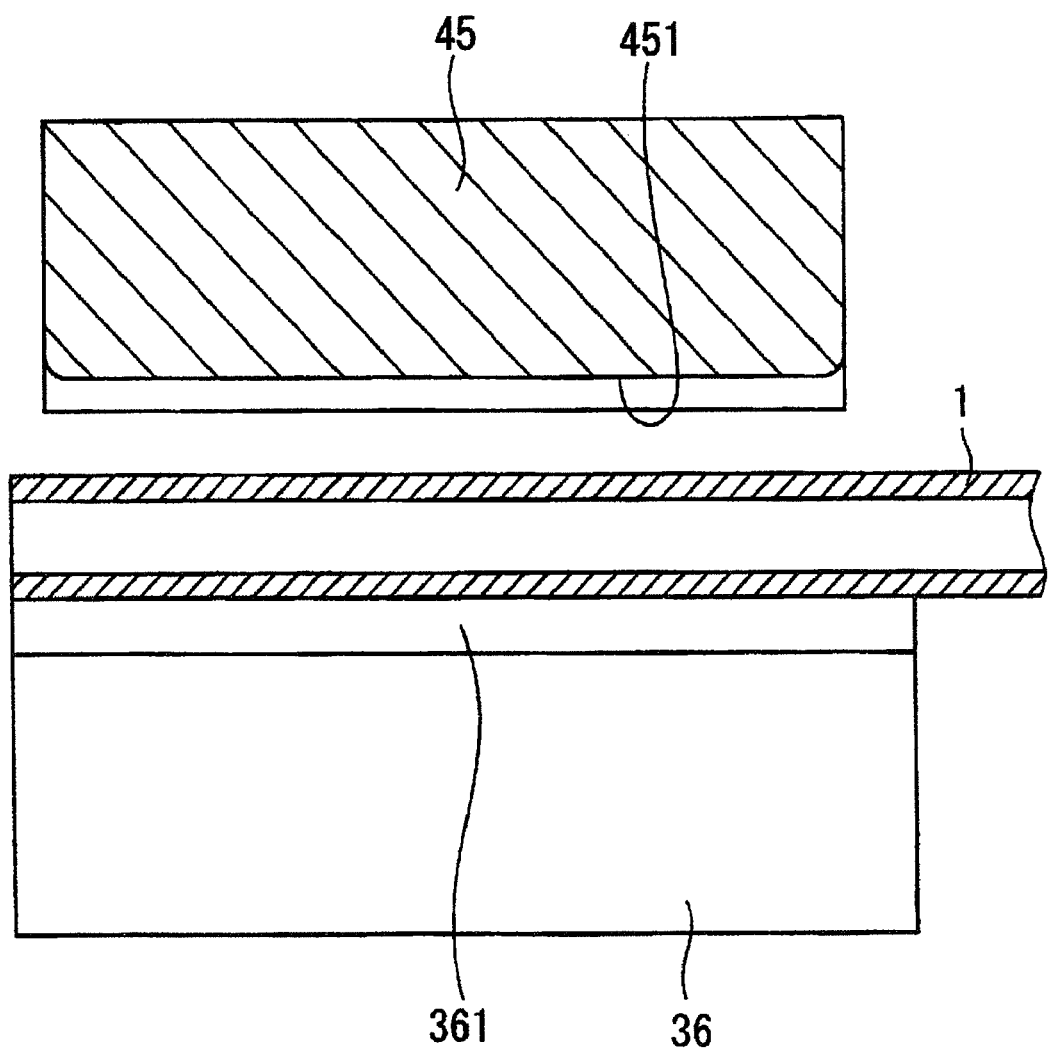
FIG. 27B is a cross-sectional view taken along the line Y-Y shown in FIG. 27A.
Figure 28A:
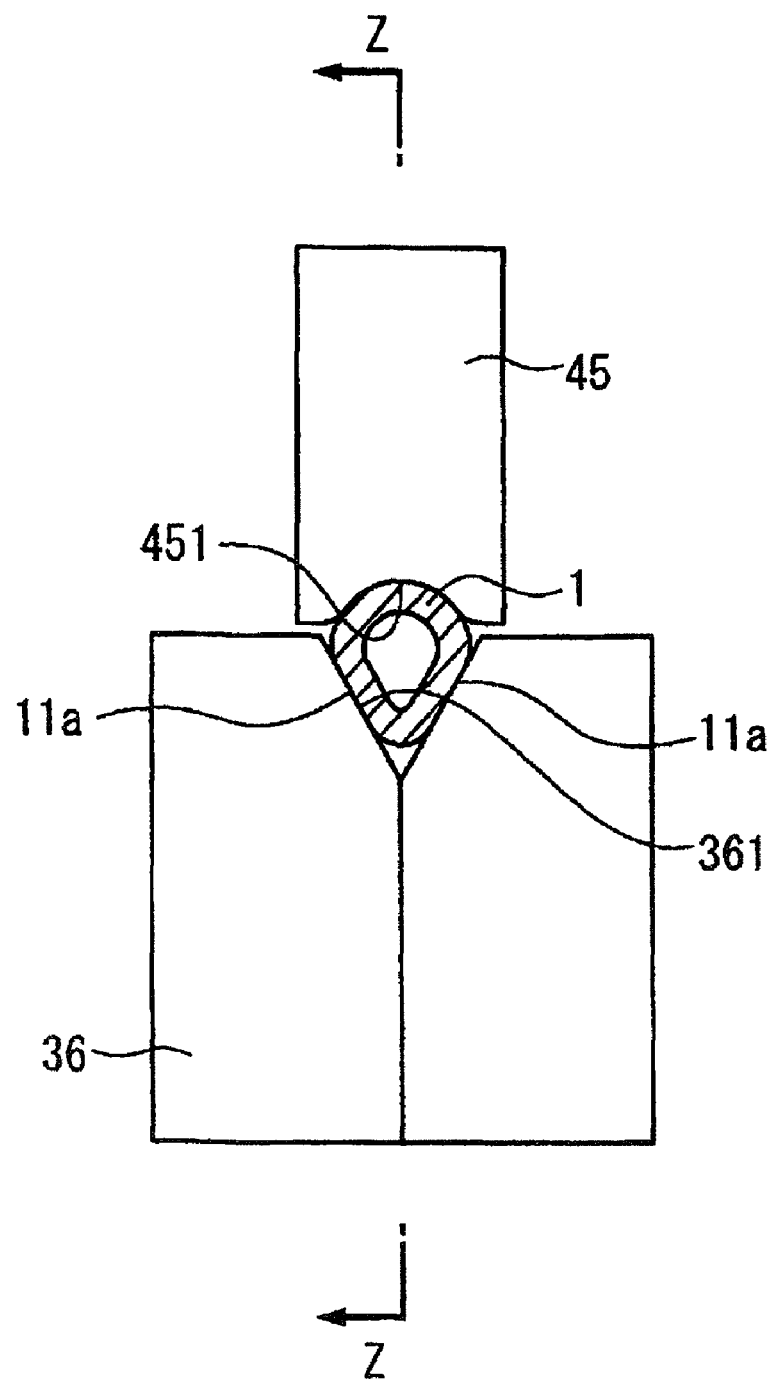
FIG. 28A is a partly cutaway cross-sectional view illustrating a state in which a tapered part is formed in the first rack blank.
Figure 28B:
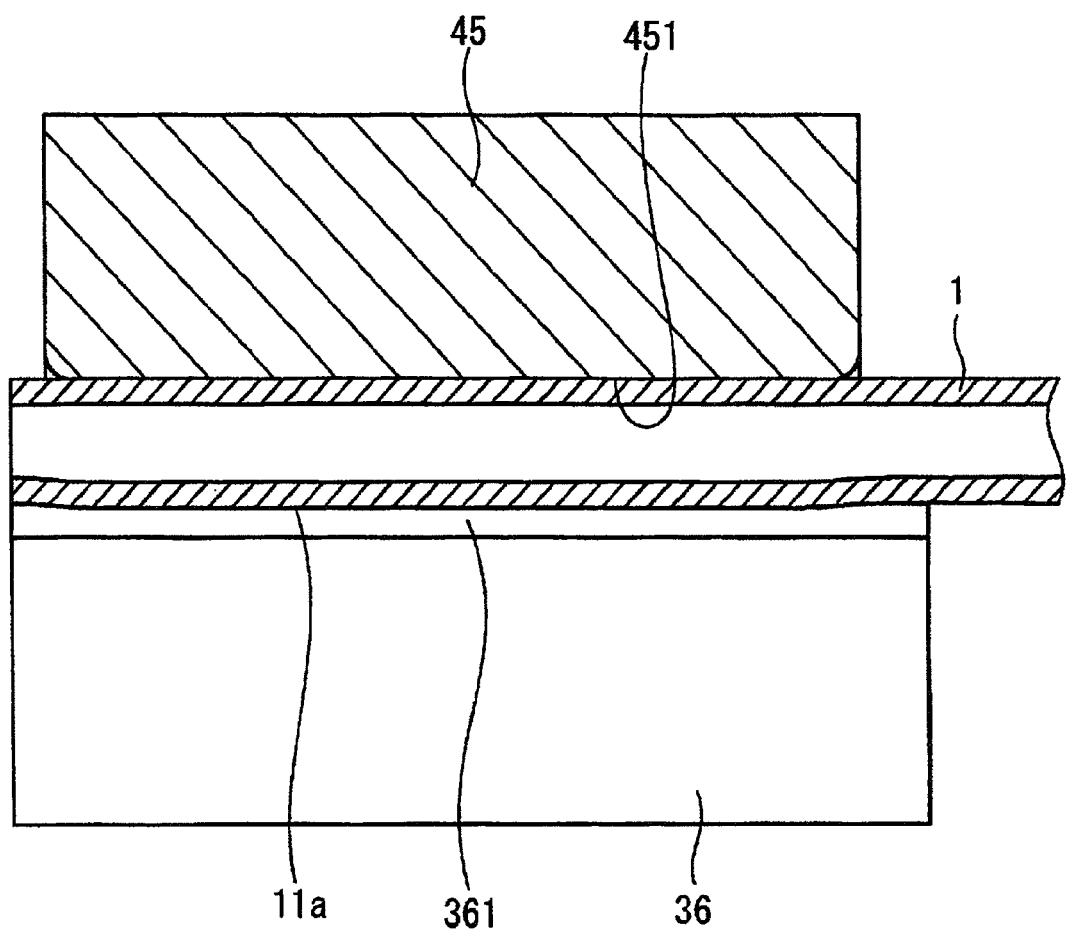
FIG. 28B is a cross-sectional view taken along the line Z-Z shown in FIG. 28A.

The outer circumference 11 of the first rack blank 1 is pressed between the semicircular pressing surface (or restraining surface) 611 formed on the bottom surface of the upper die 61 of the die illustrated in FIGS. 26A and 26B for sizing-forming, and the required rack teeth shaped portion 631 formed in the top surface of the lower die 63 thereof. Consequently, the required rack teeth (i.e., the finish-processed rack teeth) 15 are formed while the width of the tooth root of each of the rack teeth of the first rack blank 1 is narrowed. The shapes of the upper die 61 and the lower die 64 are the same as those of the corresponding dies according to the fifth embodiment.

When the second step of the sizing process is finished, the mandrel 7 is extracted form the left-end-side opening portion 17. Thus, the entire forming process is finished. Although the mandrel 7 is extracted from the first rack blank 1 every finish of the forming process in the sixth embodiment, the mandrel 7 may be extracted from the rack blank 1 only when the second step of the sizing process, which is the last step, is finished, without being extracted every finish of each forming step.

In the sixth embodiment, upon completion of the forming process, the mandrel 7 is extracted from the bore hole 12 of the first rack blank 1, so that a rack, which is a finish product, is lightened.

Seventh Embodiment

A seventh embodiment will be described with reference to FIGS. 27A to 31.

The seventh embodiment uses the same first rack blank 1 as that used in the first embodiment. Similarly to the first embodiment, the cross-sectional shape of the first rack blank is not limited to a cylinder. Even cross-sectionally rectangular or polygonal first rack blank can be used. Alternatively, even a first rack blank, which is formed so that the shape of the outer circumferential surface thereof differs form the shape of the inner circumferential surface thereof, can be used.

First, as shown in FIGS. 27A, 27B, FIG. 28A, and FIG. 28B, the first rack blank 1 is set between a U-shaped groove punch 45 and a tapered die 36. Then, the first rack blank 1 is pressed by the U-shaped groove punch 45, so that the first rack blank 1 is pushed into the tapered die 36. Consequently, the tapered portion 11a is formed in the first rack blank 1 according to the shapes of the U-shaped groove punch 45 and the tapered die 36.

Also, a U-shaped groove 451 having a cross-sectional shape, which is substantially the same as the shape of the outer circumferential surface of the first rack blank 1, is formed in the bottom portion of the U-shaped groove punch 45. A tapered surface 361 for forming the tapered portion 11a in the first rack blank 1 is formed along the longitudinal direction of the top portion of the tapered die 36 with a cross-section thereof being substantially V-shaped.

Figure 29A:
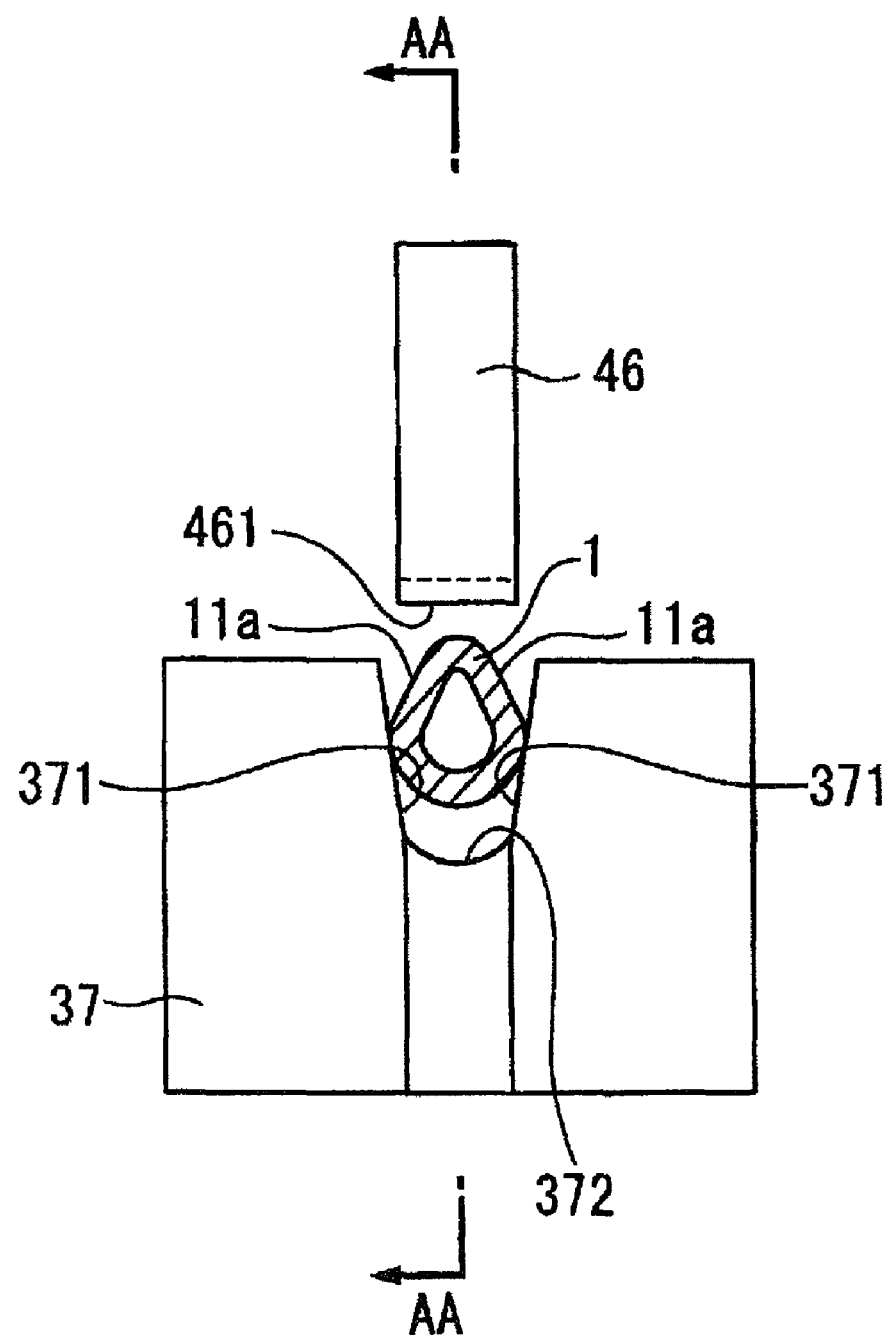
FIG. 29A is a partly cutaway cross-sectional view illustrating a state in which the first rack blank, in which a tapered part is formed, is set between a tooth punch and a lower die.
Figure 29B:
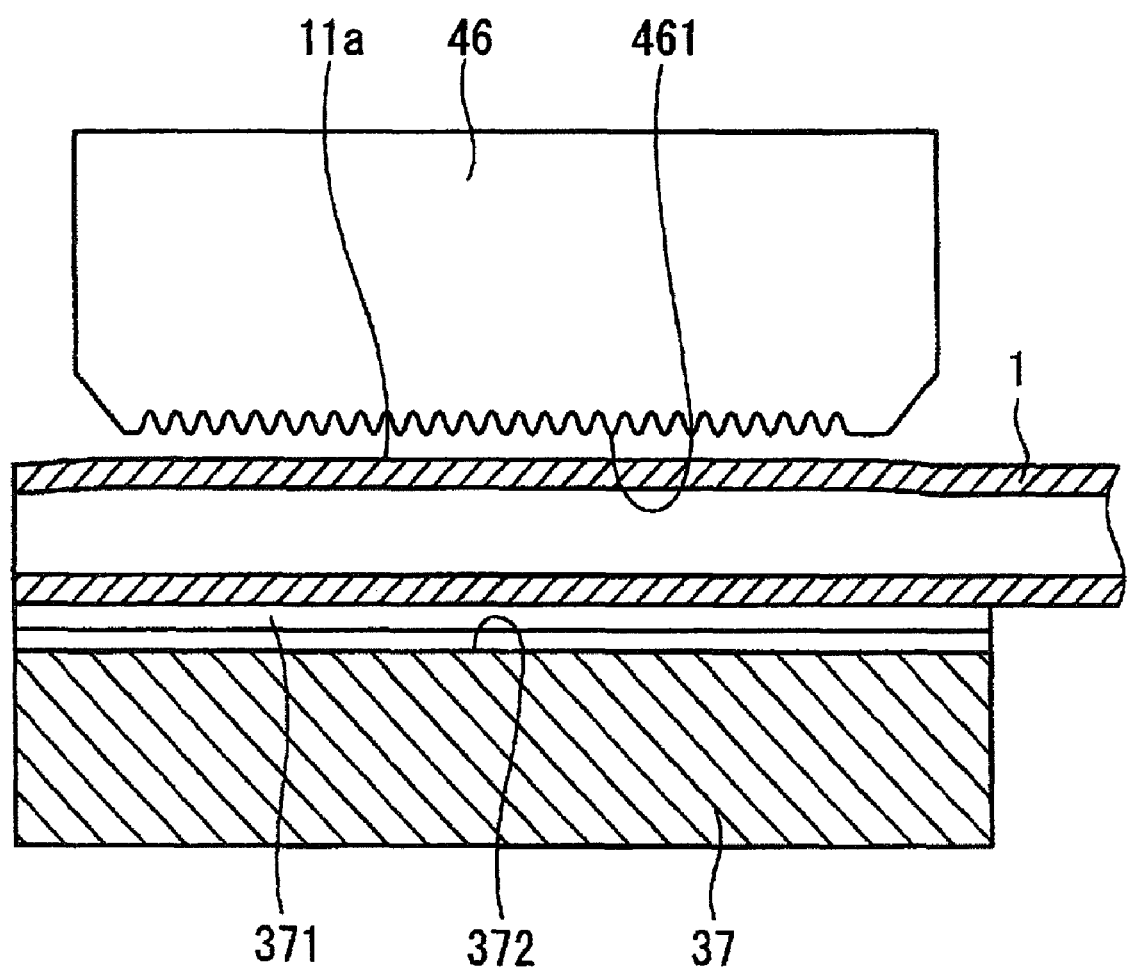
FIG. 29B is a cross-sectional view taken along the line Z-Z shown in FIG. 29A.
Figure 30A:
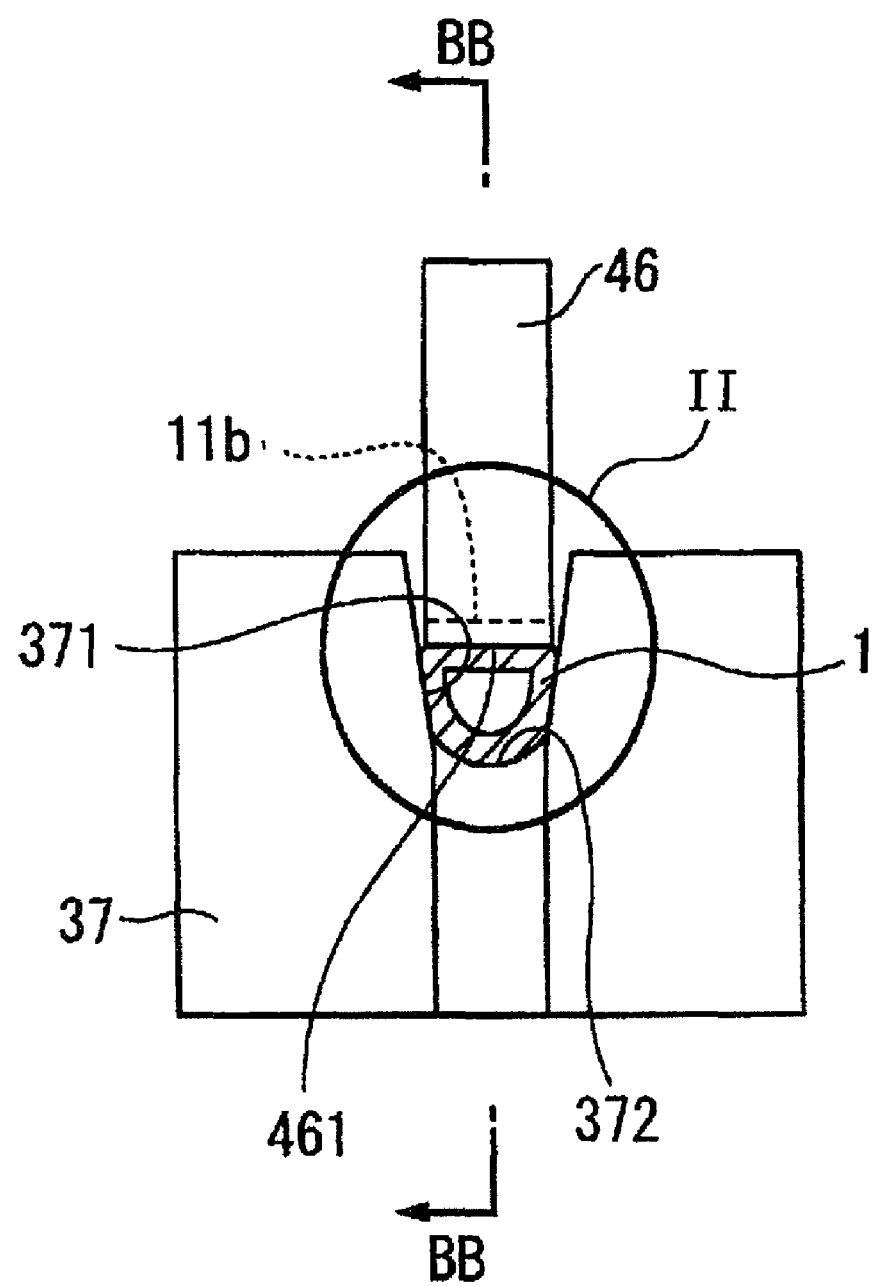
FIG. 30A is a partly cutaway cross-sectional view illustrating a state in which rack teeth are formed in the tapered part of the first rack blank.
Figure 30B:
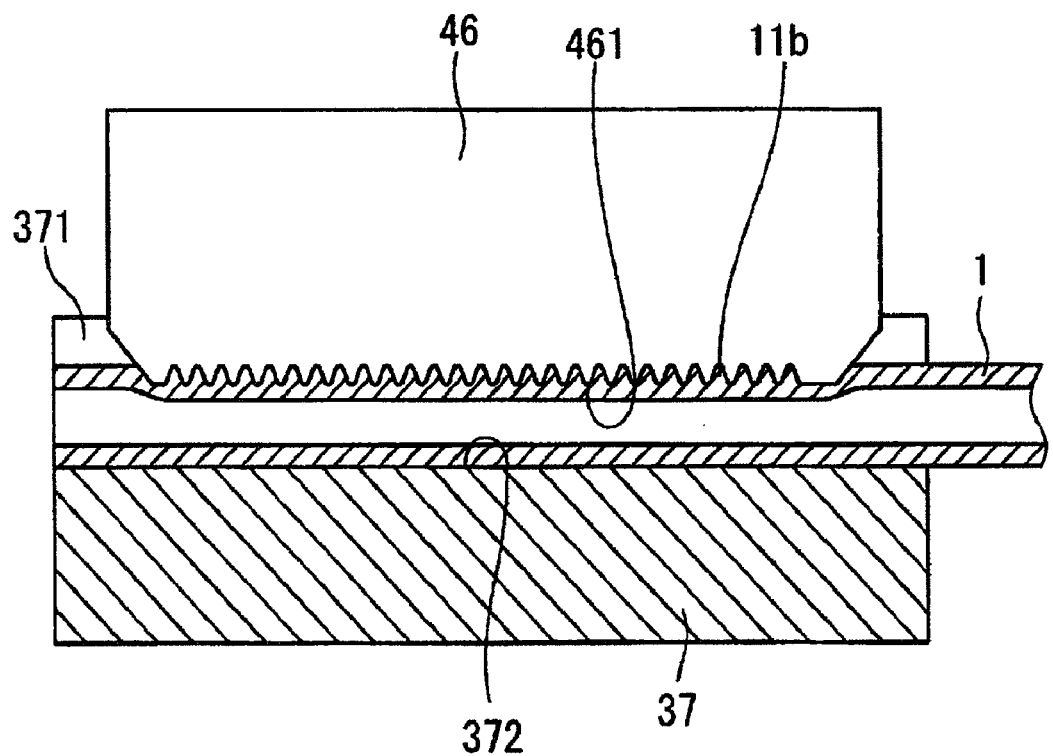
FIG. 30B is a cross-sectional view taken along the line BB-BB shown in FIG. 30A.
Figure 31:
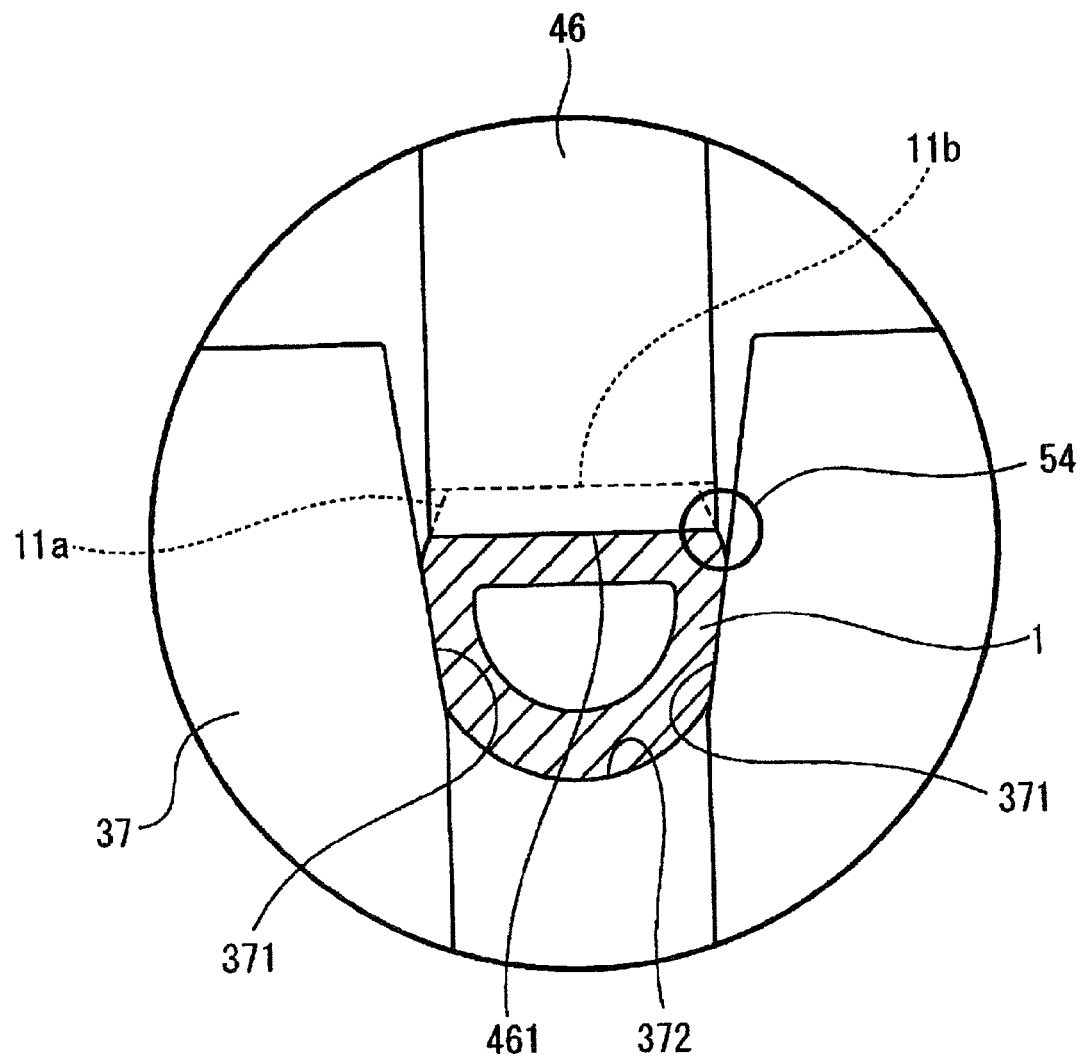
FIG. 31 is an enlarged view of a part II shown in FIG. 30A.
Figure 32A:
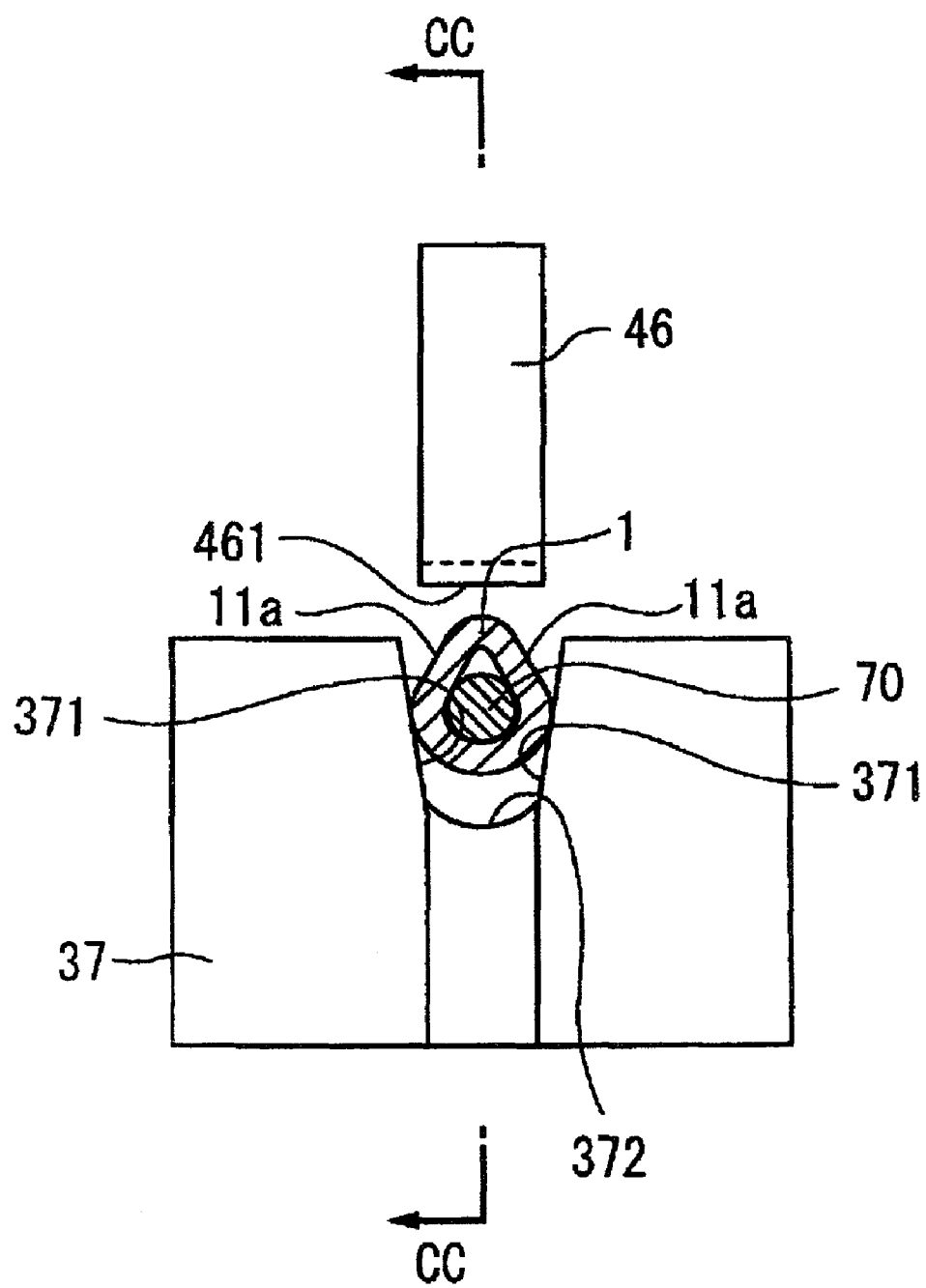
FIG. 32A is an explanatory view of eighth embodiment according to the invention and is a partly cutaway cross-sectional view illustrating a state in which the first rack blank, into which a core member is inserted, is set between a tooth punch and a lower die.
Figure 32B:
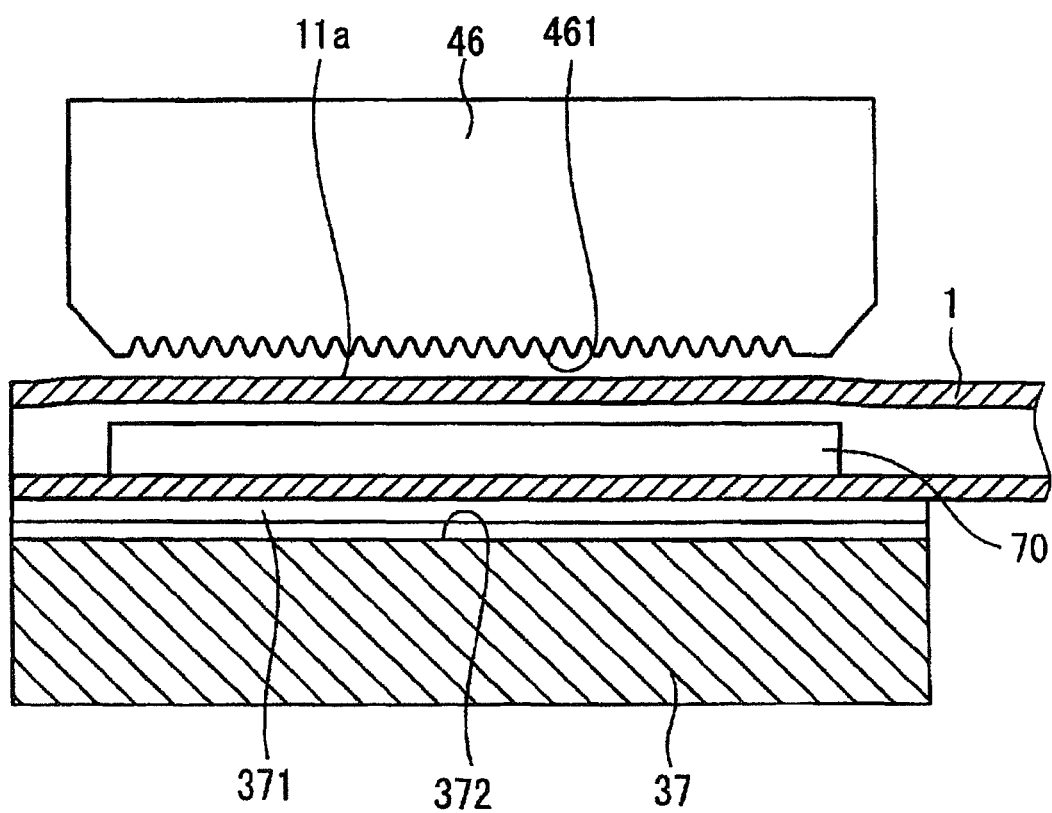
FIG. 32B is a cross-sectional view taken along the line CC-CC shown in FIG. 32A.
Figure 33A:
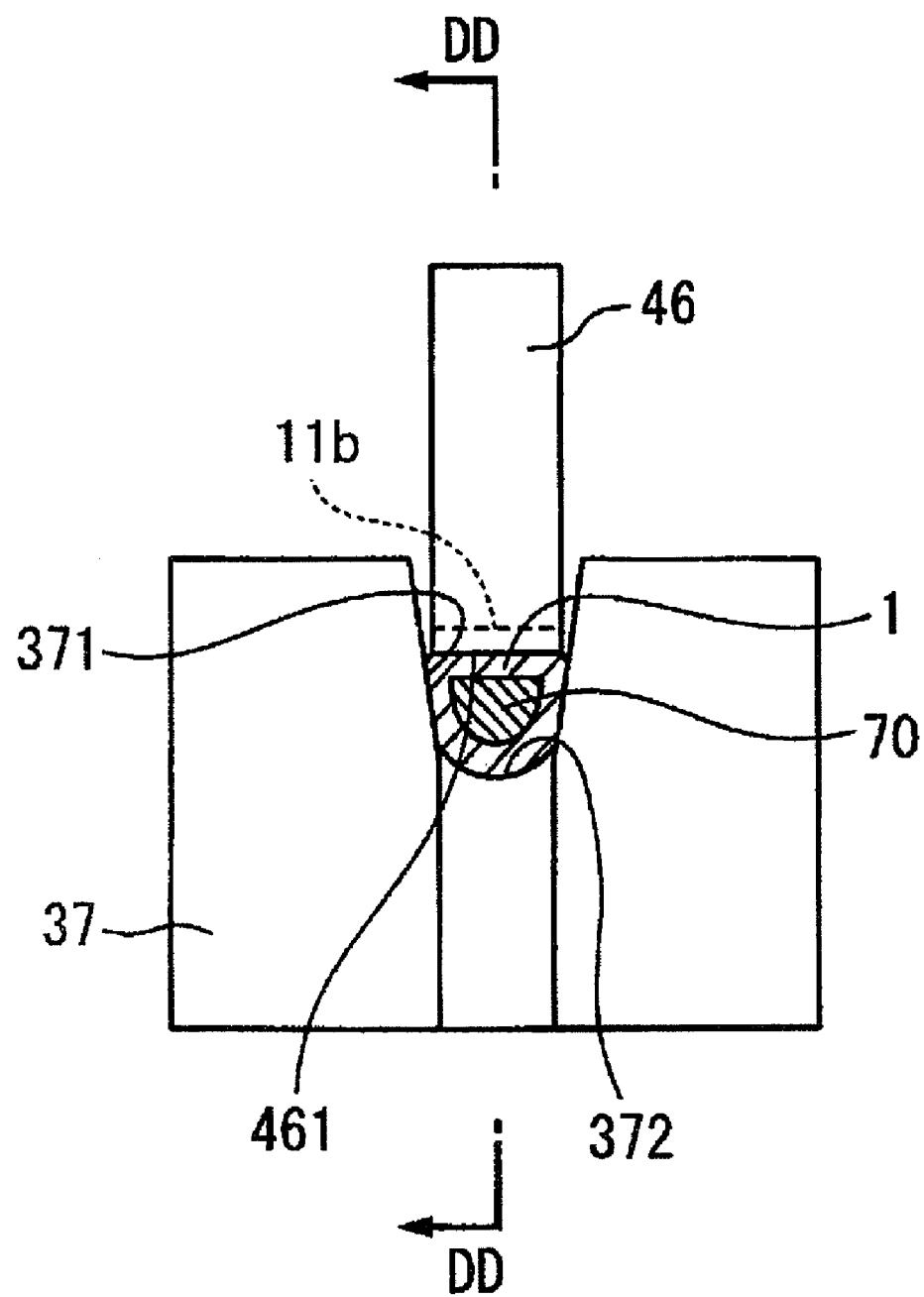
FIG. 33A is a partly cutaway cross-sectional view illustrating a state in which rack teeth are formed in the tapered part of the first rack blank into which the core member is inserted.
Figure 33B:
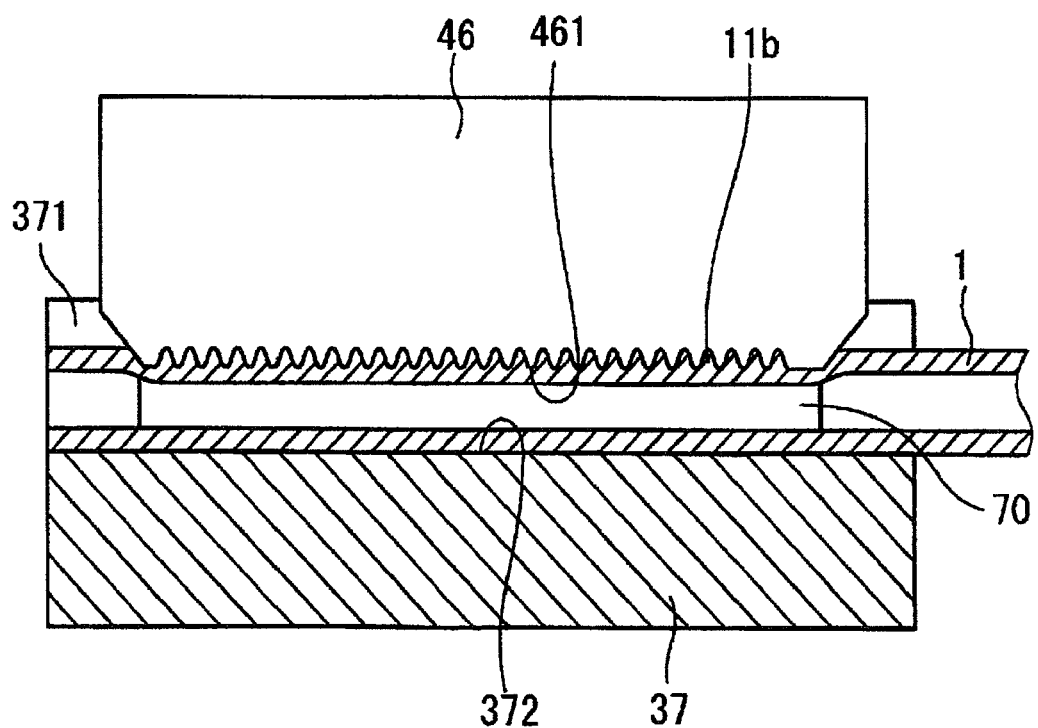
FIG. 33B is a cross-sectional view taken along the line DD-DD shown in FIG. 33A.

Next, as shown in FIGS. 29A, 29B, and 30, the rack blank 1, in which the tapered portion 11a is formed, is set between the teeth form punch 46 and the lower die 37 so that the tapered portion 11a is directed toward the teeth form punch 46. The teeth form punch 46 is pressed to the tapered portion 11a of the first rack blank 1, so that the first rack blank 1 is pushed into the lower die 37. Consequently, the rack teeth 11b are formed in the tapered portion 11a of the first rack blank 1 according to the shapes of the teeth form punch 46 and the lower die 37. At that time, the tapered portion 11a prevents an excess thickness part (or material) from being generated in the gap portion (see a part 54 shown in FIG. 31) between the teeth form punch 46 and the lower die 37. Also, this embodiment can deal with rack teeth having various shapes by adjusting the angle at the tapered portion 11a.

Also, rack teeth shaped portion 461 are formed in the bottom portion of the teeth form punch 46 along the longitudinal direction thereof. A U-shaped groove 372 having a cross-sectional shape, which is substantially the same as the shape of the outer circumferential surface of the first rack blank 1, is formed in the lower die 37 along the longitudinal direction thereof. Also, tapered surfaces 371, 371 upwardly extending from both lateral end portions of this U-shaped groove 372 are formed in the lower die 37.

As described above, the steering rack manufacturing method for manufacturing the steering rack according to the seventh embodiment includes a step of using the first rack blank 1 as the rack blank, and forming the tapered shape part 10a in a portion in which the rack teeth 11b of the first rack blank 1 is formed, using the dies 45 and 36, and a step of pressing the punch 46 having the rack teeth form 461 to the portion of the first rack blank 1, in which the tapered portion 10a is formed, to thereby form the rack teeth 11b. Thus, the length of the portion, to which the rack teeth shaped portion 461 of the punch 46 is pressed, can be increased. Consequently, the forming of the rack teeth 11b can be facilitated. Also, the tapered shape part 10a of the first rack blank 1 can be prevented from generating the excess thickness material at the forming of the rack teeth 11b. Additionally, the rack teeth 11b can sufficiently be filled with the material. Moreover, the processing step of removing a burr can be eliminated. Accordingly, the manufacturing cost can be reduced.

Also, according to the steering rack manufacturing method according to the seventh embodiment and the steering rack according to the seventh embodiment, sealed forming is prevented from being performed in any of all the steps thereof. Thus, forming stress can be suppressed to low level. Consequently, the lifetime of each of the dies 45, 36, 46, and 37 can be lengthened. Accordingly, the manufacturing cost can be reduced. Additionally, because the steering rack can be formed by cold-forging, the precision in forming the rack teeth 11b can be enhanced, as compared with the case of performing warm-forging.

Also, according to the steering rack manufacturing method according to the seventh embodiment and the steering rack according to the seventh embodiment, the shapes of the dies 45, 36, 46, and 37 are simple. Thus, the steering rack can be formed by a general-purpose press. Consequently, the die manufacturing const and the forming equipment cost can be reduced. Accordingly, the manufacturing cost can be reduced.

Eighth Embodiment

Next, an eighth embodiment of the invention will be described with reference to FIGS. 27A, 28B, 32A, and 33B. The components of the eighth embodiment are the same as or equivalent to those of the seventh embodiment are designated by the same reference numerals in the drawings. The description of such components will be omitted or simplified.

First, as shown in FIGS. 27A, 27B, and 28A, and 28B, the first rack blank 1 is set between the U-shaped groove punch 45 and the tapered die 36. Then, the first rack blank 1 is pressed by the U-shaped groove punch 45, so that the first rack blank 1 is pushed into the tapered die 36. Consequently, the tapered portion 11a is formed in the first rack blank 1 according to the shapes of the U-shaped groove punch 45 and the tapered die 36.

Subsequently, a core member 70, whose diameter is less than the inside diameter of the first rack blank 1, is inserted into the tapered portion 11a of the first rack blank 1. Although the core member 70 is inserted into the tapered portion 11a of the first rack blank 1 as the second rack blank in the eighth embodiment, a mandrel can be inserted, instead of the core member 70.

Then, as shown in FIGS. 32A, 32B, and 33A, and 33B, the first rack blank 1, in which the tapered portion 11a is formed and into which the core member 70 is inserted, is set between a teeth form punch 46 and the lower die 37 so that the tapered portion 11a is directed toward the teeth punch 46. Subsequently, the teeth form punch 46 is pressed to the tapered portion 11a of the first rack blank 1, so that the first rack blank 1 is pushed into the lower die 37. Consequently, the rack teeth 11b is formed in the tapered portion 11a of the first rack blank 1 according to the shapes of the teeth form punch 46 and the lower die 37.

As described above, the manufacturing method for the steering rack of the eighth embodiment includes the step of using the first tubular rack blank 1 as the rack blank according to the invention and forming the tapered shape 10a in the part of the first rack blank 1, in which the rack teeth 11b are formed using the dies 45 and 36, the step of inserting the core member 70, whose diameter is less than that of the first rack blank 1, into the part of the first rack blank 1, in which the tapered shape 10a is formed, and the step of holding the punch 46 having a rack teeth shaped portion 461 to the part of the first rack blank 1, in which the tapered shape 10a is formed, to form the rack teeth 11b. Thus, the strength of the rack can be enhanced. Also, the strength of the rack can be adjusted by changing the material of the core member 70. The other composing-elements and advantages are similar to those of the seventh embodiment.

The seventh and eighth embodiments can be configured so that a sizing process is added after the process of forming the rack teeth in the tapered part of the first rack blank, similarly to the other embodiments. Also, the second rack blank in each of the first to fourth embodiments can appropriately be used as the core member in the eighth embodiment.

Additionally, in all the aforementioned embodiments, the material of the second rack blank can be the same as and differ from that of the first rack material. Further, although the second rack blank or the mandrel is solid in all the aforementioned embodiments, the second rack blank or the mandrel can be formed to be hollow.

Although the invention has been described in detail and also with reference to the specific embodiments, it is obvious to those skilled in the art that various changes and modifications can be made without departing from the spirit and scope of the invention.

The present application claims priority from Japanese Patent Application No. 2006-298069 filed on Oct. 12, 2005, Japanese Patent Application No. 2005-338809 filed on Nov. 24, 2005, and Japanese Patent Application No. 2006-270863 filed on Oct. 2, 2006, the entire contents of which are incorporated herein by reference.

Industrial Applicability

There is provided a steering rack and a manufacturing method of the steering rack, in which the steering rack is lightweight, a the filling degree of a material with which teeth are filled is enhanced, and the rigidity of the entire rack teeth is improved.

The invention claimed is:

1. A method of manufacturing a steering rack, the method comprising:

providing a first rack blank in a form of a pipe having a bore hole, and a second rack blank or a mandrel having such a cross-sectional shape that a gap is provided between the second rack blank or the mandrel and an inner circumferential surface of the first rack blank;

inserting the second rack blank or the mandrel into the bore hole of the first rack blank;

restraining an outer circumferential surface of the first rack blank at a location other than a rack teeth forming portion of the first rack blank by a first die;

forming rack teeth on the first rack blank by pressing a punch having a rack teeth shaped portion onto the rack teeth forming portion of the first rack blank, and causing the first rack blank to contact an outer circumferential surface of the second rack blank or the mandrel facing the rack teeth forming portion of the first rack blank; and allowing a blank material, which has been excluded in the forming the rack teeth, to flow into the gap between the inner circumferential surface of the first rack blank and the second rack blank or the mandrel such that the blank material is accommodated in the gap and such that, after the forming of the rack teeth, a portion of the gap remains between the inner circumferential surface of the first rack blank and each side of the second rack blank or the mandrel.

2. The method according to claim 1, wherein the providing the first rack blank and the second rack blank or the mandrel comprises providing the first rack blank having a hollow cylindrical shape.

3. The method according to claim 1, wherein the providing the first rack blank and the second rack blank or the mandrel comprises providing the second rack blank which is solid.

4. The method according to claim 3, wherein the providing the first rack blank and the second rack blank or the mandrel further comprises providing the second rack blank having a cylindrical shape.

5. The method according to claim 1, wherein the providing the first rack blank and the second rack blank or the mandrel comprises providing the second rack blank having an axial length which is equal to or longer than a length of the rack teeth forming portion of the first rack blank.

6. The method according to claim 1, wherein the outer circumferential surface of the second rack blank is provided with teeth facing the rack teeth forming portion of the first rack blank at a pitch equal to a pitch of the rack teeth shaped portion of the punch.

7. The method according to claim 5, wherein the outer circumferential surface of the second rack blank is provided with teeth facing the rack teeth forming portion of the first rack blank at a pitch equal to a pitch of the rack teeth shaped portion of the punch.

8. The method according to claim 1, further comprising:
after the allowing the blank material, which has been excluded, to flow into the gap such that the blank material is accommodated in the gap,
sizing the rack teeth to obtain a required rack teeth by holding and pressing the first rack blank between a second die having a required rack teeth shaped portion and a third die having an outer circumference corresponding to a required shape of the outer circumferential surface of the first rack blank at the location other than the rack teeth forming portion.

9. The method according to claim 8, wherein the sizing the rack teeth comprises forming the required rack teeth while narrowing a tooth width of a root of the rack teeth formed on the first rack blank to a required tooth width.

10. The method according to claim 8, further comprising:
after the sizing the rack teeth,
extracting the mandrel from the bore hole of the first rack blank.

11. The method according to claim 1, wherein the punch comprises of a first punch and a second punch, and where:
firstly forming the rack teeth by the first punch formed with a first rack teeth shaped portion having a pressure angle that is smaller than a pressure angle of a required rack teeth shape; and
secondly forming the rack teeth by the second punch formed with a rack teeth shaped portion having a pressure angle that is closer to the pressure angle of the required rack teeth shape than the pressure angle of the first rack teeth shaped portion.

12. The method according to claim 9, wherein the sizing the rack teeth further comprises further forming the required rack teeth without restraining the tooth width of the root of the rack teeth formed on the first rack blank.

13. The method according to claim 1, wherein the forming the rack teeth comprises forming the rack teeth having a tooth height which is larger than a tooth height of a required rack teeth shape.

14. The method according to claim 1, wherein the forming the rack teeth comprises forming the rack teeth by the punch having the rack teeth shaped portion such that a pressure angle of a rack tooth shape at each end in an axial direction of the first rack blank is 0 degree to 45 degrees on a side of an adjacent rack tooth shape and such that an angle formed between the rack tooth shape and an axis of the first rack blank on a side of the respective ends is 5 degrees to 45 degrees.

15. The method according to claim 1, wherein the restraining the first rack blank by the first die comprises restraining the first rack blank by a pair of restraining surfaces of the first die, wherein the pair of restraining surfaces is formed in such a tapered shape that a width between the restraining surfaces continuously decreases toward a direction in which the punch is pressed.

16. The method according to claim 1, wherein the providing the first rack blank and the second rack blank or the mandrel comprises providing the mandrel which is solid and having a cylindrical shape, wherein the surface of the mandrel facing the rack teeth forming portion of the first rack blank is fiat along a length the rack teeth forming portion.

17. The method according to claim 1, further comprising:
before the restraining the first rack blank by the first die, forming a tapered part on the rack teeth forming portion of the first rack blank.

* * * * *